US012167205B2

(12) United States Patent
Bergs et al.

(10) Patent No.: US 12,167,205 B2
(45) Date of Patent: *Dec. 10, 2024

(54) LINEAR TRANSDUCER IN A FLAPPING AND BENDING APPARATUS

(71) Applicant: Cochlear Limited, Macquarie University (AU)

(72) Inventors: Tommy Bergs, Macquarie University (AU); Marcus Andersson, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 476 days.

This patent is subject to a terminal disclaimer.

(21) Appl. No.: 17/269,033

(22) PCT Filed: Oct. 18, 2019

(86) PCT No.: PCT/IB2019/058909

§ 371 (c)(1),
(2) Date: Feb. 17, 2021

(87) PCT Pub. No.: WO2020/084420

PCT Pub. Date: Apr. 30, 2020

(65) Prior Publication Data

US 2021/0176574 A1 Jun. 10, 2021

Related U.S. Application Data

(60) Provisional application No. 62/748,980, filed on Oct. 22, 2018.

(51) Int. Cl.
*H04R 25/00* (2006.01)
*H04R 17/00* (2006.01)

(52) U.S. Cl.
CPC .......... *H04R 25/606* (2013.01); *H04R 17/00* (2013.01); *H04R 25/65* (2013.01); *H04R 2225/67* (2013.01); *H04R 2460/13* (2013.01)

(58) Field of Classification Search
CPC .... H04R 25/606; H04R 17/005; H04R 23/02; H04R 2460/13; H04R 25/60; H04R 17/00;
(Continued)

(56) References Cited

U.S. PATENT DOCUMENTS 4,248,504 A * 2/1981 Albertinetti ............ G02B 26/06 359/295
4,527,583 A * 7/1985 Simpson ............ G05D 16/2013 323/365
(Continued)

FOREIGN PATENT DOCUMENTS

| | | | |
|---|---|---|---|
| CN | 101128172 | A | 2/2008 |
| CN | 206402446 | U | 8/2017 |
| JP | 2012100040 | A | 5/2012 |

OTHER PUBLICATIONS

Office action and Search Report for Chinese Patent Application No. 201980048255.6, dated Aug. 17, 2021.
(Continued)

*Primary Examiner* — Gerald Gauthier
(74) *Attorney, Agent, or Firm* — Pilloff Passino & Cosenza LLP; Martin J. Cosenza

(57) ABSTRACT

A component of a bone conduction device, such as a passive transcutaneous bone conduction device or an active transcutaneous bone conduction device, or a percutaneous bone conduction device, used to evoke a hearing percept comprising a housing and a bender apparatus located in the housing, wherein the bender apparatus is a device of a piezoelectric bender.

26 Claims, 36 Drawing Sheets

(58) Field of Classification Search
CPC ...... H04R 1/10; H04R 1/1016; H04R 1/2876; H04R 1/2896; H04R 25/00; H04R 25/552; H04R 25/554; H04R 25/65; H04R 2225/67; H04R 17/10; H04R 25/48; A61N 1/36038; G01V 1/523
See application file for complete search history.

(56) References Cited

U.S. PATENT DOCUMENTS

| | | | | |
|---|---|---|---|---|
| 8,492,150 | B2 * | 7/2013 | Parker | G01N 33/5061 435/395 |
| 10,321,247 | B2 * | 6/2019 | Verma | A61N 1/36038 |
| 10,477,332 | B2 * | 11/2019 | Gustafsson | H04R 25/606 |
| 11,223,912 | B2 * | 1/2022 | Vermeiren | H04R 25/65 |
| 11,368,802 | B2 * | 6/2022 | Meskens | H04R 25/606 |
| 11,608,840 | B2 * | 3/2023 | Yuan | F02C 9/26 |
| 2002/0039620 | A1 * | 4/2002 | Shahinpoor | B25J 15/02 427/2.12 |
| 2008/0009772 | A1 * | 1/2008 | Tyler | G06F 3/015 600/595 |
| 2008/0074006 | A1 * | 3/2008 | Kawakubo | B81B 3/0072 310/366 |
| 2009/0043149 | A1 | 2/2009 | Abel | |
| 2010/0298626 | A1 | 11/2010 | Andersson et al. | |
| 2012/0039493 | A1 | 2/2012 | Rucker et al. | |
| 2012/0253104 | A1 * | 10/2012 | Andersson | H04R 25/606 600/25 |
| 2013/0197298 | A1 * | 8/2013 | Miller | H04R 25/00 600/25 |
| 2013/0236338 | A1 * | 9/2013 | Locke | F04B 53/10 417/413.1 |
| 2014/0064531 | A1 * | 3/2014 | Andersson | H04R 25/606 381/326 |
| 2014/0146435 | A1 * | 5/2014 | Stephanou | H01G 5/18 361/290 |
| 2014/0179985 | A1 | 6/2014 | Andersson | |
| 2015/0016649 | A1 * | 1/2015 | Van Himbeeck | H04R 1/1016 381/326 |
| 2015/0110322 | A1 * | 4/2015 | Andersson | H04R 25/552 381/326 |
| 2015/0156594 | A1 * | 6/2015 | Bervoets | H04R 25/606 600/25 |
| 2015/0290454 | A1 * | 10/2015 | Tyler | G06F 3/012 607/134 |
| 2015/0373461 | A1 * | 12/2015 | Andersson | H04R 25/606 600/25 |
| 2016/0037273 | A1 * | 2/2016 | Gustafsson | H04R 25/606 381/326 |
| 2016/0352259 | A1 * | 12/2016 | Ahn | H10N 30/2042 |
| 2017/0094429 | A1 * | 3/2017 | Bervoets | H04R 25/606 |
| 2017/0134841 | A1 * | 5/2017 | Miller | H04R 1/10 |
| 2017/0156010 | A1 * | 6/2017 | Verma | A61N 1/36038 |
| 2017/0318399 | A1 * | 11/2017 | Meskens | H04R 25/554 |
| 2018/0020301 | A1 * | 1/2018 | Gustafsson | H04R 25/606 |
| 2018/0035219 | A1 * | 2/2018 | Gustafsson | H04R 25/606 |
| 2018/0055530 | A1 * | 3/2018 | Messerly | A61B 17/320068 |
| 2018/0124530 | A1 * | 5/2018 | Bergs | H04R 25/606 |
| 2018/0279061 | A1 * | 9/2018 | Walraevens | H04R 25/606 |
| 2018/0288539 | A1 * | 10/2018 | Bervoets | H04R 1/2876 |
| 2019/0008543 | A1 * | 1/2019 | Scoggins | A61B 17/320068 |
| 2019/0011612 | A1 * | 1/2019 | Mastrangelo | G02B 27/0172 |
| 2019/0023392 | A1 * | 1/2019 | Micros | B64U 80/82 |
| 2019/0028819 | A1 * | 1/2019 | Vermeiren | H04R 25/606 |
| 2020/0055088 | A1 * | 2/2020 | Okada | A61B 8/4483 |
| 2021/0176574 | A1 * | 6/2021 | Bergs | H04R 17/00 |
| 2021/0321206 | A1 * | 10/2021 | Asnes | H04R 1/2896 |

OTHER PUBLICATIONS

International Search Report & Written Opinion for PCT/IB2019/058909, mailed Jan. 21, 2020.

* cited by examiner

LINEAR TRANSDUCER IN A FLAPPING AND BENDING APPARATUS

CROSS-REFERENCE TO RELATED APPLICATIONS

This application claims priority to U.S. Provisional Application No. 62/748,980, entitled LINEAR TRANSDUCER IN A FLAPPING AND BENDING APPARATUS, filed on Oct. 22, 2018, naming Tommy BERGS of Molnlycke, Sweden as an inventor, the entire contents of that application being incorporated herein by reference in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. For example, cochlear implants use an electrode array implanted in the cochlea of a recipient to bypass the mechanisms of the ear. More specifically, an electrical stimulus is provided via the electrode array to the auditory nerve, thereby causing a hearing percept.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from conductive hearing loss typically receive an acoustic hearing aid. Hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, which rely primarily on the principles of air conduction, certain types of hearing prostheses, commonly referred to as bone conduction devices, convert a received sound into vibrations. The vibrations are transferred through the skull to the cochlea causing generation of nerve impulses, which result in the perception of the received sound. Bone conduction devices are suitable to treat a variety of types of hearing loss and may be suitable for individuals who cannot derive sufficient benefit from acoustic hearing aids, cochlear implants, etc., or for individuals who suffer from stuttering problems.

SUMMARY

In accordance with one embodiment, there is a component of a bone conduction device, comprising a housing and a bender apparatus located in the housing, wherein the bender apparatus is a device of a piezoelectric bender.

In accordance with another embodiment, there is a component of a bone conduction device, comprising a housing and a flapper apparatus located in the housing, wherein the flapper apparatus includes a piezoelectric apparatus that is a contractor and/or an extender and/or a shearer, and the flapper apparatus is at least an effectively symmetrical apparatus.

In accordance with another exemplary embodiment, there is a component of a bone conduction device, comprising a housing and a piezo-seismic mass assembly configured to flap to evoke a hearing percept as a result of energizement of a piezoelectric transducer of the assembly, wherein the component is configured to enable permanent shock-proofing of the piezo transducer of the piezo-seismic mass assembly beyond that which results from damping while at least a portion of the piezo-seismic mass assembly is fixed relative to the housing.

In accordance with another exemplary embodiment, there is a method, comprising obtaining a component of a bone conduction device including a transducer-seismic mass assembly located within a housing, and operating the transducer of the assembly such that a first seismic mass and a second seismic mass of the assembly moves upwards and downwards in an arcuate motion effectively symmetrical to a plane between the two seism masses to produce vibrations that evoke a first hearing percept via bone conduction, wherein the arcuate motion is driven by a piezoelectric system which is only coupled to the seismic masses and/or support structure thereof.

BRIEF DESCRIPTION OF THE DRAWINGS

Some embodiments are described below with reference to the attached drawings, in which.

DETAILED DESCRIPTION

Embodiments herein are described primarily in terms of a bone conduction device, such as an active transcutaneous bone conduction device and a passive transcutaneous bone conduction device, as well as percutaneous bone conduction devices. Thus, any disclosure herein of one corresponds to another disclosure of the other two unless otherwise noted. Any disclosure herein is a disclosure of the subject matter disclosed with any one of the three types of bone conduction devices just detailed, unless otherwise noted. Also, it is noted that the teachings detailed herein and/or variations thereof are also applicable to a middle ear implant or an inner ear implant that utilizes a mechanical actuator. Also, any disclosure herein corresponds to a disclosure of the utilization of the teachings herein in a prosthesis that is different than a hearing prosthesis, such as, for example, a bionic limb or appendage, a muscle stimulator, etc. Moreover, any disclosure herein corresponds to a disclosure of the utilization of the teachings herein in a non-prosthetic device (e.g., a device that simply has a piezoelectric transducer). Accordingly, any disclosure herein of teachings corresponds to a disclosure of use in a middle ear implant or an inner ear mechanical stimulator, or a general prosthesis, or a non-prosthetic device.

Figure 1:
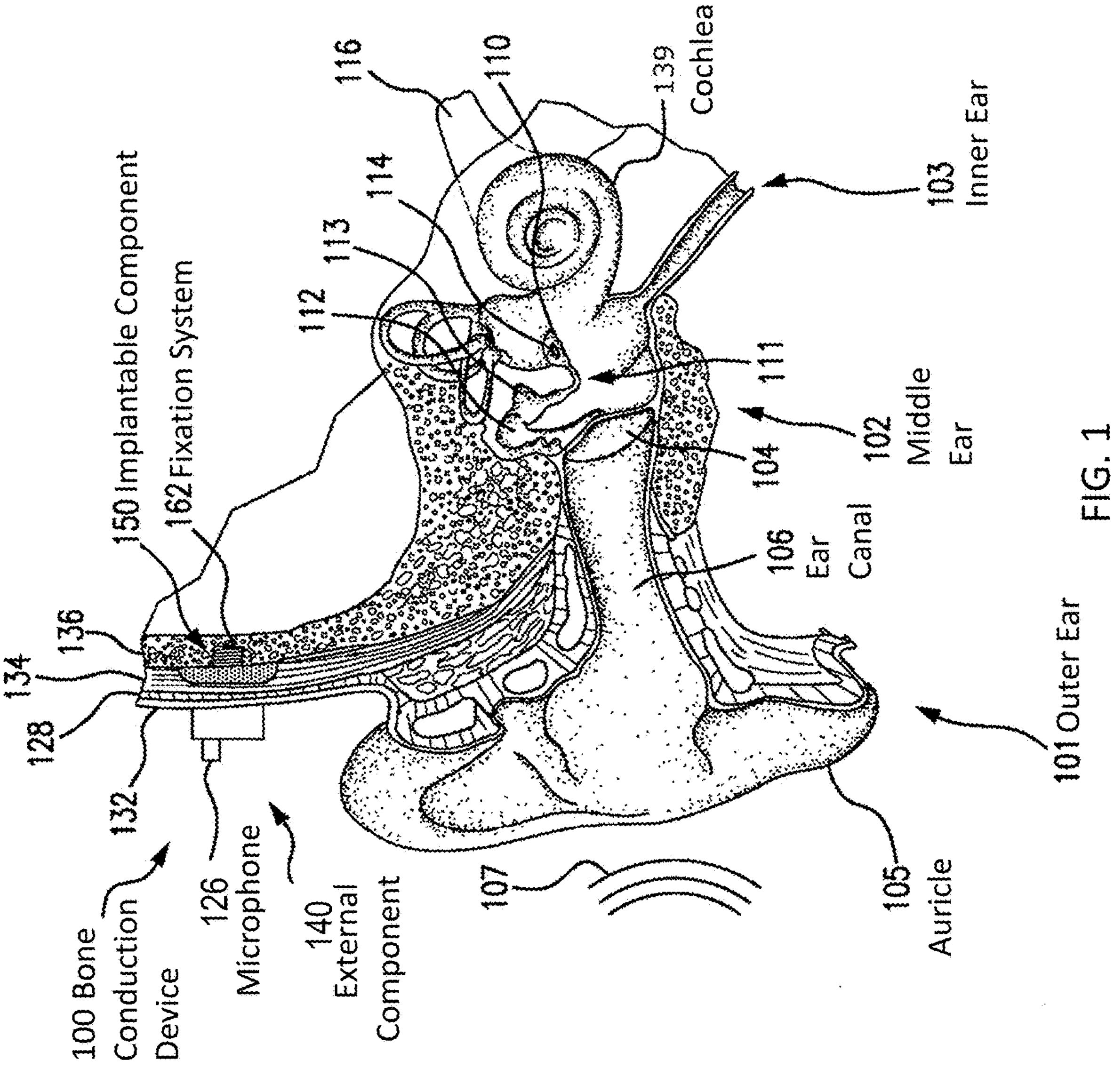
FIG. 1 is a perspective view of an exemplary bone conduction device in which at least some embodiments can be implemented.

FIG. 1 is a perspective view of a bone conduction device 100 in which embodiments may be implemented. As shown, the recipient has an outer ear 101, a middle ear 102, and an inner ear 103. Elements of outer ear 101, middle ear 102, and inner ear 103 are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 210 through three bones of middle ear 102, collectively referred to as the ossicles 111 and comprising the malleus 112, the incus 113, and the stapes 114. The ossicles 111 of middle ear 102 serve to filter and amplify acoustic wave 107, causing oval window 210 to vibrate. Such vibration sets up waves of fluid motion within cochlea 139. Such fluid motion, in turn, activates hair cells (not shown) that line the inside of cochlea 139. Activation of the hair cells causes appropriate nerve impulses to be transferred through the spiral ganglion cells and auditory nerve 116 to the brain (not shown), where they are perceived as sound.

FIG. 1 also illustrates the positioning of bone conduction device 100 relative to outer ear 101, middle ear 102, and inner ear 103 of a recipient of device 100. Bone conduction device 100 comprises an external component 140 and implantable component 150. As shown, bone conduction device 100 is positioned behind outer ear 101 of the recipient and comprises a sound input element 126 to receive sound signals. Sound input element 126 may comprise, for example, a microphone. In an exemplary embodiment, sound input element 126 may be located, for example, on or in bone conduction device 100, or on a cable extending from bone conduction device 100.

More particularly, sound input device 126 (e.g., a microphone) converts received sound signals into electrical signals. These electrical signals are processed by the sound processor. The sound processor generates control signals which cause the actuator to vibrate. In other words, the actuator converts the electrical signals into mechanical motion to impart vibrations to the recipient's skull.

Alternatively, sound input element 126 may be subcutaneously implanted in the recipient or positioned in the recipient's ear. Sound input element 126 may also be a component that receives an electronic signal indicative of sound, such as, for example, from an external audio device. For example, sound input element 126 may receive a sound signal in the form of an electrical signal from an MP3 player electronically connected to sound input element 126.

Bone conduction device 100 comprises a sound processor (not shown), an actuator (also not shown), and/or various other operational components. In operation, the sound processor converts received sounds into electrical signals. These electrical signals are utilized by the sound processor to generate control signals that cause the actuator to vibrate. In other words, the actuator converts the electrical signals into mechanical vibrations for delivery to the recipient.

In accordance with some embodiments, a fixation system 162 may be used to secure implantable component 150 to skull 136. As described below, fixation system 162 may be a bone screw fixed to skull 136, and also attached to implantable component 150.

In one arrangement of FIG. 1, bone conduction device 100 can be a passive transcutaneous bone conduction device. That is, no active components, such as the actuator, are implanted beneath the recipient's skin 132. In such an arrangement, the active actuator is located in external component 140, and implantable component 150 includes a magnetic plate, as will be discussed in greater detail below. The magnetic plate of the implantable component 150 vibrates in response to vibration transmitted through the skin, mechanically and/or via a magnetic field, that is generated by an external magnetic plate.

In another arrangement of FIG. 1, bone conduction device 100 can be an active transcutaneous bone conduction device where at least one active component, such as the actuator, is implanted beneath the recipient's skin 132 and is thus part of the implantable component 150. As described below, in such an arrangement, external component 140 may comprise a sound processor and transmitter, while implantable component 150 may comprise a signal receiver and/or various other electronic circuits/devices.

Figure 2:
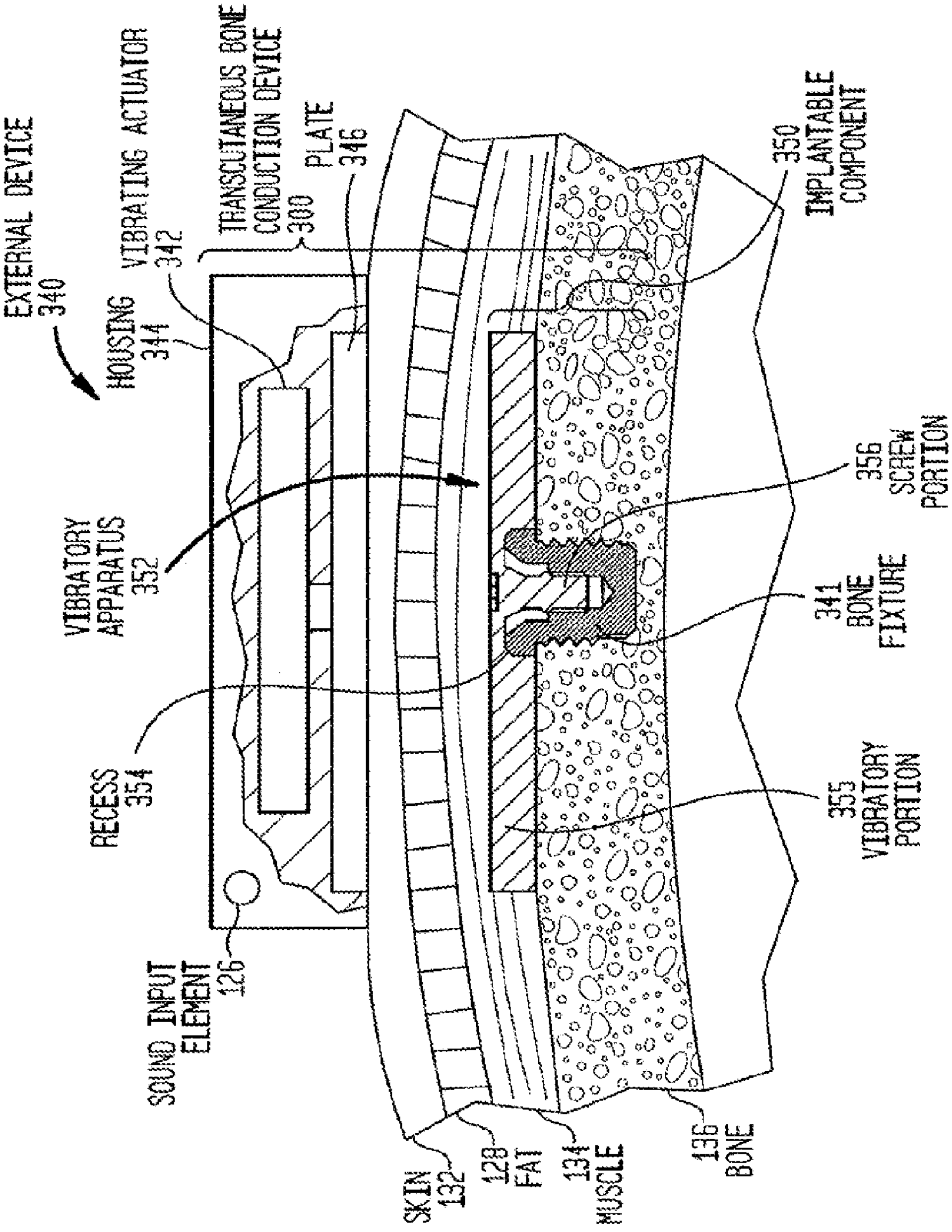
FIG. 2 is a schematic diagram conceptually illustrating a passive transcutaneous bone conduction device.

FIG. 2 depicts an exemplary transcutaneous bone conduction device 300 that includes an external device 340 (corresponding to, for example, element 140 of FIG. 1) and an implantable component 350 (corresponding to, for example, element 150 of FIG. 1). The transcutaneous bone conduction device 300 of FIG. 2 is a passive transcutaneous bone conduction device in that a vibrating actuator 342 (which can be an electromagnetic actuator or a piezoelectric actuator) is located in the external device 340. Vibrating actuator 342 is located in housing 344 of the external component and is coupled to plate 346. Plate 346 may be in the form of a permanent magnet and/or in another form that generates and/or is reactive to a magnetic field, or otherwise permits the establishment of magnetic attraction between the external device 340 and the implantable component 350 sufficient to hold the external device 340 against the skin of the recipient.

In an exemplary embodiment, the vibrating actuator 342 is a device that converts electrical signals into vibration. In operation, sound input element 126 converts sound into electrical signals. Specifically, the transcutaneous bone conduction device 300 provides these electrical signals to vibrating actuator 342, or to a sound processor (not shown) that processes the electrical signals, and then provides those processed signals to vibrating actuator 342. The vibrating actuator 342 converts the electrical signals (processed or unprocessed) into vibrations. Because vibrating actuator 342 is mechanically coupled to plate 346, the vibrations are transferred from the vibrating actuator 342 to plate 346. Implanted plate assembly 352 is part of the implantable component 350 and is made of a ferromagnetic material that may be in the form of a permanent magnet, that generates and/or is reactive to a magnetic field, or otherwise permits the establishment of a magnetic attraction between the external device 340 and the implantable component 350 sufficient to hold the external device 340 against the skin of the recipient. Accordingly, vibrations produced by the vibrating actuator 342 of the external device 340 are transferred from plate 346 across the skin to plate 355 of plate assembly 352. This can be accomplished as a result of mechanical conduction of the vibrations through the skin, resulting from the external device 340 being in direct contact with the skin and/or from the magnetic field between the two plates. These vibrations are transferred without penetrating the skin with a solid object, such as an abutment, with respect to a percutaneous bone conduction device.

As may be seen, the implanted plate assembly 352 is substantially rigidly attached to a bone fixture 341 in this embodiment. Plate screw 356 is used to secure plate assembly 352 to bone fixture 341. The portions of plate screw 356 that interface with the bone fixture 341 substantially correspond to an abutment screw discussed in some additional detail below, thus permitting plate screw 356 to readily fit into an existing bone fixture used in a percutaneous bone conduction device. In an exemplary embodiment, plate screw 356 is configured so that the same tools and procedures that are used to install and/or remove an abutment screw (described below) from bone fixture 341 can be used to install and/or remove plate screw 356 from the bone fixture 341 (and thus the plate assembly 352).

Figure 3:
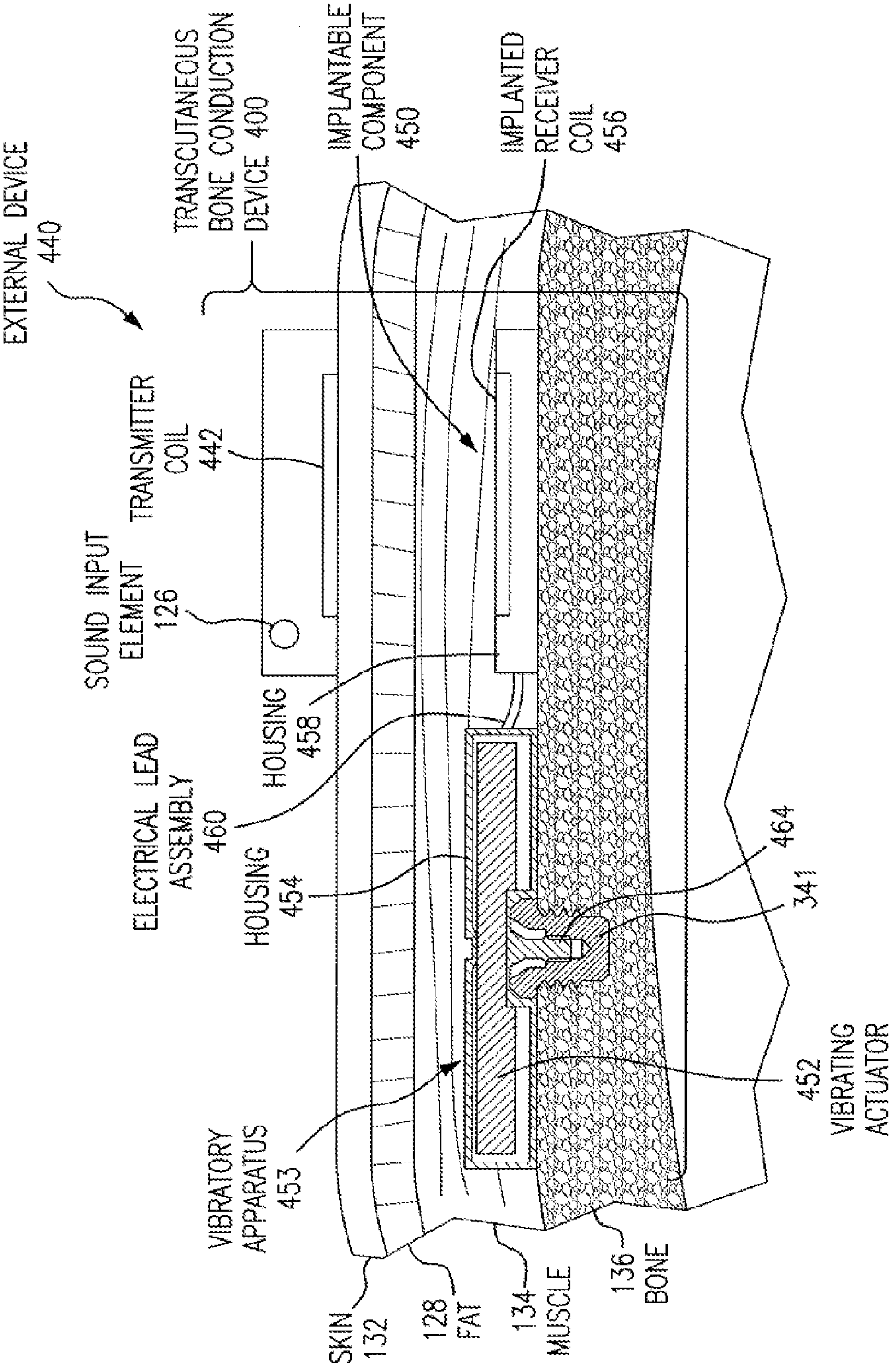
FIG. 3 is a schematic diagram conceptually illustrating an active transcutaneous bone conduction device in accordance with at least some exemplary embodiments.

FIG. 3 depicts an exemplary embodiment of a transcutaneous bone conduction device 400 according to another embodiment that includes an external device 440 (corresponding to, for example, element 140B of FIG. 1) and an implantable component 450 (corresponding to, for example, element 150 of FIG. 1). The transcutaneous bone conduction device 400 of FIG. 3 is an active transcutaneous bone conduction device in that the vibrating actuator 452 (which can be an electromagnetic actuator, or a piezoelectric actuator, etc.) is located in the implantable component 450. Specifically, a vibratory element in the form of vibrating actuator 452 is located in housing 454 of the implantable component 450. In an exemplary embodiment, much like the vibrating actuator 342 described above with respect to transcutaneous bone conduction device 300, the vibrating actuator 452 is a device that converts electrical signals into vibration.

External component 440 includes a sound input element 126 that converts sound into electrical signals. Specifically, the transcutaneous bone conduction device 400 provides these electrical signals to vibrating actuator 452, or to a sound processor (not shown) that processes the electrical signals, and then provides those processed signals to the implantable component 450 through the skin of the recipient via a magnetic inductance link. In this regard, a transmitter coil 442 of the external component 440 transmits these signals to implanted receiver coil 456 located in housing 458 of the implantable component 450. Components (not shown) in the housing 458, such as, for example, a signal generator or an implanted sound processor, then generate electrical signals to be delivered to vibrating actuator 452 via electrical lead assembly 460. The vibrating actuator 452 converts the electrical signals into vibrations.

The vibrating actuator 452 is mechanically coupled to the housing 454. Housing 454 and vibrating actuator 452 collectively form a vibratory apparatus 453. The housing 454 is substantially rigidly attached to bone fixture 341.

Figure 4:
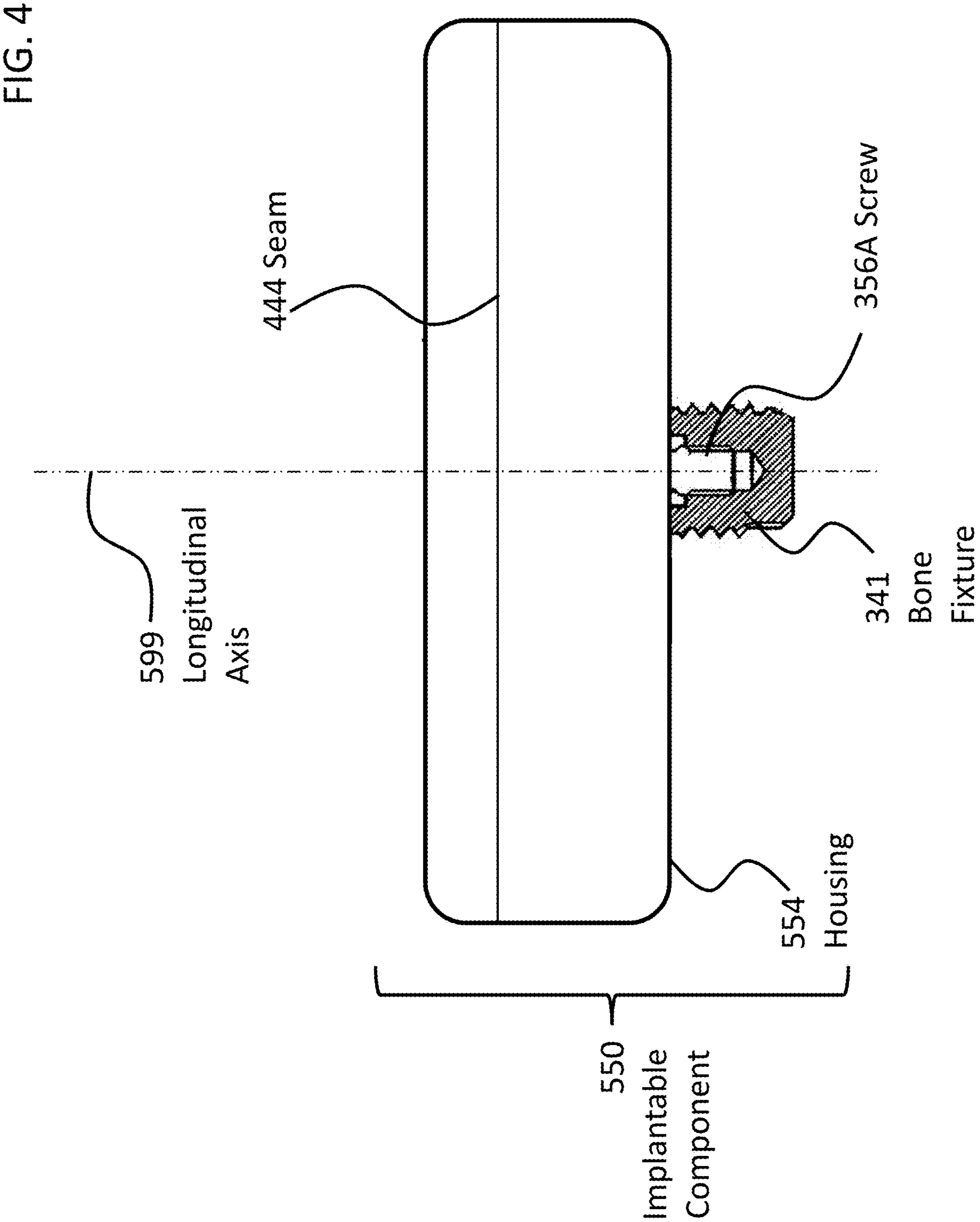
FIG. 4 is a schematic diagram of an outer portion of an implantable component of a bone conduction device.
Figure 5:
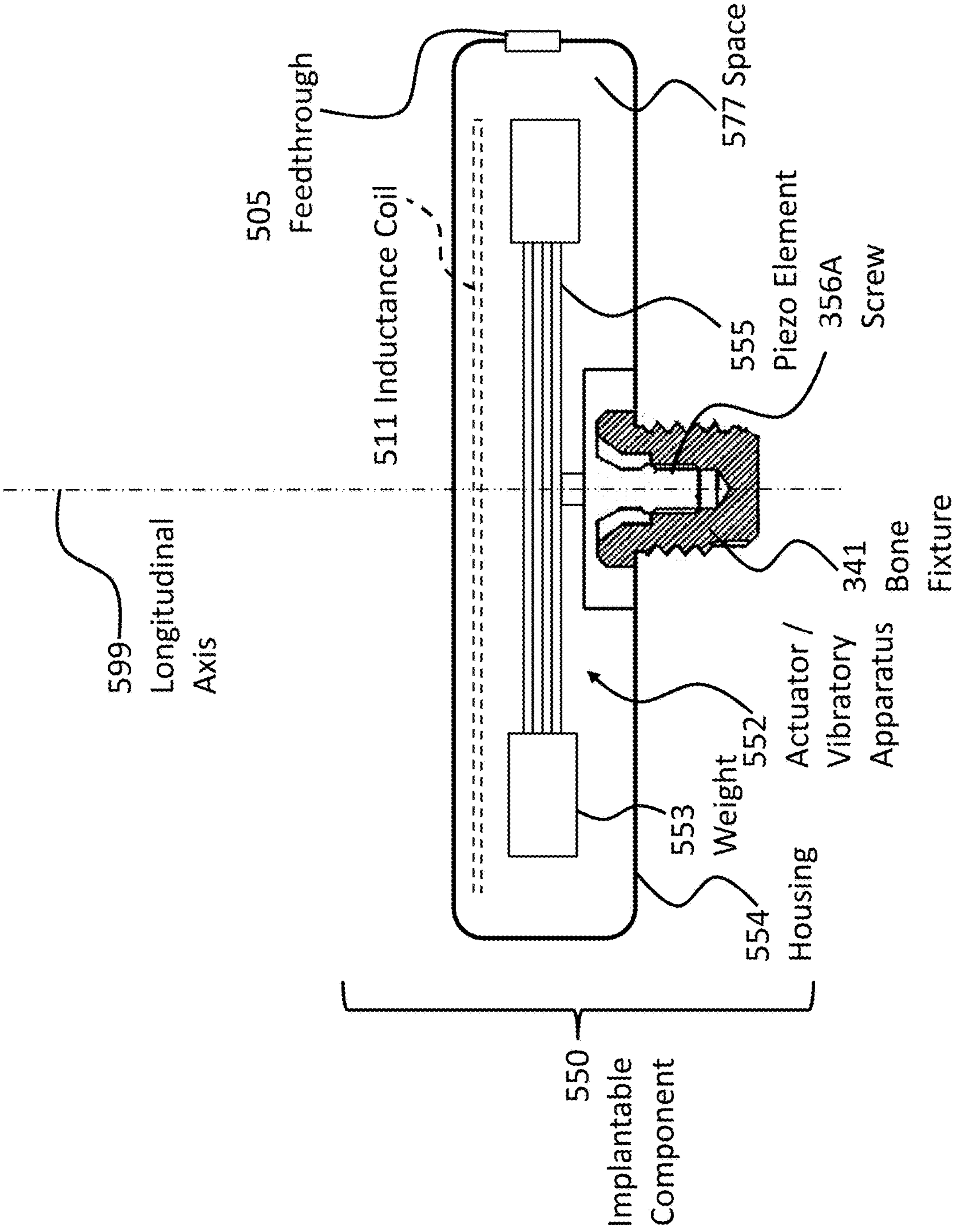
FIG. 5 is a schematic diagram of a cross-section of an exemplary implantable component of a bone conduction device.

FIGS. 4 and 5 depict another exemplary embodiment of an implantable component usable in an active transcutaneous bone conduction device, here, implantable component 550. FIG. 4 depicts a side view of the implantable component 550 which includes housing 554 which entails two housing bodies made of titanium in an exemplary embodiment, welded together at seam 444 to form a hermetically sealed housing. FIG. 5 depicts a cross-sectional view of the implantable component 550.

In an exemplary embodiment, the implantable component 550 is used in the embodiment of FIG. 3 in place of implantable component 450. As can be seen, implantable component 550 combines an actuator (corresponding with respect to functionality to actuator 452 detailed above) and, optionally, an inductance coil 511 (corresponding to coil 456 detailed above). Elements 555 plus 553 combine to establish a transducer-seismic mass assembly, sometimes herein referred to as an actuator and/or a vibratory apparatus, etc. Briefly, it is noted that the vibrating actuator 552 includes a so-called counterweight/mass 553 that is supported by piezoelectric components 555. In the exemplary embodiment of FIG. 5, the piezoelectric components 555 flex upon the exposure of an electrical current thereto, thus moving the counterweight 553. In an exemplary embodiment, this movement creates vibrations that are ultimately transferred to the recipient to evoke a hearing percept. Note that in some other embodiments, consistent with the embodiment of FIG. 4, the coil is located outside of the housing 553, and is in communication therewith via a feedthrough or the like. Any disclosure herein associated with one corresponds to a disclosure associated with the other, unless otherwise noted.

As can be understood from the schematic of FIG. 5, in an exemplary embodiment, the housing 554 entirely and completely encompasses the vibratory apparatus 552, but includes feedthrough 505, so as to permit the electrical lead assembly 460 to communicate with the vibrating actuator 452 therein. It is briefly noted at this time that some and/or all of the components of the embodiment of FIG. 5 are at least generally rotationally symmetric about the longitudinal axis 559. In this regard, the screw 356A is circular about the longitudinal axis 559. Back lines have been omitted for purposes of clarity in some instances.

Figure 6:
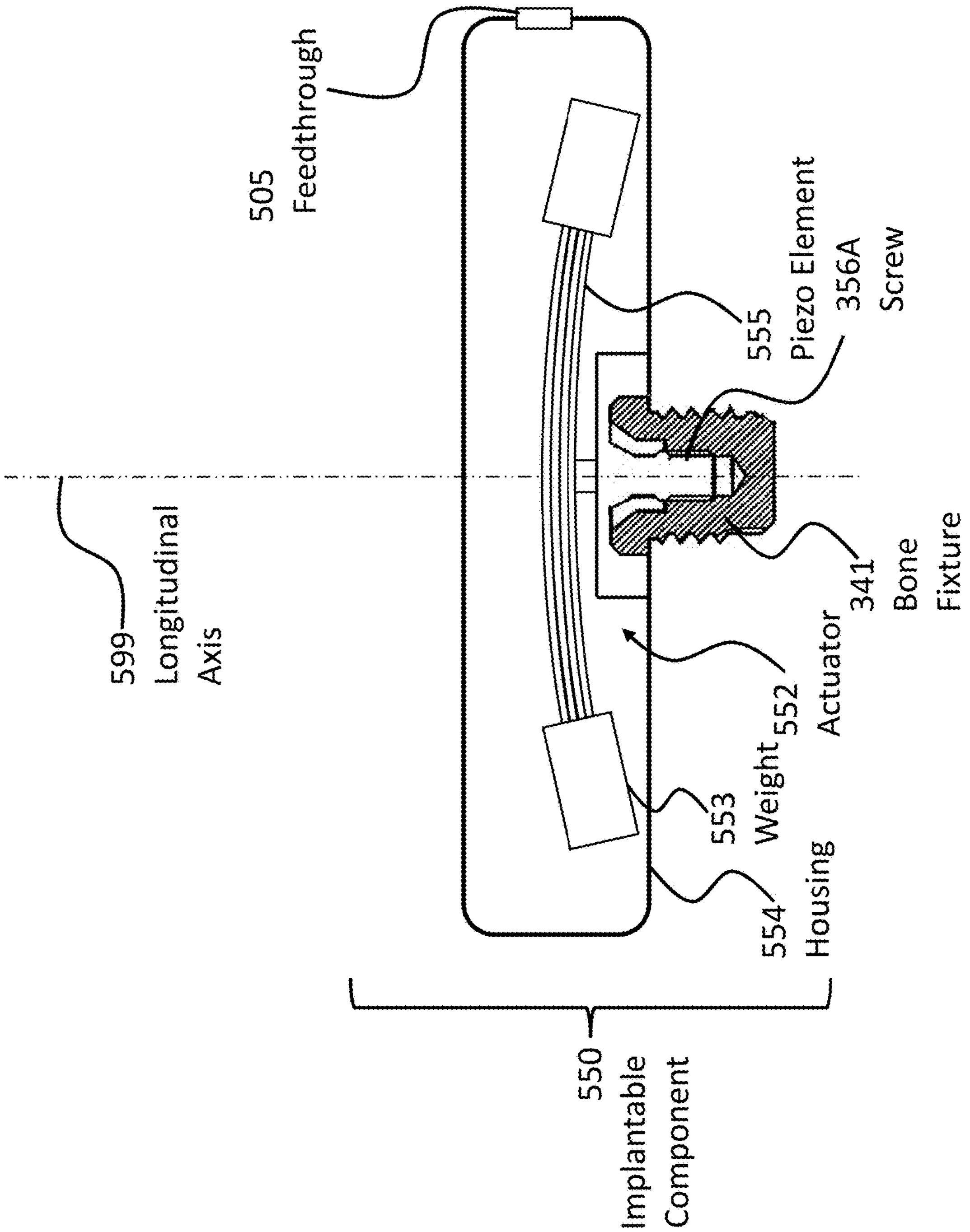
FIG. 6 is a schematic diagram of a cross-section of the exemplary implantable component of FIG. 5 in operation.

Still with reference to FIG. 5, as can be seen, there is a space 577 located between the housing 554 in general, and the inside wall thereof in particular, and the counterweight 553. This space has utilitarian value with respect to enabling the implantable component 550 to function as a transducer in that, in a scenario where the implantable component is an actuator, the piezoelectric material 555 can flex in a bending manner (the piezoelectric component 555 is a bender—in an exemplary embodiment, a two or more layer element produces curvature when one layer expands while the other layer contracts—these transducers are often referred to as benders, bimorphs, or flexural elements), which can enable the counterweight 553 to move within the housing 554 so as to generate vibrations to evoke a hearing percept. FIG. 6 depicts an exemplary scenario of movement of the piezoelectric material 555 when subjected to an electrical current along with the movement of the counterweight 553. As can be seen, space 577 provides for the movement of the actuator 552 within housing 554 so that the counterweight 553 does not come into contact with the inside wall of the housing 554. There can exist a failure mode with this device. Specifically, in a scenario where prior to the attachment of the housing 554 and the components therein to the bone fixture 341, the housing and the components therein are subjected to an acceleration above certain amounts and/or a deceleration above certain amounts, the piezoelectric material 555 will be bent or otherwise deformed beyond its operational limits, which can, in some instances, have a deleterious effect on the piezoelectric material.

Figure 7:
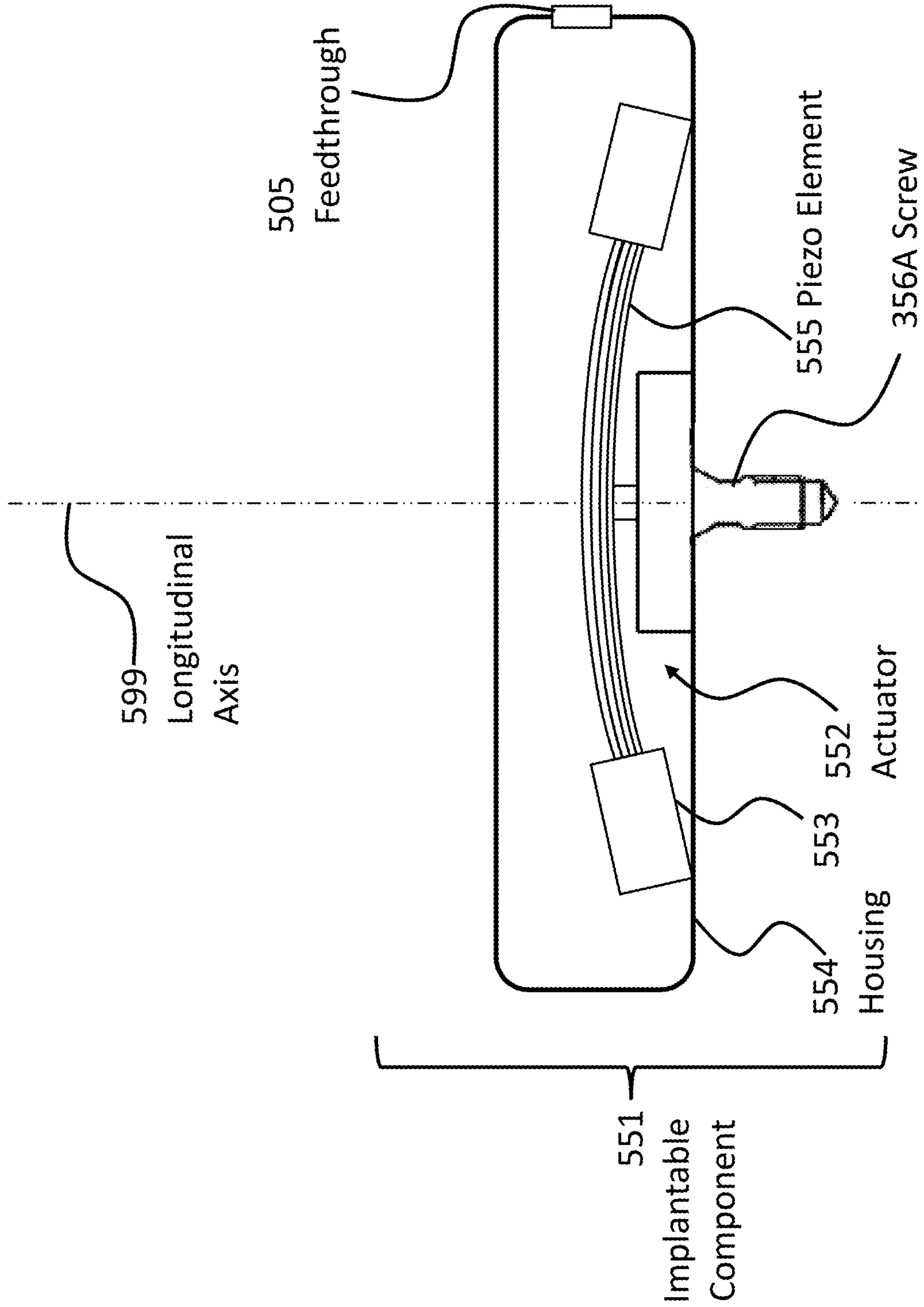
FIG. 7 is a schematic diagram of a cross-section of the exemplary implantable component of FIG. 5 in a failure mode.

FIG. 7 depicts an exemplary failure mode, where implantable subcomponent 551 (without bone fixture 541) prior to implantation into a recipient (and thus prior to attachment to the bone fixture 541) is dropped from a height of, for example, 30 cm, or from 1.2 meters, etc., onto a standard operating room floor or the like. The resulting deceleration causes the piezoelectric material 555, which is connected to the counterweight 553, to deform as seen in FIG. 7. This can break or otherwise plastically deform the piezoelectric material 555 (irrespective of whether the counterweight 553 contacts the housing walls, in some embodiments—indeed, in many embodiments, the piezoelectric material 555 will fail prior to the counterweights contacting the walls—thus, FIG. 7 is presented for purposes of conceptual illustration). The teachings detailed herein are directed towards avoiding such a scenario when associated with such decelerations and/or accelerations.

It is noted that while much of the disclosure herein is directed to a piezoelectric transducer, the teachings herein can also be applicable to an electromagnetic transducer. Thus, any disclosure associated with one corresponds to a disclosure of such for the other, and vis-versa.

Figure 8:
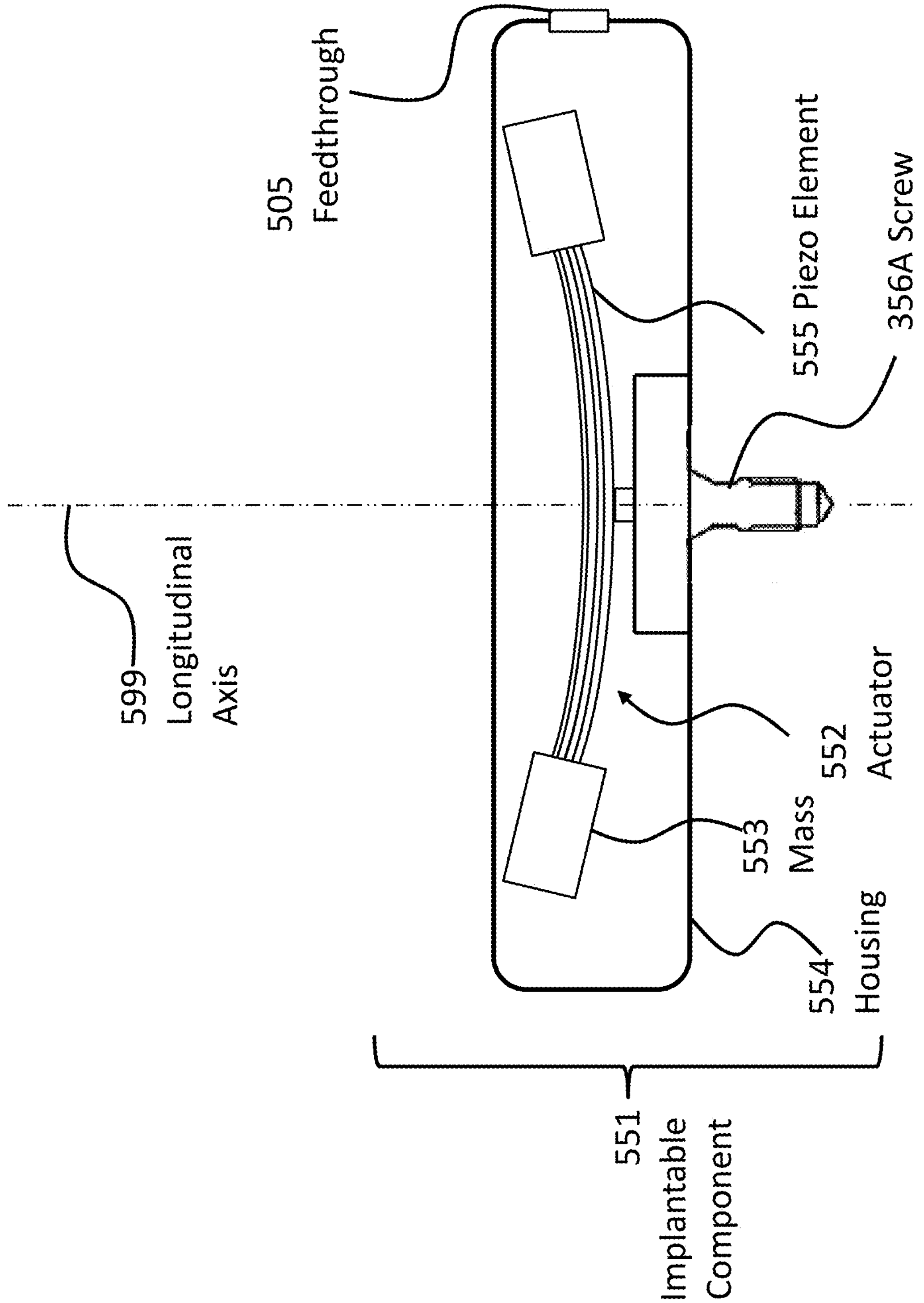
FIG. 8 is another schematic diagram of a cross-section of the exemplary implantable component of FIG. 5 in a failure mode.

Still further, it is noted that in at least some exemplary embodiments of a transcutaneous bone conduction device utilizing a piezoelectric actuator, it may not necessarily be the case that FIG. 7 represents a scenario that results in, all the time, a failure mode. That is, in some embodiments, the scenario depicted in FIG. 7 does not result in a failure mode for all types of piezoelectric actuators. In at least some exemplary embodiments, it is the "bounce back" from the initial deflection and the momentum that carries the piezoelectric material past the at rest position in the other direction that causes a failure mode. That is, by way of example only and not by way of limitation, there can be, in some scenarios, a reaction such that after the piezoelectric material 555 is deformed as depicted in FIG. 7 (or, in some instances, approximately thereabouts, or, in some instances, more than that which usually results from activation of the transducer in even extreme operational scenarios), the piezoelectric material deforms oppositely towards its at rest position, but owing to the fact that it was deformed a substantial amount as depicted in FIG. 7 (or as just described), as the piezo material springs/bounces back to the "at rest" position, the counterweights 553 have momentum which causes the piezoelectric material to deform in the opposite direction, as depicted by way of example in FIG. 8. In fact, in some instances, even though the counterweights 553 specifically, or the piezoelectric actuator in general, do not contact the inside of the housing 554, as was the case in FIG. 7, this "flapping" can cause the piezoelectric material 555 to break or otherwise permanently deform in a manner that does not have utilitarian value. To be clear, this phenomenon can also be the case with respect to the scenario FIG. 7, except where the counterweight 553 did not contact the inside the housing 554. That is, in at least some exemplary embodiments, the flapping can cause permanent damage to the piezoelectric material 555 irrespective of whether or not the counterweights 553 or other components of the piezoelectric actuator contact the housing. In at least some exemplary embodiments of the teachings detailed herein and/or variations thereof, this permanent damage is prevented from occurring, or otherwise the likelihood of such permanent damage is reduced, some exemplary embodiments of achieving such prevention and/or reduction will now be described.

It is noted that the phrase "flapping" and the phrase "flap," as used herein, does not connote a failure mode per se. Indeed, the normal operation of the device 551 of FIG. 5 is to flap (in a bending manner—more on this below). It is the amount of flap that causes the failure mode.

Figure 9:
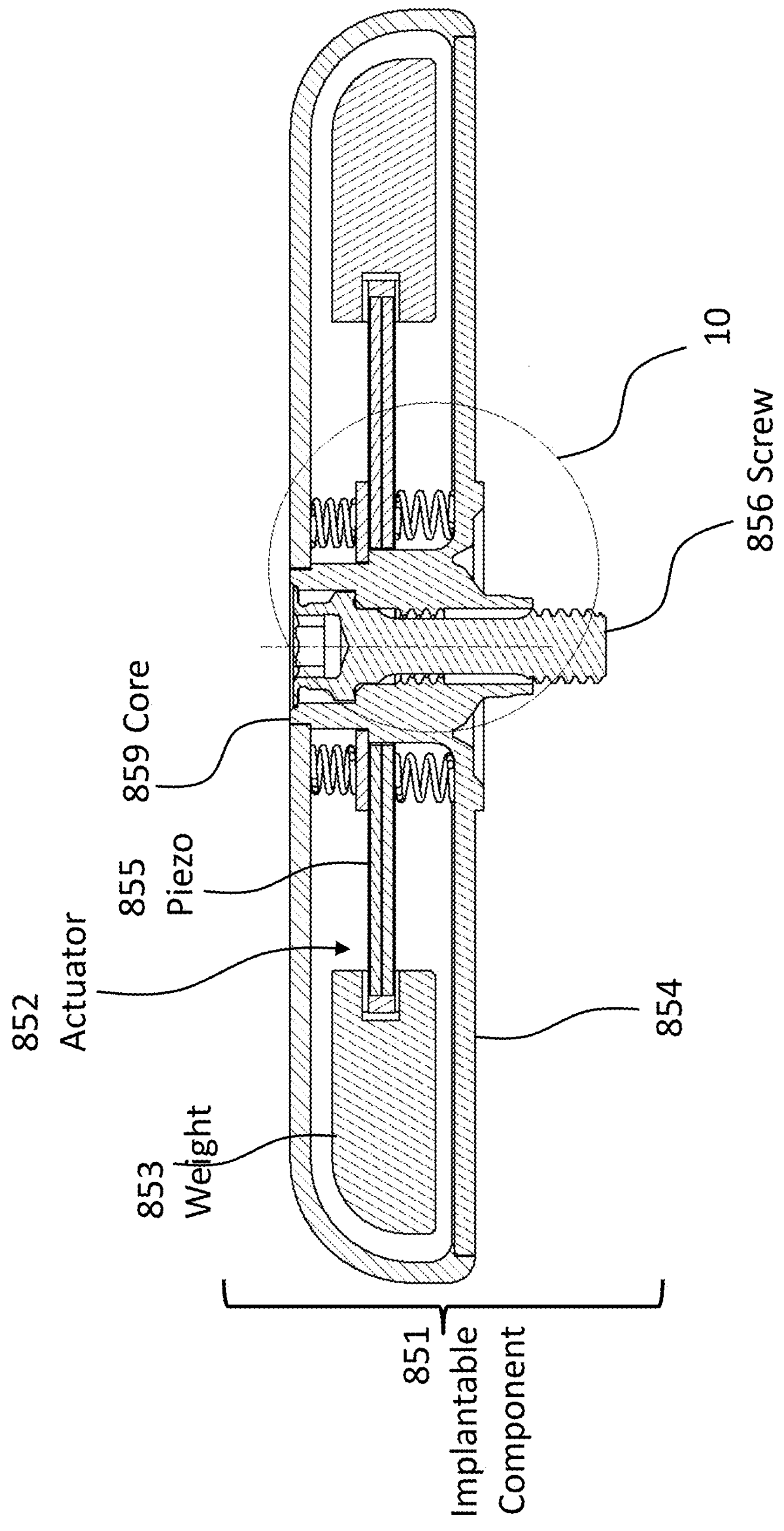
FIGS. 9-11 present various exemplary shock-proofing apparatuses.

FIG. 9 depicts a cross-section through the geometric center of subcomponent 851. Implantable subcomponent 851 includes a housing 854 that encases an actuator 852, which actuator includes a piezoelectric material 855 corresponding to material 555 of FIG. 7, and a counterweight 853 that corresponds to the counterweight 553 of FIG. 7. Also seen in FIG. 9 is that the housing 854 includes a core 859. In this exemplary embodiment, the core 859 is an integral part with the bottom of the housing. The core 859 has a passage through which screw 856 extends, which screw is configured to screw into the bone fixture implanted into the bone of the recipient so as to fix the implantable subcomponent 851 to bone of the recipient. In this exemplary embodiment, the core 859 is such that the screw 856 can extend therethrough while maintaining a hermetically sealed environment within the housing (e.g., the housing subcomponent that forms the top of the housing 854 can be laser welded at the seams with the housing subcomponent that forms the bottom of the housing 854 and the core 859).

Figure 10:
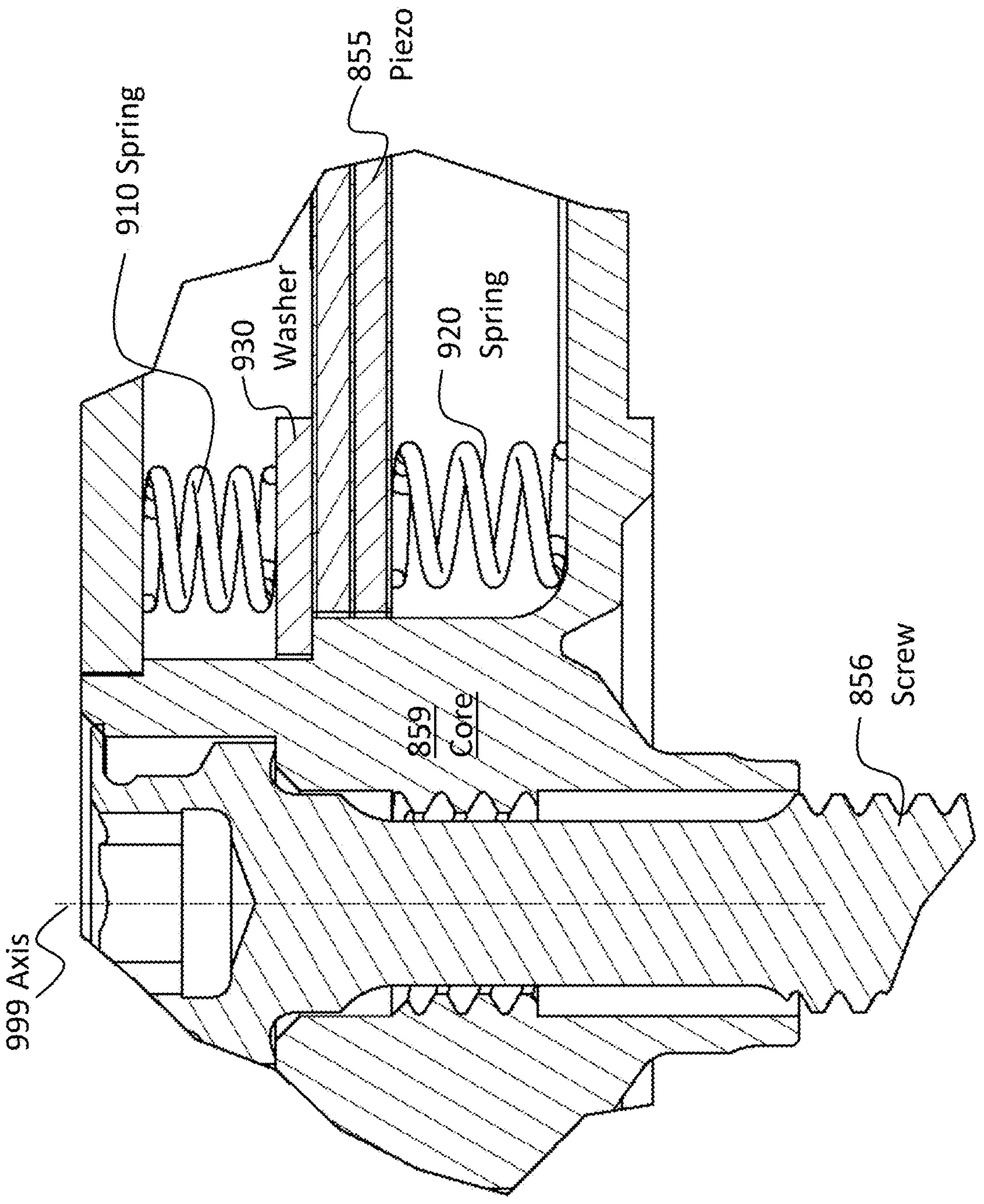

FIG. 10 depicts a larger view of a portion of the embodiment of FIG. 9. As can be seen, the piezoelectric material 855 is coated with a coating, thereby establishing the piezoelectric component. In some alternate embodiments, the piezoelectric material has no coating. Hereinafter, any use of the phrase piezoelectric material corresponds to a disclosure of piezoelectric material with coating, and thus a disclosure of a piezoelectric component, as well as a disclosure of a piezoelectric material without a coating (which still can be a piezoelectric component—there is just no coating), unless otherwise specified. The piezoelectric component 855 is clamped between two springs 910 and 920. A washer 930 is interposed between the top spring 910 and the piezoelectric material 855. Thus, the clamping of the piezoelectric component is in part, indirect by the springs. Where there is a washer at the bottom, as is the case in some embodiments, the clamping would be totally indirect by the springs, whereas in some exemplary embodiments, where there is no washer 930, and the springs directly contact the piezoelectric component, the clamping is totally direct.

In an exemplary embodiment, the springs 910 and 920 provide shock-proofing to the implantable subcomponent 851. The springs permit the entire piezoelectric component 855 to move upwards and/or downwards when subjected to a high acceleration and/or a high deceleration. This is as opposed to the scenario where only a portion of the piezoelectric component moves when exposed to these high accelerations, as is the case in some of the other embodiments herein. In this regard, the combination of the piezoelectric component and the counterweight creates a transducer-seismic mass assembly. In an exemplary embodiment, the springs permit the entire transducer-seismic mass assembly to move upwards and/or downwards when subjected to a high acceleration and/or a high deceleration. Again, this is as opposed to a scenario where only a portion of that transducer-seismic mass assembly moves, as is the case with respect to some other embodiments.

It is noted that the embodiment of FIG. 9 provides, via springs 910 and 920 and the associated components, a centralized support for the bender that results in a mounting force. In an exemplary embodiment, the mounting force provides a function of mounting the piezoelectric bender in the housing that is analogous to the arrangement that results if the bender is hard mounted/rigidly fixed to the core 859 vis-à-vis positioning the transducer-seismic mass assembly in the housing. Thus, the arrangement seen in FIG. 9 provides a variable mounting force. The limitations on the bending of the piezoelectric material from the stopping force occur at outboard locations.

Exemplary embodiments include impulse force damper(s) disposed between a component of the transducer (or, in some embodiments, the transducer-seismic mass assembly—more on this below). Impulse force damper assemblies, in at least some exemplary embodiments, fills the space/gap between the mass and the housing, while in other embodiments, are present in the gap but do not fill the space. In some embodiments, impulse force dampers substantially absorb impulse forces created by physical movement of transducer along the vibration axis.

Figure 11:
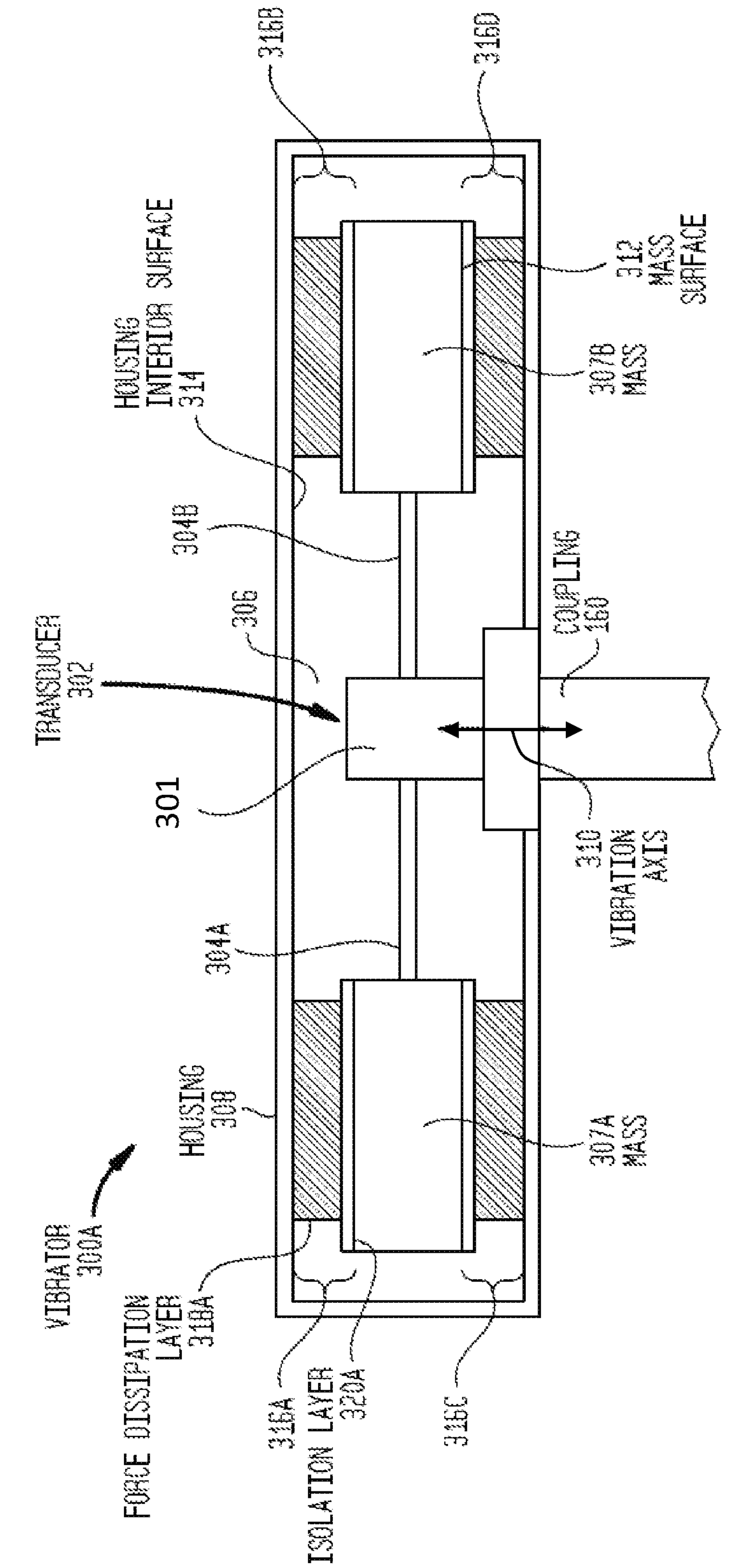

Referring to FIG. 11, vibrator 300A has a transducer 302 supported by a support 301 which is mechanically fixed to the wall of the housing 308. The transducer 302 includes a piezoelectric component that includes sides 304A, 304B, respectively (which collectively correspond to piezoelectric component 555 detailed above), where masses 307A, 307B are supported by the piezoelectric component in general, and the sides 304A and 304B respectively. In some embodiments, the interior of the housing 308 is filled with an inert gas 306. In an exemplary embodiment, the interior of the housing 308 is filled with argon.

Each mass 307 is formed of material such as tungsten, tungsten alloy, brass, etc., and may have a variety of shapes. Additionally, the shape, size, configuration, orientation, etc., of each mass 307A and 307B can be selected to increase the transmission of the mechanical force from piezoelectric transducer 302 to the recipient's skull and to provide a utilitarian frequency response of the transducer. In certain embodiments, the size and shape of each mass 307A and 307B is chosen to ensure that there is utilitarian mechanical force is generated and to provide a utilitarian response of the transducer 302.

In specific embodiments, masses 307A and 307B have a weight between approximately 1 g and approximately 50 g (individually). Furthermore, the material forming masses 307 can have a density, e.g., between approximately 2000 kg/m3 and approximately 22000 kg/m3. As shown, the vibrator includes a coupling 160 which is presented in generic terms. In some embodiments, the coupling is a coupling that connects to a bone fixture, while in other embodiments the coupling is a coupling that connects to a skin interface pad that abuts the skin of the recipient.

Transducer 302 is suspended in housing 308 such that there is a distance between the housing 308 and the masses, which enables vibration of transducer 302 in vibration axis 310. In the embodiment illustrated in FIG. 11, impulse force damper assemblies 316A-D are disposed between housing interior surface 314 and the adjacent surfaces 312 of masses 307 to substantially fill the respective distances between housing interior surface 314 and juxtaposed mass surface 312. In at least some embodiments, impulse force damper assemblies 316A-D limit or otherwise prevent a rapid acceleration and deceleration of masses 307A and B. Such movement may cause a significant impulse force to be applied to piezoelectric component. For ease of description, impulse force damper assembly 316A will be described below. With the exceptions noted below, the description of impulse force damper assembly 316A applies to impulse force dampers assemblies 316B-D.

In certain embodiments, impulse force damper assembly 316A includes at least two layers, an elastic force dissipation layer 318A and an isolation layer 320A.

Thus, exemplary impulse force damper assembly 316A is configured to achieve impulse force dissipation through a combination of deformation of an elastic material exhibiting sufficiently low stiffness and shear damping via substantial gross slip along the interface where a surface of impulse force damper assembly 316A abuts an adjacent layer or surface. In one embodiment, impulse force dissipation layer 318A comprises a cured liquid silicone rubber.

In certain embodiments, impulse force dissipation layer 318A comprises a material having one of more of the following: an ASTM technical standard D2240 Durometer Type OO scale value less than or equal to about 40; a Tensile Strength of about 325 psi; an Elongation of about 1075%; a Tear Strength of about 60 ppi; a Stress at 100% Strain of about 10 psi; a Stress at 300% Strain of about 30 psi; and a Stress at 500% Strain of about 65 psi. A commercially available example of such a material is Model No. MED 82-50 1 0-02 (a type of liquid silicone rubber) manufactured by NUSIL® Technology, LLC, in a cured state.

Thus, in the embodiment of FIG. 11, impulse force dissipation layer 318A is configured to exhibit non-negligible adhesion to housing surface 314 and substantially no adhesion to isolation layer 320A. This enables impulse force damper 316A to dissipate energy through a combination of deformation and shear damping along the interface between with isolation layer 320A. Shear damping refers to the lateral sliding or slipping of the layers 318A and 320A, which is possible due to lack of adhesion between the layers.

In the embodiment above with respect to FIG. 11, the piezoelectric component is a bender.

Figure 12:
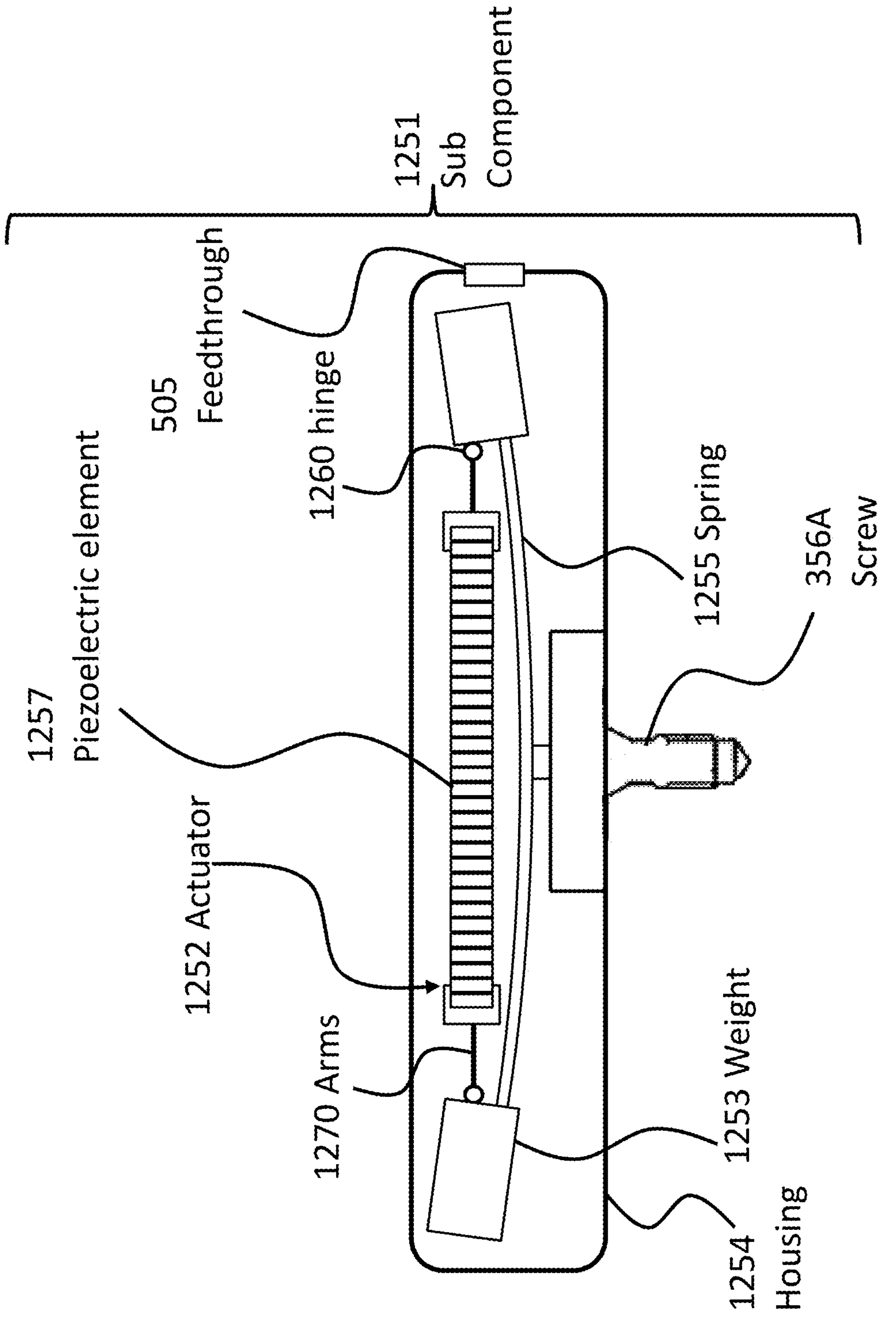
FIG. 12 presents an exemplary embodiment of an exemplary transducer assembly.

FIG. 12 depicts an exemplary embodiment of an exemplary implantable subcomponent 1251 having utilitarian value in that such can reduce the likelihood of the occurrence of (which includes eliminating the possibility of occurrence of) the failure mode associated with that depicted in FIG. 7, and the variations detailed above. That said, in some embodiments, this device can still experience the occurrence of the above failure mode. Further, it is noted that this device, in some embodiments, can in fact not reduce the likelihood of the occurrence of the above. The ability of the device of FIG. 12 and/or the other devices detailed below to resist or otherwise address the failure mode detailed above with respect to FIG. 7 is but an exemplary embodiment of some of these embodiments, and other embodiments do not have this ability or otherwise, to the extent the ability is present, may be de minimis.

FIG. 12 depicts a cross-section through the geometric center of the subcomponent 1251 (which is sometimes referred to herein as component, for linguistic simplicity). Implantable subcomponent 1251 includes a housing 1254 that encases an actuator 1252, which actuator includes a piezoelectric material 1257 which does not correspond to that of FIG. 7, but which is different, a spring 1255 which supports counterweights 1253 that functionally, with respect to evoking a hearing percept, corresponds to the counterweight 553 above, in that it establishes at least part of a seismic mass.

Exemplary embodiments for the below embodiments will typically be described in terms of an implantable housing/implantable sub-component of a bone conduction device. However, the below teachings are also applicable to passive transcutaneous bone conduction devices and percutaneous bone conduction devices where the housing, etc., is located outside the recipient. Thus, any disclosure herein with respect to an implantable device corresponds to a disclosure of another embodiment where the device is not implantable or otherwise as part of a component that is external to the recipient.

Moreover, the teachings detailed herein can be applicable to any type of mechanical actuator, such as that used in a conventional hearing aid. Also, the teachings detailed herein can be utilized for any type of transducer, such as, for example, a microphone.

Still with reference to FIG. 12, the counter weight 1253 is fixed to the spring 1255, which can be a leaf spring or the like. Here, the spring 1255 bends as does the piezoelectric element of FIG. 5 above. However, the bending is driven by the piezoelectric element 1257 which is not part of the spring 1255. The piezoelectric element 1257, in this exemplary embodiment, does not bend. Instead, the piezoelectric element is a contractor and/or an extender piezoelectric element. This as distinct from a bender.

In the embodiment of FIG. 12, the piezoelectric element 1257 is a piezoelectric stack. In this regard, the piezoelectric element comprises a plurality of layers stacked one on top of the other, in the horizontal direction. In an exemplary embodiment, when an electric field having a given polarity is placed across the thickness of the sheets of the piezoelectric material, the piece expands in the thickness or longitudinal direction, and can contract in the transverse direction (perpendicular to the axis of polarization). When the electric field having the opposite polarity is placed across the thickness of the sheets, the piece contracts in the thickness or longitudinal direction, and can expand in the transverse direction. The piezoelectric actuator 1252 includes any number of piezoelectric layers that are stacked one on top of the other that can enable the teachings detailed herein. In an exemplary embodiment, again, 1257 is a piezoelectric stack.

That said, in an exemplary embodiment, 1257 can be a piezoelectric layer that is configured to contract or expand in the transverse direction. Further, in some embodiments, 1257 can be a plurality of piezoelectric layers that are layered one on top of the other, while still being contractors and extenders. In an exemplary embodiment, a multilayered element behaves like a single layer when both layers expand or contract together. If an electric field is applied which makes the element thinner, extension along the length and width results. Indeed, in some embodiments, the layering can generally correspond to the layers of a bender detailed above. That said, with respect to a bender, one layer expands and/or contracts more than the other layer, which causes the bending. In embodiments associated with FIG. 12, and unless otherwise noted, this phenomenon specifically does not occur in the embodiments herein and below.

Figure 13:
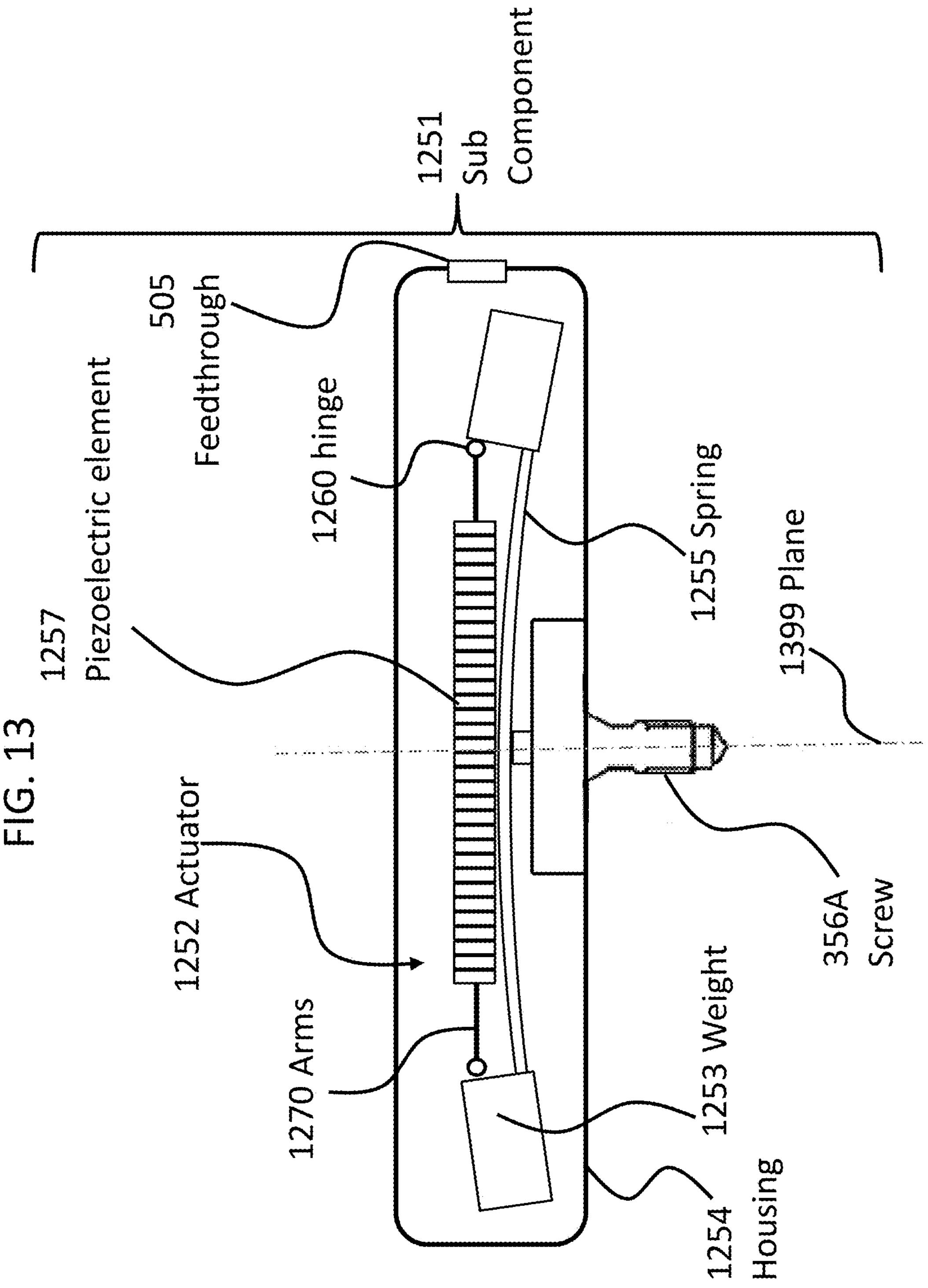
FIG. 13 presents a depiction of the embodiment of FIG. 12 in operation.

FIG. 12 depicts the piezoelectric stack 1257 in a contracted state. FIG. 13 depicts the piezoelectric stack 1257 in an extended state. As can be seen, this has the effect of at least enabling the seismic mass 1253 (there are two here, one on each side—in some embodiments, there are more than two seismic masses—any arrangement of seismic masses that can enable the teachings detailed herein can be utilized in at least some exemplary embodiments), to move from the position in FIG. 12 to the position in FIG. 13. Upon contraction from the expanded state, the piezoelectric stack moves to the configuration seen in FIG. 12, and so on, which causes the piezoelectric seismic mass assembly (spring and seismic mass) to flap. Here, the flapping is due to the bending of the spring.

In the embodiment of FIG. 12, there are hinge components 1260 which are connected to arms 1270 which are connected to brackets of the actuator 1252 which transfer the force of the piezoelectric element as a result of expansion and/or contraction to the seismic masses 1253 as can be seen. In this embodiment, the hinges are fixed to the seismic masses. This can have utilitarian value with respect to enabling a device where the contraction of the piezoelectric elements "pulls" the seismic masses 1253 towards each other, and thus causes the spring 1255 to flex upwards, and thus moves the seismic masses upwards. The extension of the piezoelectric element 1257 push is the seismic masses away from each other, and thus causes the spring to bend downward and thus move the seismic masses downward. This causes the spring-seismic mass assembly to flap.

In the above embodiment, the relaxed state of the spring is a flat spring. In an exemplary embodiment, this corresponds to a relaxed state of the piezoelectric stack 1257. That said, in an exemplary embodiment, the relaxed state of the spring can be bent/flexed upwards and/or downwards. In an exemplary embodiment, the relaxed state could be as depicted in FIGS. 12 and/or 13. The piezoelectric stack would be configured accordingly.

Moreover, in an exemplary embodiment, the piezoelectric stack is controlled such that the application of voltage thereto occurs only when it is desired that the stack extend or contract, but not both. In this regard, the contraction could be the result of the piezoelectric element returning to its relaxed state, which could occur by simply eliminating the current applied thereto. Alternatively, the contraction can correspond to that which results from the application of electric current, and the removal of the electric current causes the piezoelectric stack to expand towards its relaxed state. Any combination or permutation of a relaxed spring that is flat or is bent and a relaxed state and/or expanded state and/or a contracted state of the piezoelectric stack/piezoelectric element that can have utilitarian value can be utilized in at least some exemplary embodiments.

Briefly, as will be described in greater detail below, some embodiments include a piezoelectric element that is a "shearer." Accordingly, in an exemplary embodiment there is a component of a bone conduction device, such as sub component 1251, which includes a housing, such as housing 554 or 1254, etc., and which also includes a flapper apparatus located in the housing. The flapper apparatus comprises the piezoelectric actuator, the spring, the seismic mass, and the accompanying components that support such/hold such together. In an exemplary embodiment, the flapper apparatus includes a piezoelectric apparatus that is a contractor and/or an extender and/or a shearer.

In the embodiment of FIGS. 12 and 13, the piezoelectric apparatus is a contractor in some instances, an extender in other instances, and a contractor-extender any other instances. It is noted that with respect to the aforementioned classifications, such as based on how the piezoelectric apparatus is utilized when electricity is applied thereto. For example, in an exemplary embodiment, a piezoelectric stack can be a contractor-extender if positive and negative voltages are applied in an alternating manner, but only an extender if only positive voltage is applied or only a contractor if only negative voltages applied (or vice versa).

In the embodiment of FIGS. 12 and 13, the component (sub-component) is configured to convert a non-bending movement of the piezoelectric apparatus into a bending movement of the flapper apparatus. That said, some embodiments do not include devices that have a bending movement, but instead have a rigid flapping movement.

Figure 14:
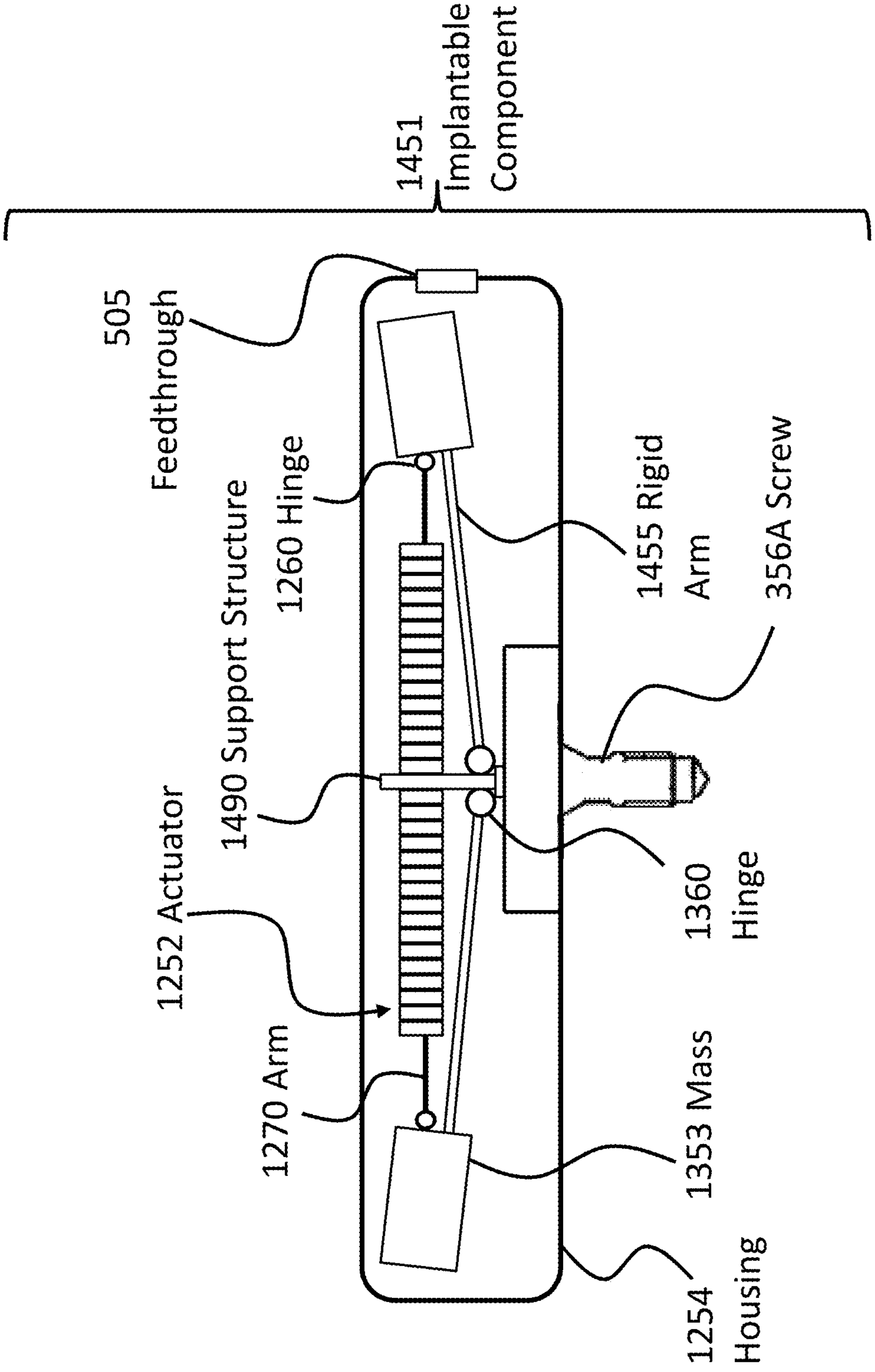
FIGS. 14-22 and 26-31 and 33-35 present additional exemplary embodiments of exemplary transducer assemblies.

Briefly, it is noted that the phrase "flapping" as used herein covers the bending of FIGS. 12 and 13, and the rigid flapping of FIG. 14 as will be described below. Bending does not include the embodiment of FIG. 14. In this regard, FIG. 14 presents an exemplary subcomponent 1451 that includes a flapper apparatus established by seismic masses 1353, actuator 1252, which can correspond to the actuator of FIGS. 12 and 13, arms 1270 and hinges 1260. Also included in this flapper apparatus is a first and second rigid arm 1455, which are rigidly connected to the masses 1353 on one end, and connected to respective hinges 1360 at the other end. In an exemplary embodiment, where FIG. 14 depicts the actuator 1252 in its relaxed state (here, the actuator is an extender, although in an alternate embodiment, FIG. 14 could represent a contractor-extender in its contracted state), the masses 1353 are pulled upwards by the actuator. Upon actuation of the actuator, the piezoelectric stack expands and pushes the masses 1353 outward and thus downward, owing to the reaction of the system about hinges 1360. When current is cut off from the piezoelectric elements, the piezoelectric stack contracts and thus pulls the masses 1353 inward and thus upward (owing to the reaction of the hinges), causing the flapper apparatus to flap. Here, the flapping is rigid because the "wings" do not bend. The wings move as a single body/solid body that does not deform during the flapping. This as opposed to the embodiment of FIG. 13, where the spring deforms during the flapping.

As can be seen, support structure 1490, which can correspond to a plate that is secured at least indirectly to housing 554, bifurcates the piezoelectric stack. In some embodiments, two separate actuators are located where actuator 1252 is present. That said, in some embodiments, the piezoelectric elements are electrically connected through plate 1490, and thus effectively correspond to a single actuator. Plate 1490 provides a reaction force for the piezoelectric stack so that the flapper apparatus remains "balanced." If there was no plate 1490, in some embodiments, one of the wings would simply fall towards the bottom of the housing and the other would move towards the top of the housing, and actuation of the actuator would simply result in some rattling inside the housing in at least some embodiments. That said, in some alternate embodiments, the system is sufficiently configured such that plate 1490 is not present and is not necessary to keep the system "balanced." This can be arranged by utilizing careful tolerancing and placement of the components in some embodiments. Indeed, in an exemplary embodiment, hinges 1360 are torsion hinges. The hinges 1360 can bias the system, such as with a counter-clockwise torque on the right arm 1455, and a clockwise torque on the left arm 1455, which will balance the system. In an exemplary embodiment, the actuator 1252 is strong enough to overcome this torque and cause the flapper apparatus to flap. Any arrangement that can enable the teachings detailed herein can be utilized in at least some exemplary embodiments.

Thus, in an exemplary embodiment, the sub component is configured to convert a non-bending movement of the piezoelectric apparatus into a rigid flapping movement of the flapper apparatus.

Figure 15:
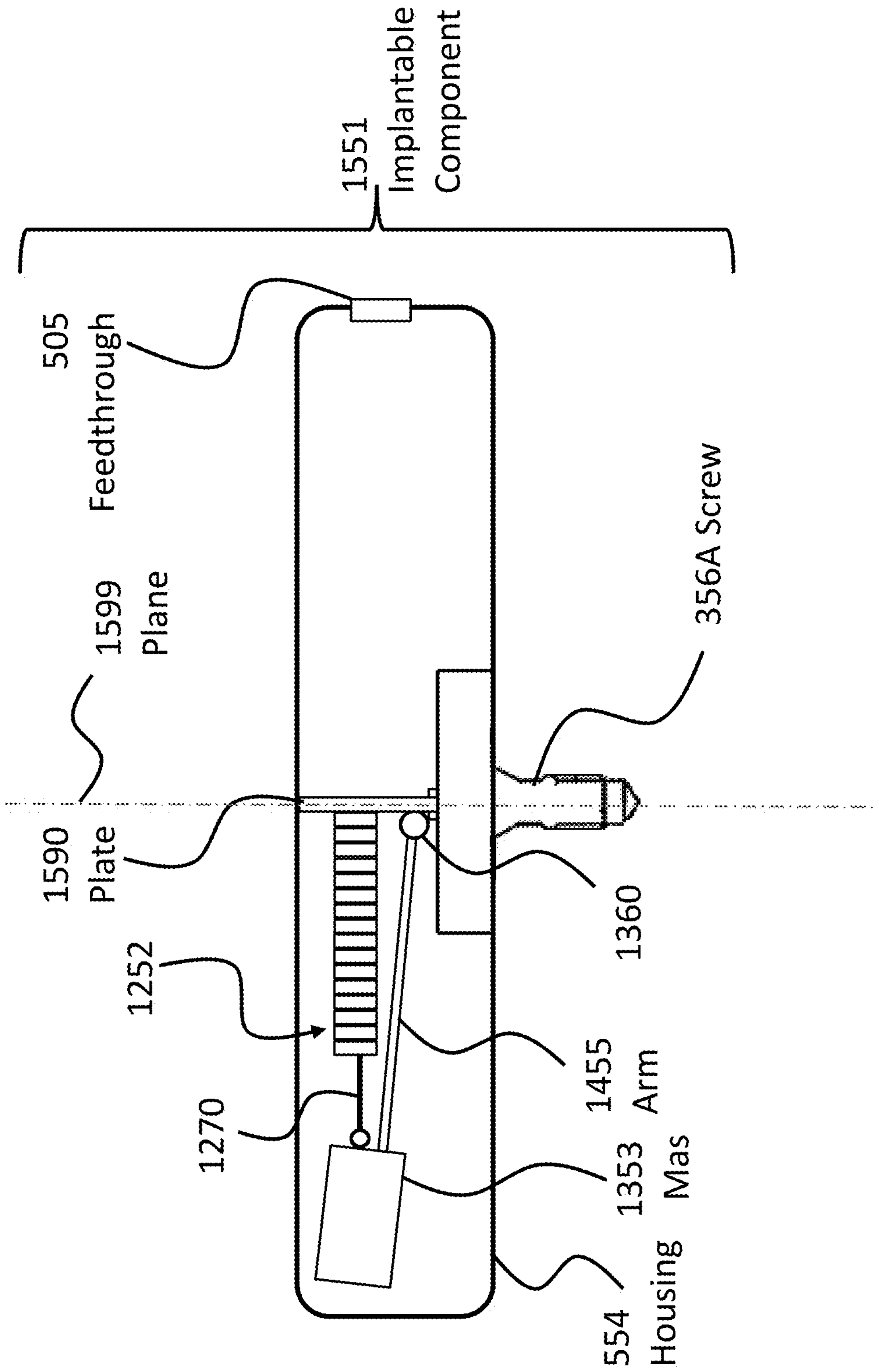

FIG. 15 presents an exemplary embodiment of an implantable component 1551 including a flapper apparatus that has rigid flapping. Here, it can be seen that the flapper is a nonsymmetrical flapper, as opposed to the embodiments detailed above. Briefly, with respect to the plane 1599 seen in FIG. 15, which plane is a plane of symmetry with respect to the flapper apparatus, or at least some of the components thereof, or at least the output of the flapper apparatus, with respect to the embodiments of FIGS. 12, 13, and 14 detailed above, here, the flapper apparatus is not so symmetrical about that plane. In fact, effectively all of the components save a portion of plate 1590 (which has been extended to the top of the housing for additional support) lie to the left of the plane 1599. This is not the case with the embodiments detailed above.

Accordingly, in an exemplary embodiment, there are components as detailed herein where the flapper apparatus is an effectively symmetrical apparatus, such as seen in FIGS. 12, 13 and 14, and in an alternate exemplary embodiment, there are components as detailed herein where the flapper apparatus is effectively asymmetrical.

Briefly, it is noted that any disclosure herein of structure according to the teachings detailed herein corresponds to a disclosure of a component that includes at least some structural components that are symmetrical about a given plane and/or a disclosure of a flapper apparatus that is symmetrical about a given plane. In some embodiments, the apparatuses disclosed herein are rotationally symmetrical while in other embodiments the apparatuses are symmetric about a given plane but not rotationally symmetric.

In an exemplary embodiment, the symmetry is achieved via weight and/or spatial location and/or center of gravity of components, etc. In this regard, providing that the center of gravities are arranged properly and the movements of the various components are properly choreographed, there can be effectively symmetrical apparatuses that are not structurally symmetrical. That said, in some alternate embodiments, there are effectively symmetrical apparatuses that are structurally symmetrical.

Returning back to the embodiment of FIG. 15, while this embodiment has been presented in terms of a rigid flapper (albeit with one wing—one wing can flap), in an alternative embodiment, arm 1455 can be replaced by a spring, such as a leaf spring.

It is also noted that in some embodiments, both a rigid structure and a flexible structure can be combined, as will be described in greater detail below.

In an exemplary embodiment, as seen above, the flapper apparatus includes at least two counterweights located at least generally symmetrically with respect to the flapper apparatus. It is noted that in an exemplary embodiment, other structural components may not be generally symmetrical. In an exemplary embodiment, it is the center of gravities of the wings of the flapper apparatus that are symmetrical.

It is noted that the aforementioned disclosures associated with symmetrical embodiments correspond to that which is the case when there is no current that is applied to the actuator. In an exemplary embodiment, the flapper apparatuses can be configured such that they remain effectively symmetrical even when current is applied to the actuator. In an exemplary embodiment, the flapper apparatuses can be configured such that they remain effectively symmetrical during a full flap (up-down-up, or vice versa).

In an exemplary embodiment, the counterweights rotate during flapping of the flapper apparatus at least about equally and opposite to one another. That said, in some alternate embodiments, the counterweights do not rotate, as will be described in greater detail below. Still further, in some alternate embodiments, the counterweights rotate during flapping, but do not rotate at least about equally and/or opposite to one another.

The embodiments of FIGS. 12, 13, 14, and 15 presents a flapper apparatus that includes a counterweight, and a counterweight support structure. In the embodiment of FIGS. 12 and 13, the counterweight support structure corresponds to the spring. In the embodiment of FIG. 14, the counterweight support structure includes the arms and the hinges. In at least some exemplary embodiments, the flapper apparatus is configured such that the piezoelectric apparatus extends substantially parallel to the support structure that supports the counterweight.

In an exemplary embodiment, again where the flapper apparatus includes a counterweight and a counterweight support structure, the flapper apparatus is configured such that a force generated by the piezoelectric apparatus is applied directly onto at least one of the counterweight or the support structure to move the counterweight in a vibratory manner. This is the case with the embodiment of FIG. 12, where the force generated by the actuator 1252 is applied directly to the counterweight.

Figure 16:
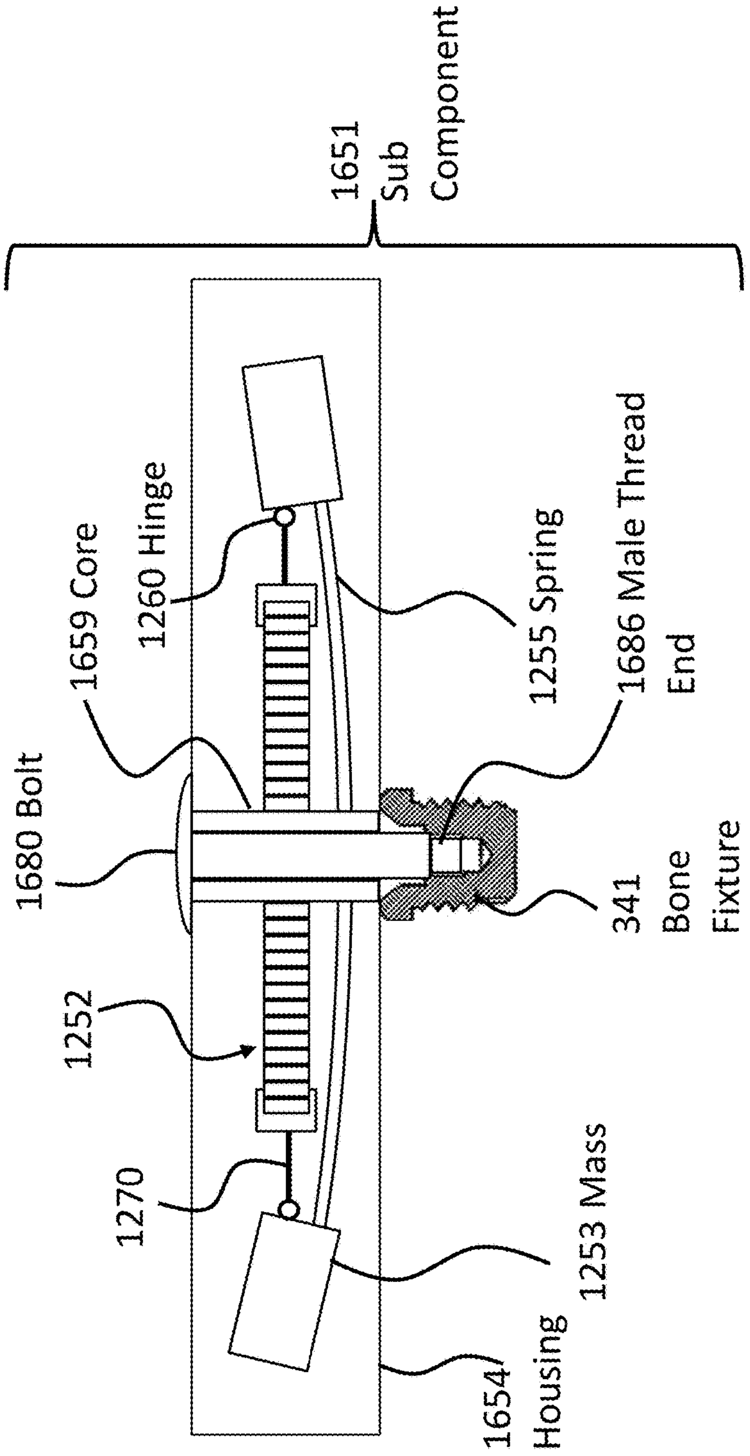

FIG. 16 depicts an alternate embodiment of a sub component, sub component 1651, according to an exemplary embodiment. In the embodiment of FIG. 12, bolt 1680 extends to the bone fixture 341 and is screwed therein during attachment of the housing 1654 to the already implanted bone fixture 341 so as to establish the implantable component 1651. In this regard, bolt 1680 includes a male threaded end 1686 that threads into female threads located within bone fixture 341. This operates as an effective jackscrew to pull the head of the bolt 1680 downward towards the bone fixture 341, thus driving the housing 1654 onto the fixture 341, thus securing the housing to the fixture 341. As seen, core 1659 separates the passage for the bolt from the interior of the housing. It is noted that in alternate embodiments, the bolt does not extend through the housing, but instead the threaded boss is attached to the outside of the housing.

In the embodiment of FIG. 16, the piezoelectric stack is fixed to the core 1659. In this exemplary embodiment, the core 1659 has flats to accommodate the generally flat surfaces of the piezoelectric layers. That said, in an alternate embodiment, a block of metal or plastic, etc., having a rectangular or square outer profile and a circular inner profile with a hole therethrough is fit around the core 1659, which provides an interface between the piezoelectric elements and the core. Indeed, in an exemplary embodiment, the actuator 1252 is an assembly that includes the aforementioned rectangular outer profile component, that is slipped over the court 1659 during manufacturing, so as to position the actuator in the housing 1654.

An alternate embodiment includes an actuator assembly that "floats" around the core 1659. In this exemplary embodiment, the aforementioned body having the hole therethrough is configured such that the hole has a larger diameter than the outer diameter of the core 1659. The diameter is sufficiently large enough to accommodate any play in the system that can occur during actuation to have the flapper apparatus flap. Accordingly, the actuator assembly never contacts the core 1659.

Figure 17:
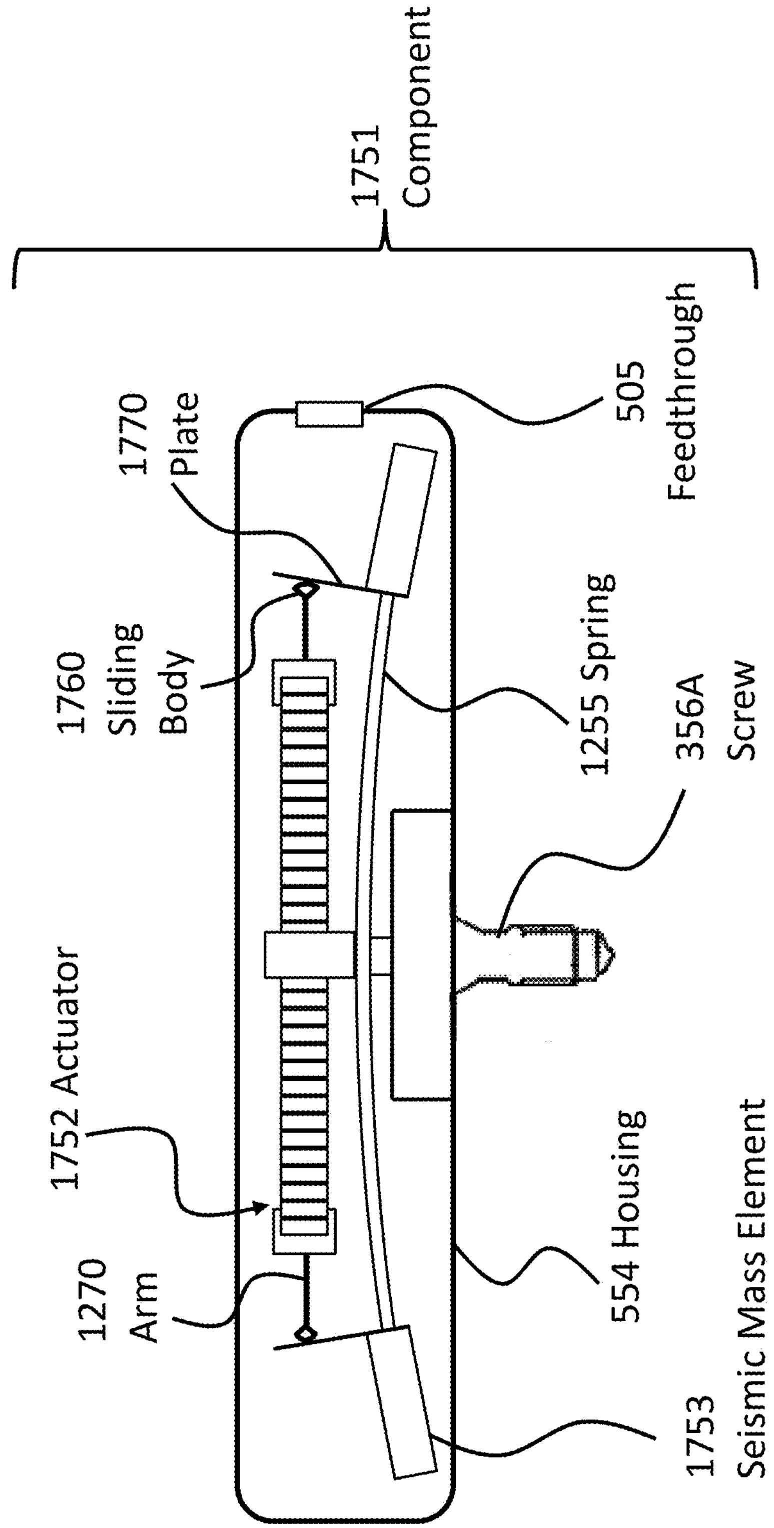
Figure 18:
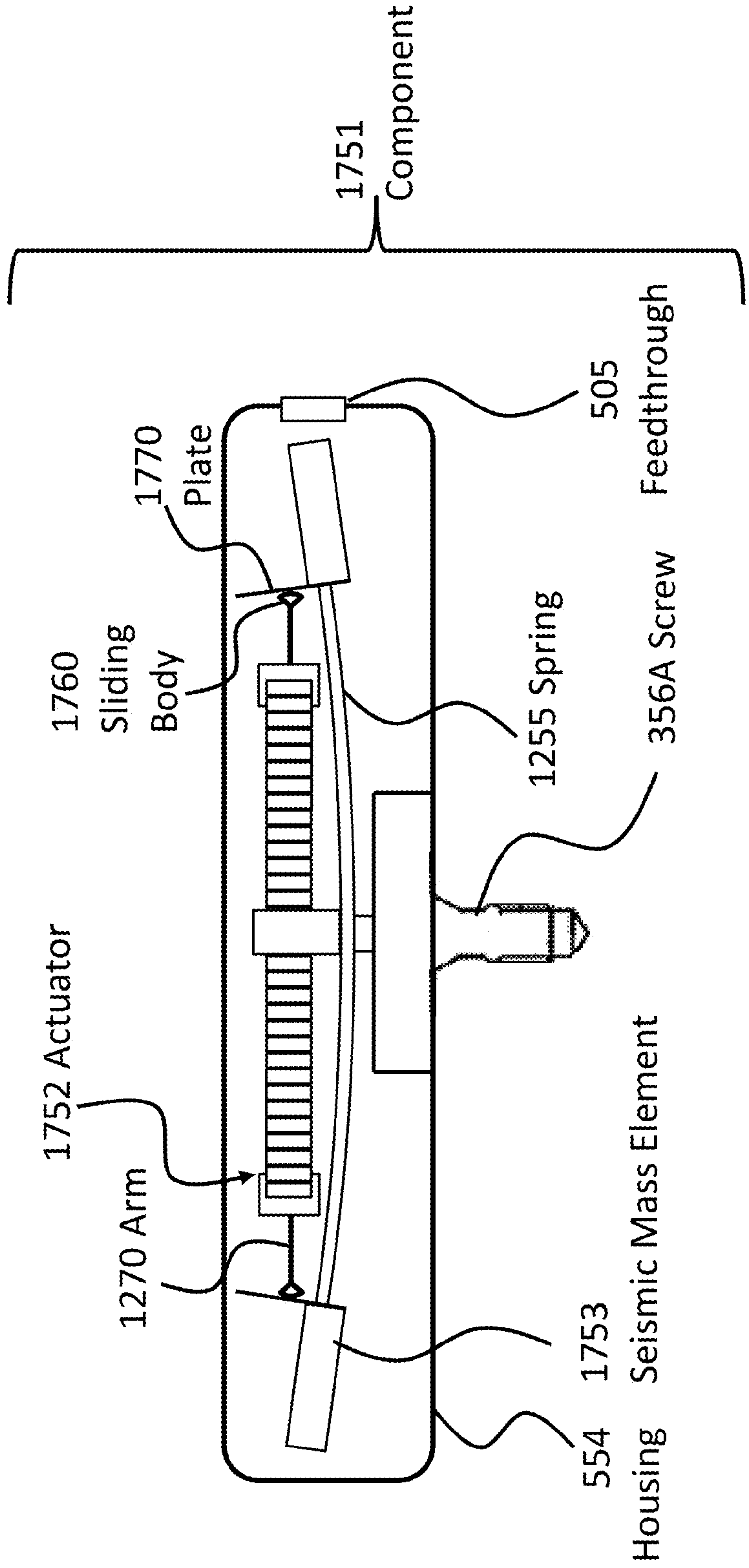

FIG. 17 depicts an alternate embodiment of a component 1751 where the actuator 1752 is not fixed to the spring-seismic mass assembly made up of seismic mass elements 1753 (which, in some embodiments, are tungsten blocks) and spring 1255. By way of example only and not by way of limitation, a sliding body 1760, which can correspond to a hemispherical body of metal supported by armed 1270 abuts plate 1770. Here, spring 1255 is pretensioned so that it seeks to be in the state that it is in FIG. 18 (in an alternate embodiment, it can be the case as shown in FIG. 17, and in an alternate embodiment, the spring can be such that in its relaxed state, it is flat), and the actuator 1752 is in its relaxed state or its expanded state (note that the relaxed state can be a compressed state—the phrase relaxed state as used with respect to the piezoelectric elements correspond to that which is the case when there is no current being applied thereto—this is differentiated from the relaxed state of the spring, for example, where there is no force being applied thereto). In an exemplary embodiment, the actuator 1752 prevents the spring from further bending upwards. Upon actuation of the actuator, which can cause the actuator to contract, as seen in FIG. 18, the spring 1255 springs upward driving the masses 1753 upward. This is because the contraction of the actuator 1752 moves the sliding surfaces 1760 inward, thus relieving the force that is applied to plates 1770 (which owing to the resulting moments created thereby, push the spring downward as shown in FIG. 17), and thus the spring seeking to return to its relaxed state of FIG. 18, drives the masses 1753 upward, thus causing the flapper apparatus to flap upwards. Upon the application of a current to cause the actuator 1752 to expand, the actuator applies a force onto the plates 1770, thus causing the flapper to flap downwards. The slider element 1760 slide along the surface of plate 1770. They are not fixed to each other in this embodiment. The surfaces of the slider elements in the surfaces of the plates are low friction surfaces and/or can be coated with a lubricant.

Thus, it can be seen that in an exemplary embodiment, such as the embodiments of FIGS. 12, 13, 14, and 15, the piezoelectric apparatus applies at least one of a push force or a pull force onto an assembly including a seismic mass to move the seismic mass in a vibratory manner. Further, in an exemplary embodiment, such as that seen in FIGS. 17 and 18 and variations thereof, the piezoelectric apparatus applies only a push force, in an alternate embodiment, the piezoelectric apparatus applies only a pull force. Some additional features of this will be described below.

Figure 19:
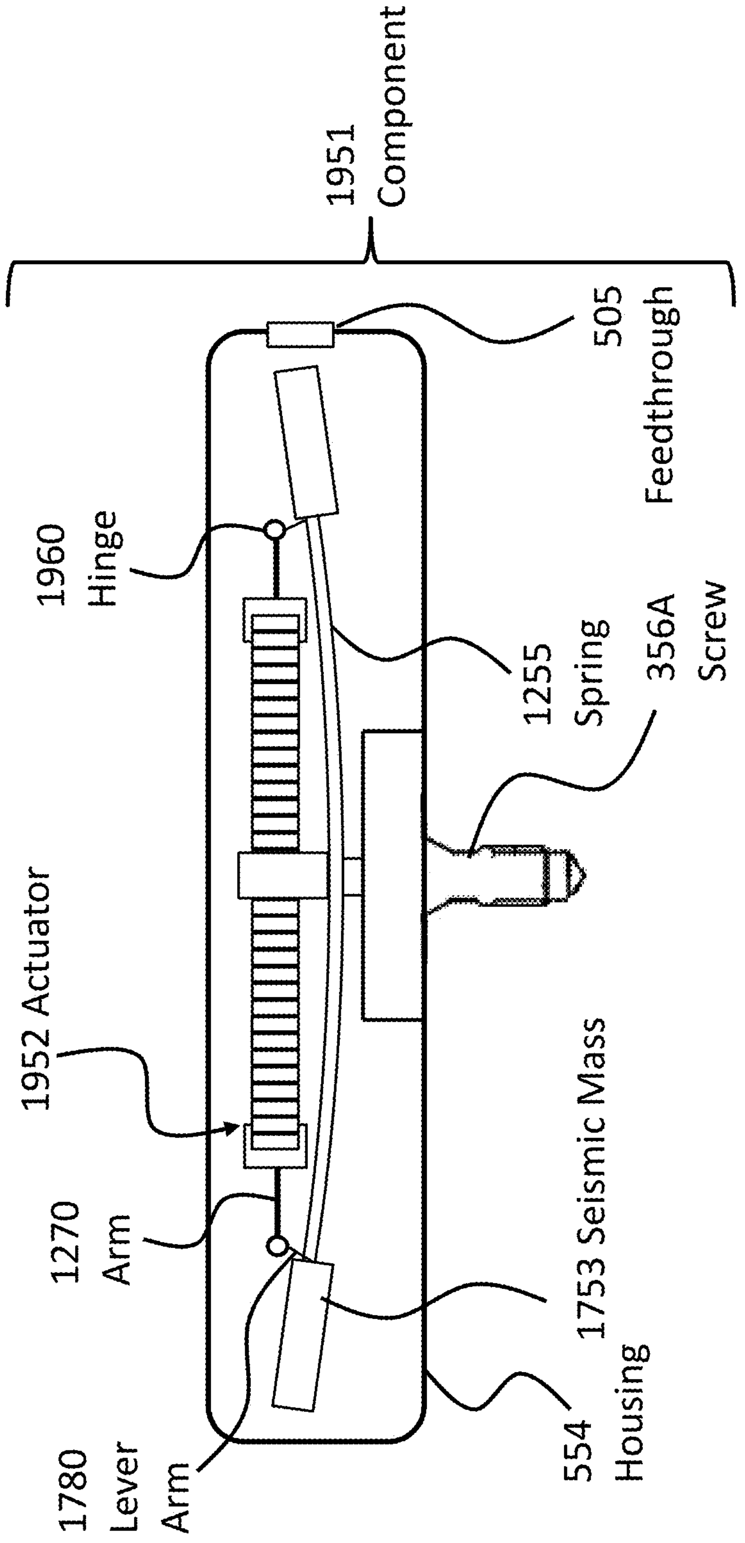

FIG. 19 presents an alternate embodiment of a component 1951 that utilizes lever arms as they connection between the actuator and the seismic mass and/or the supports thereof. Here, a lever arm 1780 is attached to the hinge 1960 on the arm 1270. This lever arm 1780 can provide for force transfer from the actuator 1952 to the seismic mass and/or the support thereof while also providing rigid decoupling but maintaining coupling between the two components. It is also noted that in an alternate embodiment, instead of a hinge 1960, a spring can be used (a living hinge for example—all disclosures herein of a hinge corresponds to a disclosure of a living hinge, unless otherwise noted).

Figure 20:
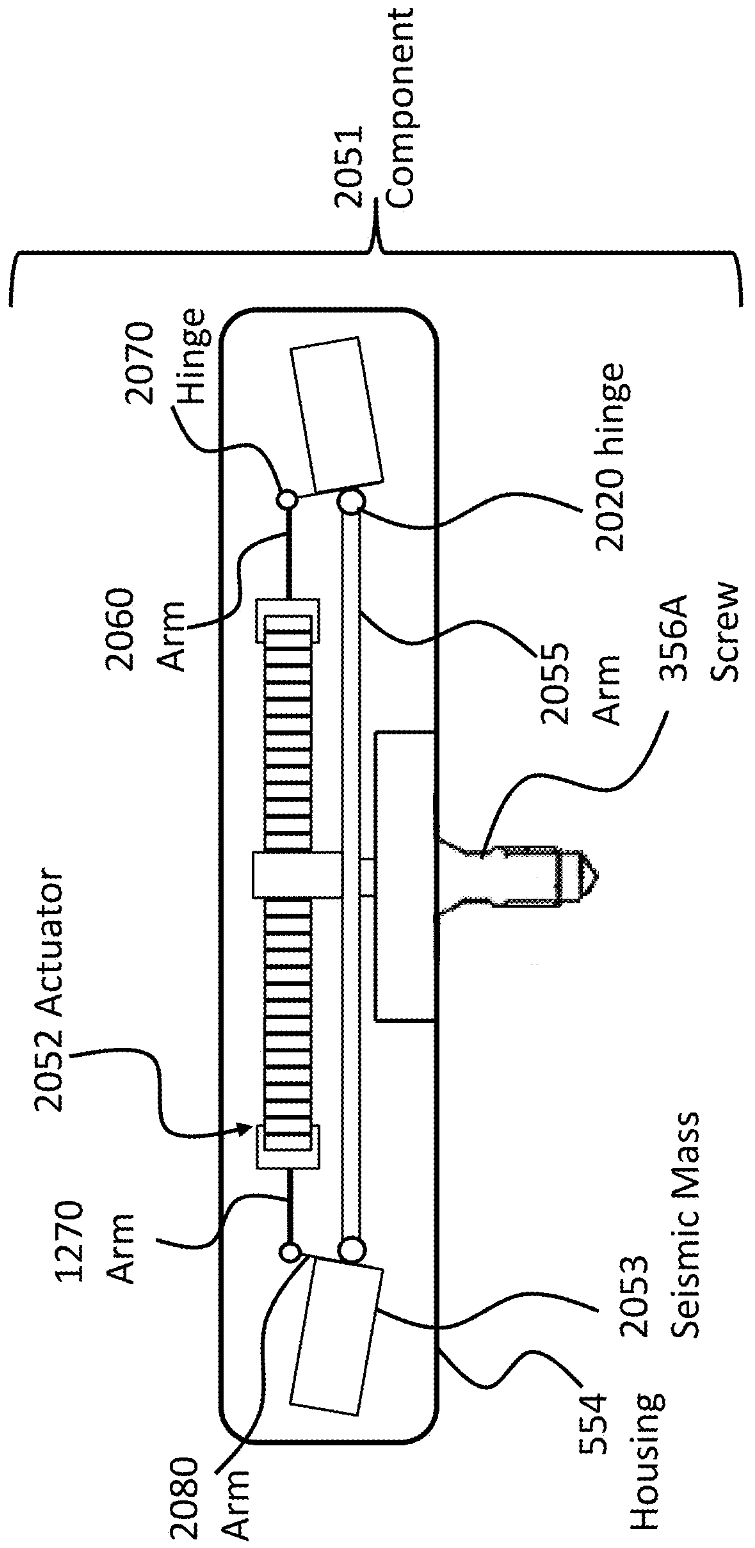
Figure 21:
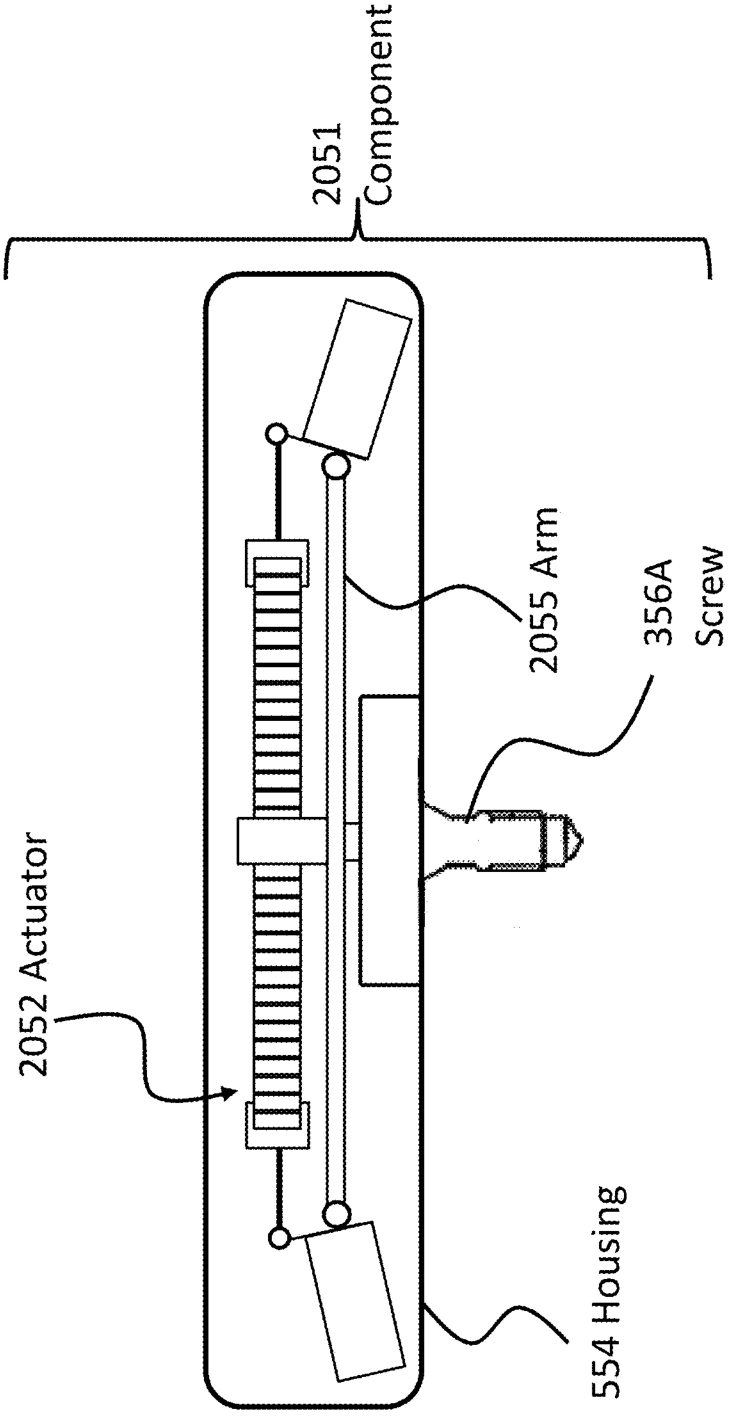

FIG. 20 depicts an alternate embodiment of a component 2051, that utilizes a support structure that includes fixed arms 2055 (actually, in this embodiment, only one arm), fixed relative to the housing 554. Here, the seismic masses 2053 are supported by respective hinges 2020 which are attached to the arms 2055. In an exemplary embodiment, upon actuation of the actuator 2052, arms 2070 are moved, which move hinges 2070. Hinges 2070 are attached to arms 2080 which are attached to masses 2050. In the embodiment shown in FIG. 20, the actuator 2052 is in a relaxed state or a contracted state. Upon the actuator achieving an extended state, the result is that seen in FIG. 21. Both of the seismic masses are rotated in an equal and opposite manner such that the outboard portions are closer to the bottom of the housing than that which was the case when the actuator had the status of FIG. 20. Upon contraction of the actuator, the masses are rotated back to the position seen in FIG. 20. By repeatedly doing this, vibrations are achieved, which vibrations are utilized to evoke a hearing percept in some embodiments.

In at least some exemplary embodiments, there is a component of a bone conduction device, such as any of the subcomponents detailed herein, comprising a housing and a bender apparatus located in the housing. In an exemplary embodiment, the bender apparatus corresponds to the spring and seismic mass components of FIG. 12 detailed above. In an exemplary embodiment, consistent with the teachings detailed herein, the bender apparatus is a device of a piezoelectric bender. Accordingly, it can be seen that in at least some exemplary embodiments, the functionality of a bender can be at least approximated, if not outright achieved, without utilizing a piezoelectric bender component. Instead, the functionality of a bender can be achieved utilizing a contractor and/or an extender and/or a shearer piezoelectric element.

In view of the above, in at least some exemplary embodiments, there is a component of a bone conduction device, such as sub component 1251 detailed above, which includes a bender apparatus, which bender apparatus includes a piezoelectric element, and, in conjunction with other components of the bender apparatus, duplicates a piezoelectric bender. Further as can be seen above, in at least some exemplary embodiments, the component includes a seismic mass, which seismic mass is supported by the bender apparatus. In at least some exemplary embodiments, the bender apparatus is the only component that supports the size of mass in the housing.

In an exemplary embodiment, the bender apparatus is a metal spring-based apparatus. That said, in an alternate embodiment, the bender apparatus is a plastic spring-based apparatus. In some embodiments, the spring is a lease spring in accordance with the teachings detailed above. It is noted that the embodiments of FIG. 14 is not a bender apparatus/does not include a bender apparatus. Instead, as noted above, that is a rigid flapper apparatus. In an exemplary embodiment, a flexible flapper apparatus can be a bender apparatus.

In an exemplary embodiment, the bender apparatus includes a piezoelectric element configured to drive bending of the bender apparatus, and the piezoelectric element is isolated from bending of the bender apparatus. This is, by way of example only and not by way of limitation, seen in the embodiment of FIG. 12.

In an exemplary embodiment, upon actuation of the piezoelectric component, the piezoelectric component moves in a linear manner with respect to a longitudinal axis thereof. This as contrasted to a bender.

In an exemplary embodiment, again where the bender apparatus includes a piezoelectric element, here, in the form of a piezoelectric actuator, the component of the bone conduction device is configured such that the piezoelectric actuator functions as a puppeteer to cause the bender apparatus to bend upwards and/or downwards.

In an exemplary embodiment, the bender apparatus includes a piezoelectric component, and the bender apparatus includes a spring that is bent in a relaxed state. Further, in an exemplary embodiment, the spring applies a pre-stress on the piezoelectric element. This can be utilitarian with respect to protecting the integrity of the piezoelectric element when subjected to shock. (More on this below.)

Figure 22:
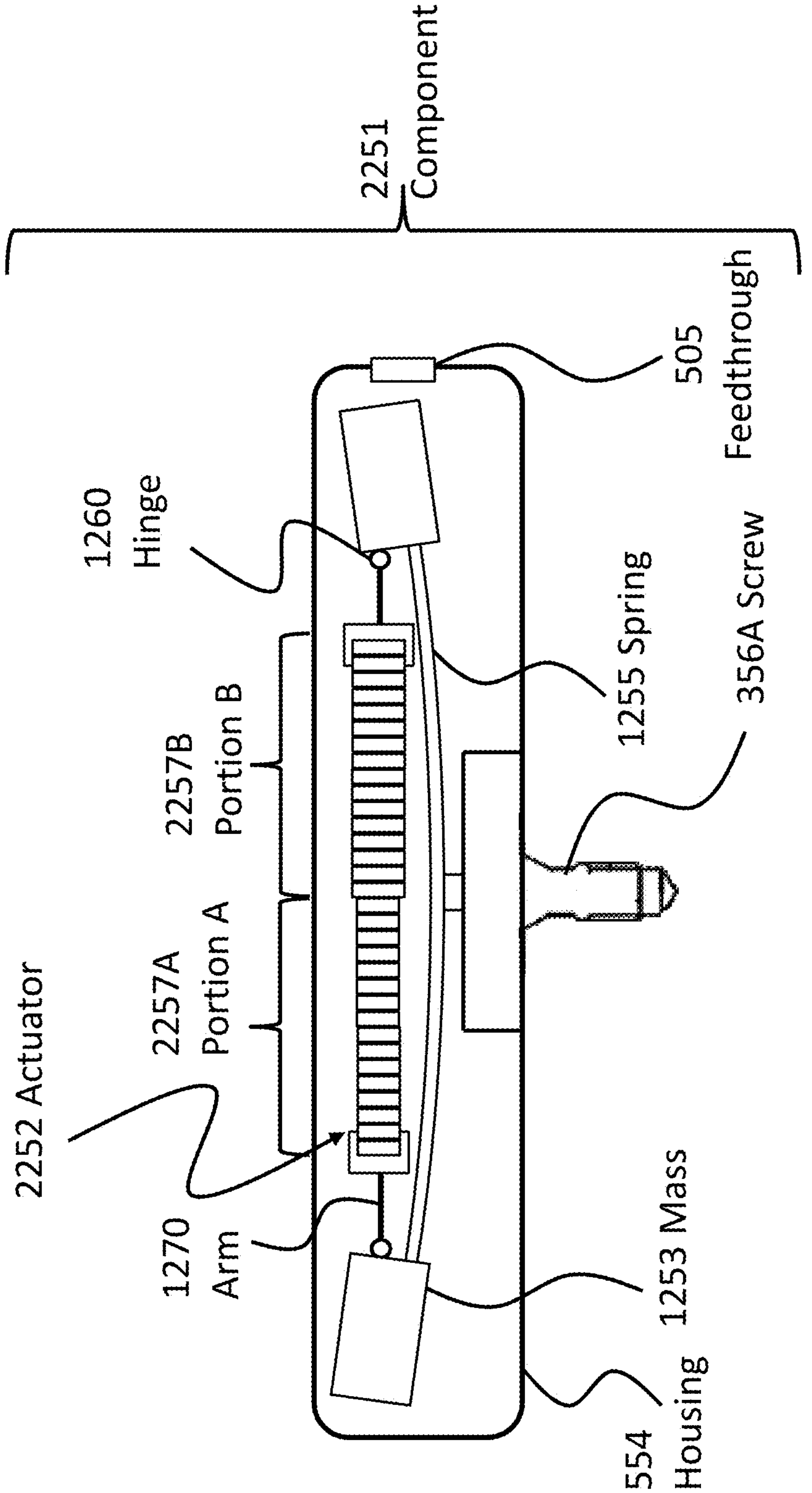

FIG. 22 shows another embodiment, where there is a component 2251, which includes an actuator 2252. This actuator is different than the actuator 1252 above, in that it includes two separate piezoelectric portions, portion 2257A and 2257B. In an exemplary embodiment, the two separate portions are optimized for respective frequencies of operation/frequencies of sound captured by the sound capture device that are utilized to evoke a hearing percept having those frequencies. In an exemplary embodiment, portion 2257A is actuated for low-frequency vibrations, and portion 2257B is actuated for frequencies different than low-frequency vibrations (e.g., medium and/or high frequency vibrations). In an exemplary embodiment, the first portion 2257A is actuated for frequencies up to or about or no more than 600, 650, 700, 750, 800, 850, 900, 950, 1000, 1100, 1200, 1300, 1400, 1500, 1600, 1700 1800, 1900, or 2000 Hz or any value or range of values therebetween in 0.1 Hz increments, and the second portion 2257B is actuated for frequencies beyond those ranges. While the embodiment depicted in FIG. 22 depicts the respective layers abutting one another, in an exemplary embodiment, the layers of the two separate portions could be separated from each other via an insulator of the like, or could have their own respective brackets, the respective brackets being connected to each other. Note also that in some embodiments, the length of the different portions could be different so as to achieve a different result. In exemplary embodiments, the portions are rigidly connected to one another.

Thus, in an exemplary embodiment, there is a bender apparatus that includes a first piezoelectric portion and a second piezoelectric portion (2257A and 2257B, respectively, for example). In this embodiment, the first piezoelectric portion is optimized for a first range of frequencies of bending and the second piezoelectric portion is optimized for a second range of frequencies of bending higher than the first range. Both the first piezoelectric portion and the second piezoelectric portion cause bending of the same components of the bender. In an exemplary embodiment, both portions can be actuated at the same time, while in other embodiments, the portions are actuated separately, while in further embodiments, the portions can be actuated both at the same time and separately. Further, in an exemplary embodiment, there can be overlap between the two actuations. For example, during a first temporal period, the first portion is actuated for the second portion is not actuated. During a second temporal period adjacent to and contiguous with the first temporal period, both the first and second portions are actuated and during a third temporal portion contiguous with the second temporal portion and adjacent thereto, only the second portion is actuated.

In operation, in an exemplary embodiment, separate currents can be applied to the separate portions to actuate for a given frequency. That said, in an exemplary embodiment, the current can be applied to both portions of the same time in an equal manner, if there is a desire for both to actuate at the same time. Note further, the currents that are applied at the same time can be controlled to achieve a different performance that may be utilitarian.

In view of the above, it can be seen that in an exemplary embodiment, there is a component of a bone conduction device, that includes a bender apparatus, which bender apparatus includes a first piezoelectric portion and a second piezoelectric portion. In this exemplary embodiment, the first piezoelectric portion is optimized for a first range of frequencies of bending and the second piezoelectric portion is optimized for a second range of frequencies of bending higher than the first range. Further, as can be seen from FIG. 22, both the first piezoelectric portion and the second piezoelectric portion cause bending of the same components of the bender. This as differentiated from a device that utilizes two separate piezoelectric portions which respectively bend or otherwise move different components.

Figure 23:
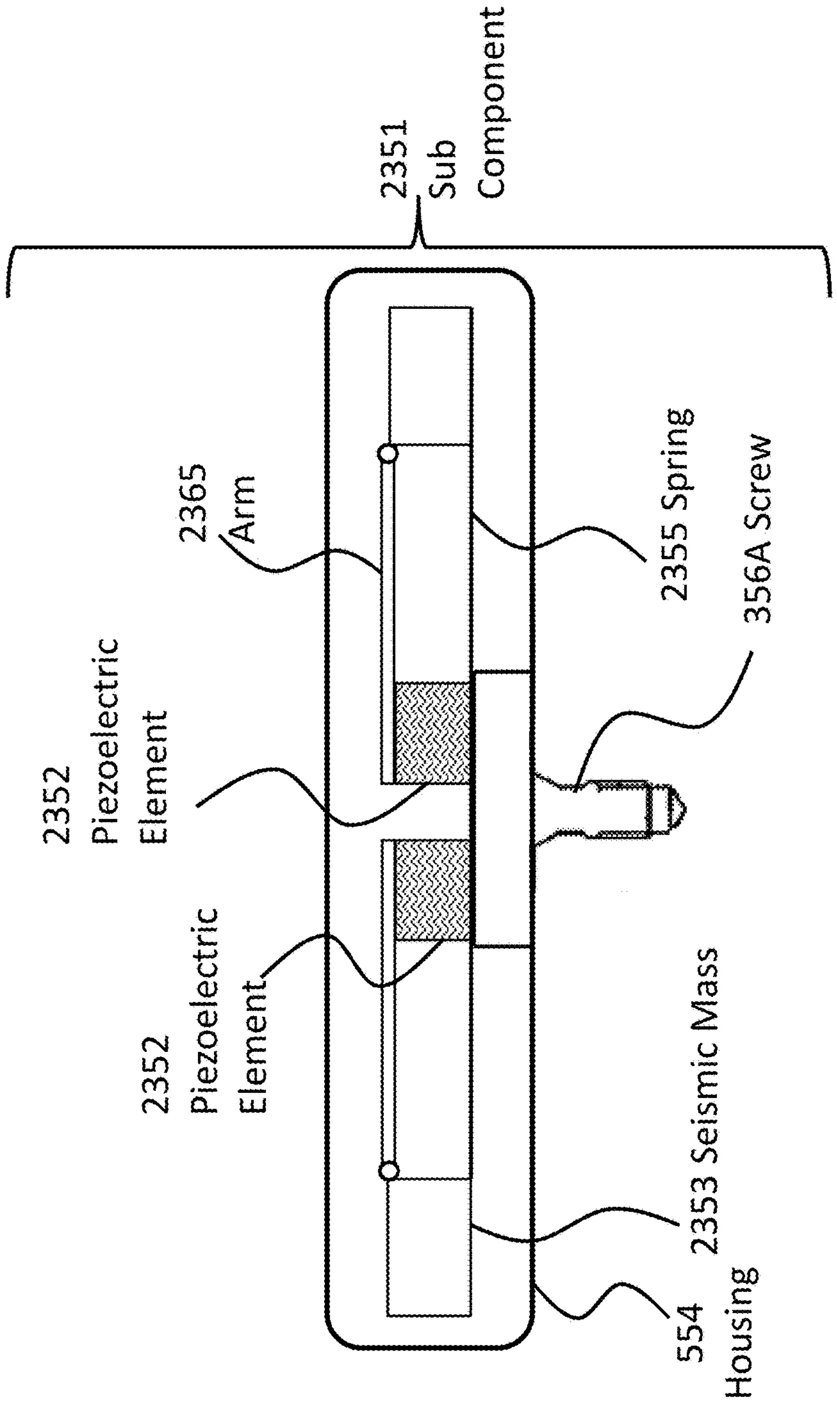
FIG. 23 presents another exemplary embodiment of an exemplary transducer assembly.

As noted above, in an exemplary embodiment, the piezoelectric element can be a shearer. FIG. 23 depicts an exemplary implantable sub component 2351 according to an exemplary embodiment that utilizes such a piezoelectric element. Here, piezoelectric elements 2352 are connected to arms 2365 which are rigid structural components, which are connected to hinges at the ends of the arms, which are connected to seismic masses 2353. The seismic masses 2353 are supported by spring 2355, which spring can be a leaf spring, or the like.

Figure 27A:
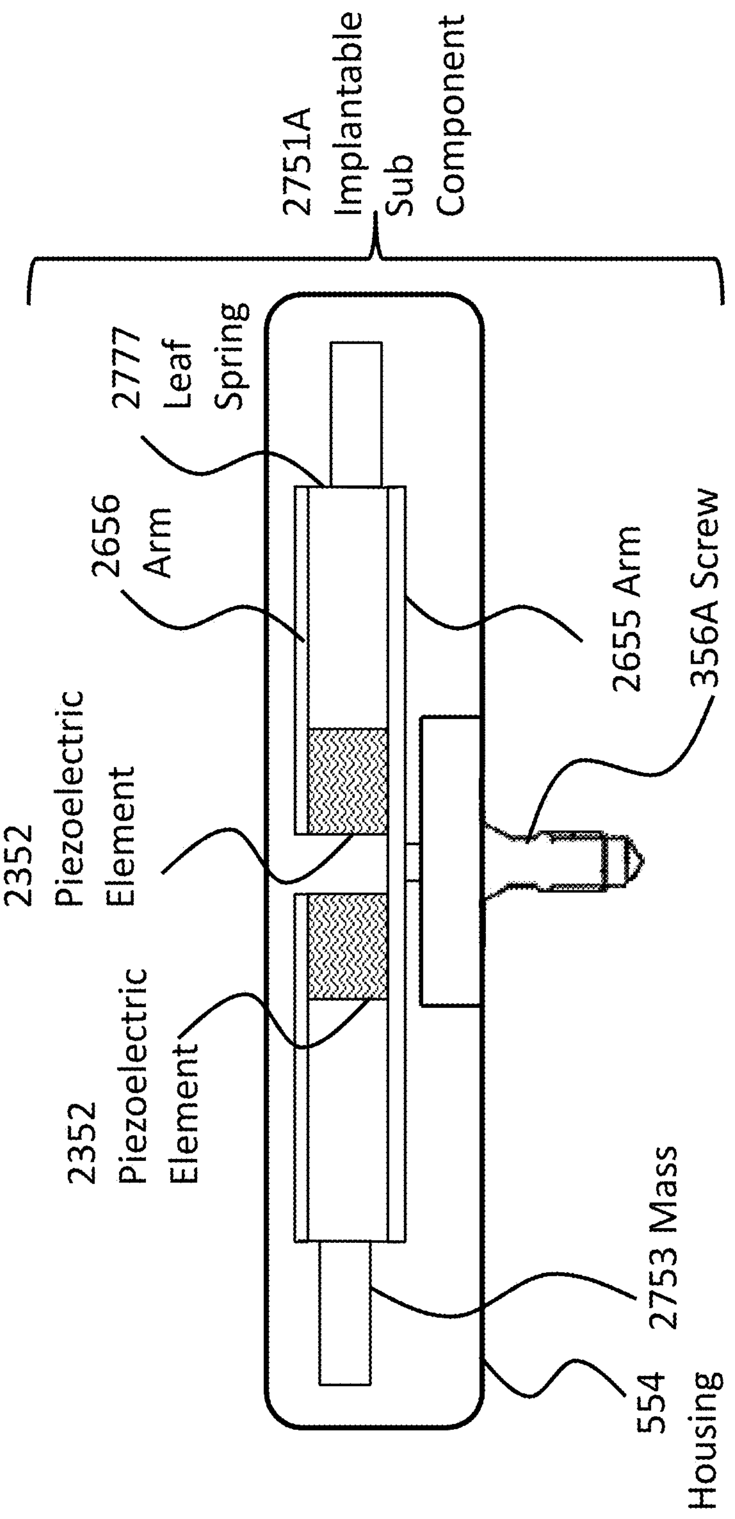
Figure 27B:
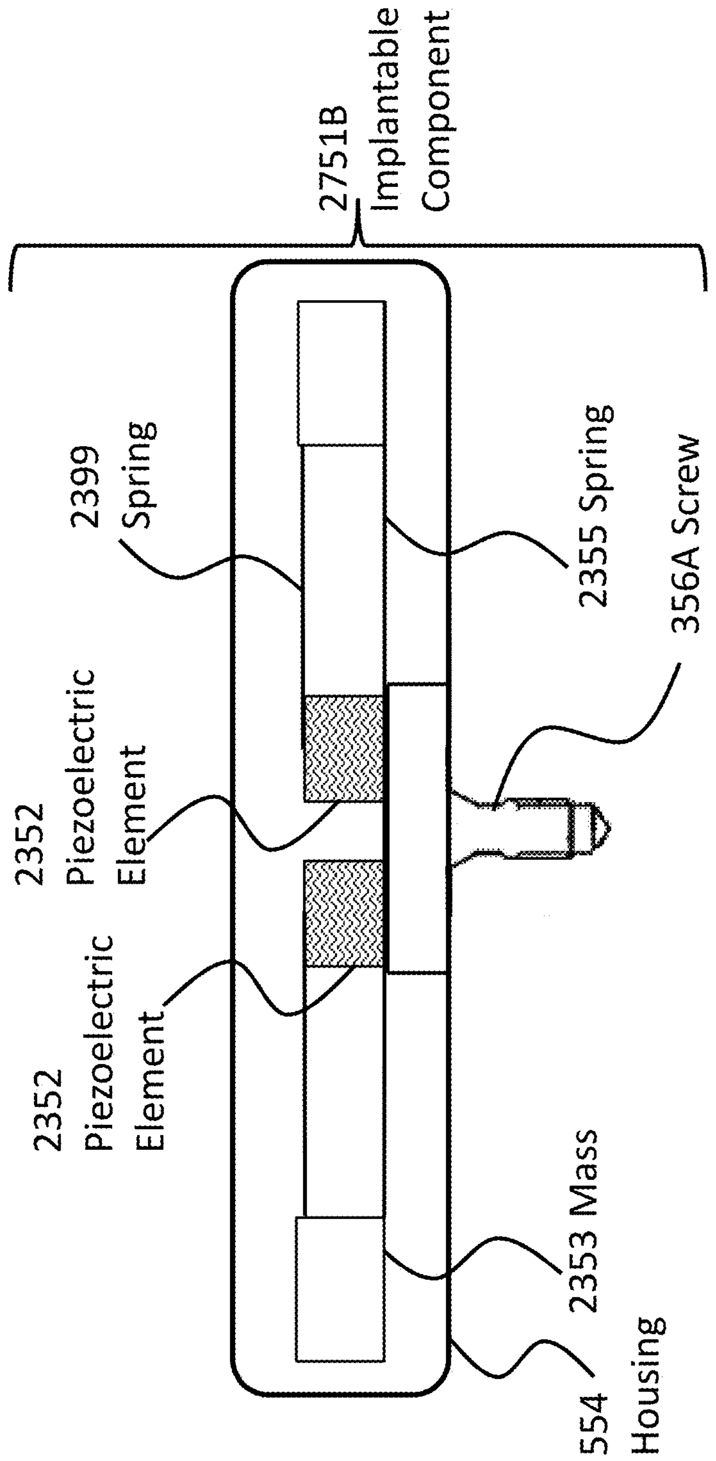

The embodiment of FIG. 23 depicts solid rigid arms utilized everywhere to support and move the seismic masses. That said, it is noted that in an alternate embodiment, and all-spring arrangement can be utilized instead. That is, instead of the rigid solid arms, leaf springs could be utilized, where the arms are not present. FIG. 27B shows an exemplary embodiment of this, of implantable component 2751B, which utilizes springs 2399 in place of the arms. (More on this below.)

Figure 24:
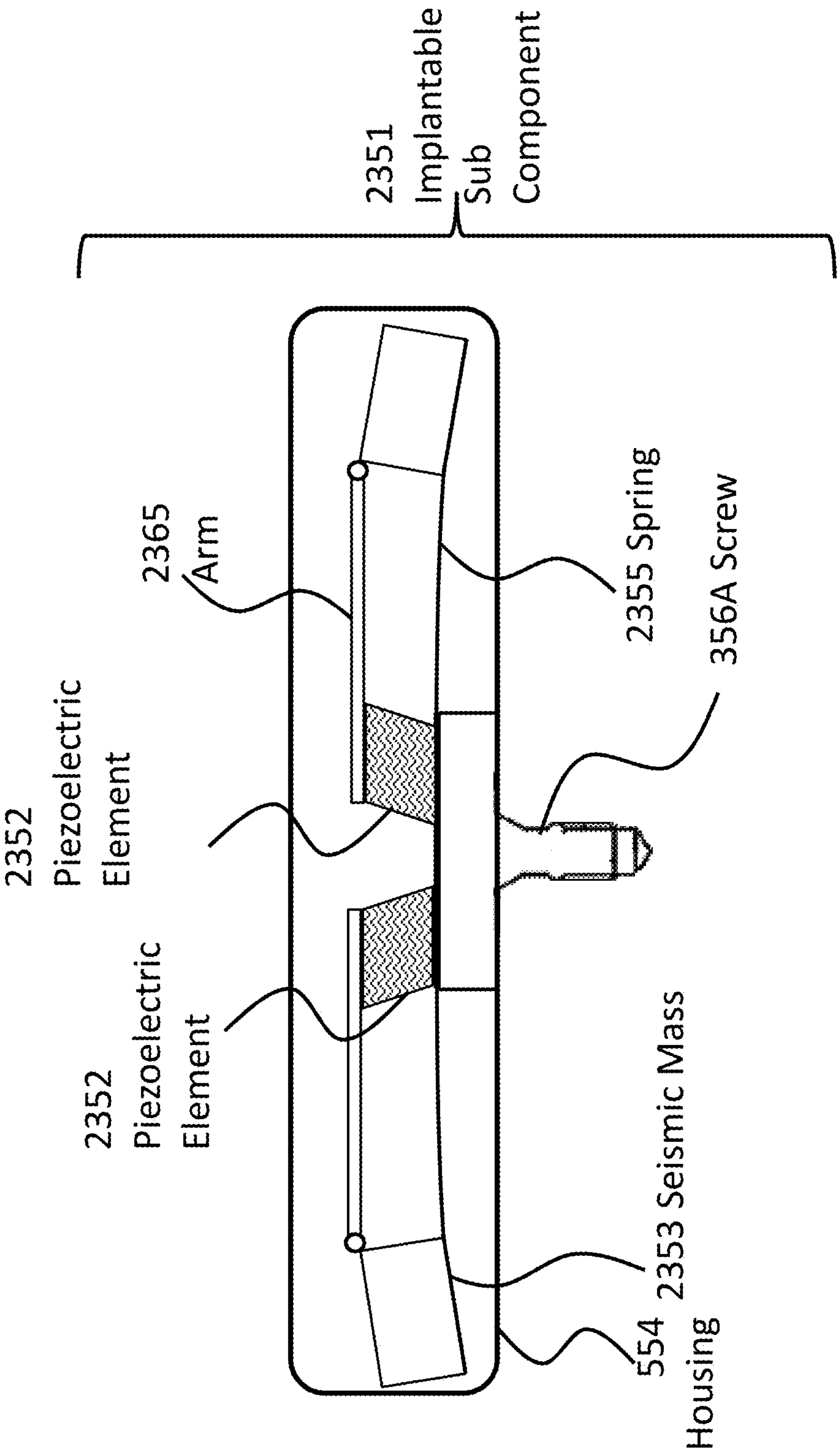
FIGS. 24 and 25 present exemplary depictions of the embodiment of 23 in operation.

FIG. 23 depicts the piezoelectric elements at a relaxed state or at a state where a first voltage is applied depending on the embodiment. Upon the application of a voltage, the piezoelectric elements shear as seen in FIG. 24, which drives the arms 2365 outboard, which applies an outward force onto the tops of the seismic masses 2353, which pushes the seismic masses outward and thus downward, thus bending spring 2355 as seen. (It is briefly noted that the bending that occurs during actuation of the devices herein is relatively small, as will be described in greater detail below, the figures represent exaggerated bending for the most part. FIGS. 23 and 24 depict the bending and a less exaggerated manner than that of the above figures.) Consistent with the teachings detailed herein, the arms 2365 do not bend, as they are rigid structural components. (As will be described in greater detail below, in other embodiments, arms 2365 can also correspond instead to leaf springs—any structure that can enable the teachings detailed herein can be utilized in at least some exemplary embodiments.)

Figure 25:
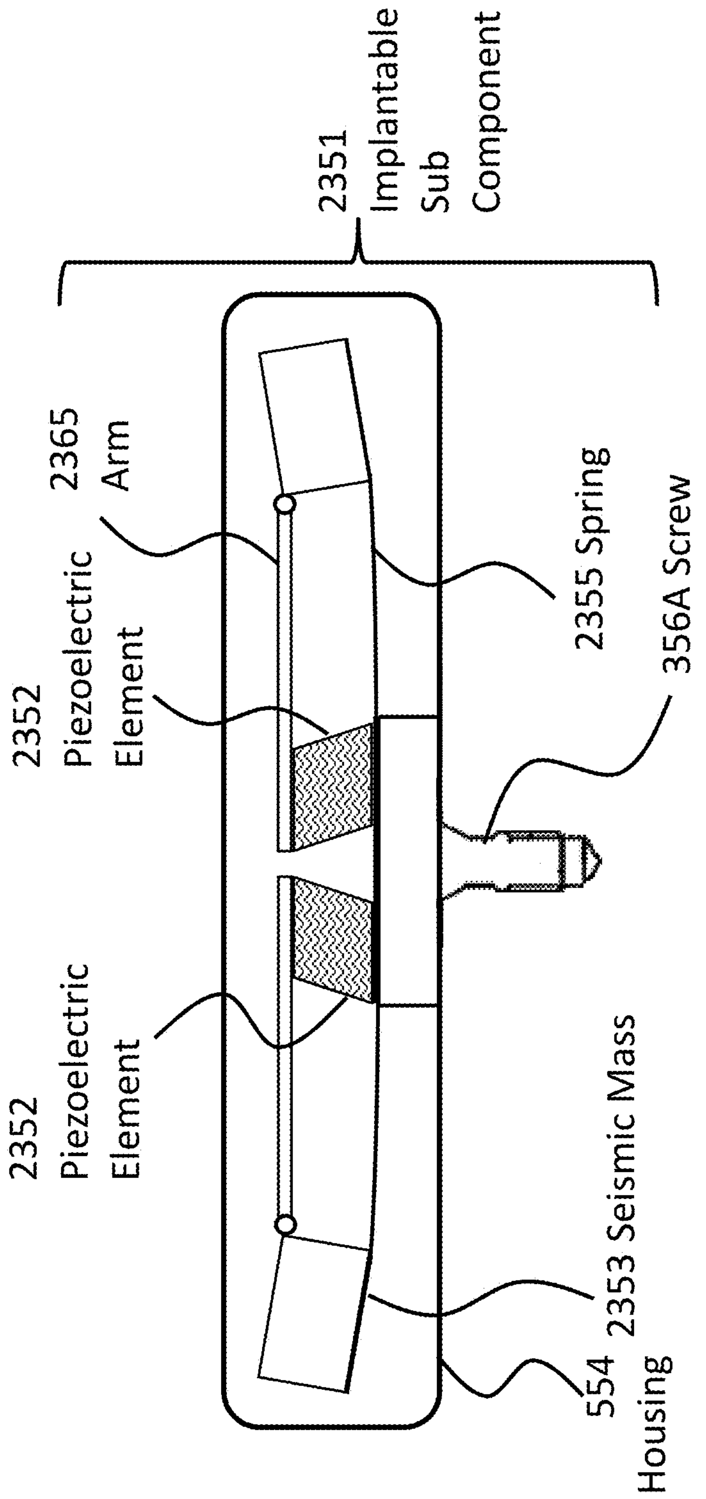

Upon the removal of the current, the springs drive the seismic masses back to the state shown in FIG. 23. In an exemplary embodiment, upon the application of a negative current, the piezoelectric elements shear in the opposite direction, as seen in FIG. 25, thus pulling the arms 2365 and board, thus pulling the seismic masses 2353 upwards and bending the spring 2355 upwards. It is noted that the configuration of FIG. 25 can also be the state of the piezoelectric elements when no voltage is applied. That said, the configuration of FIG. 24 can be the state of the piezoelectric elements when no voltage is applied. Any regime that can enable the teachings detailed herein can be utilized in at least some exemplary embodiments.

Figure 26:
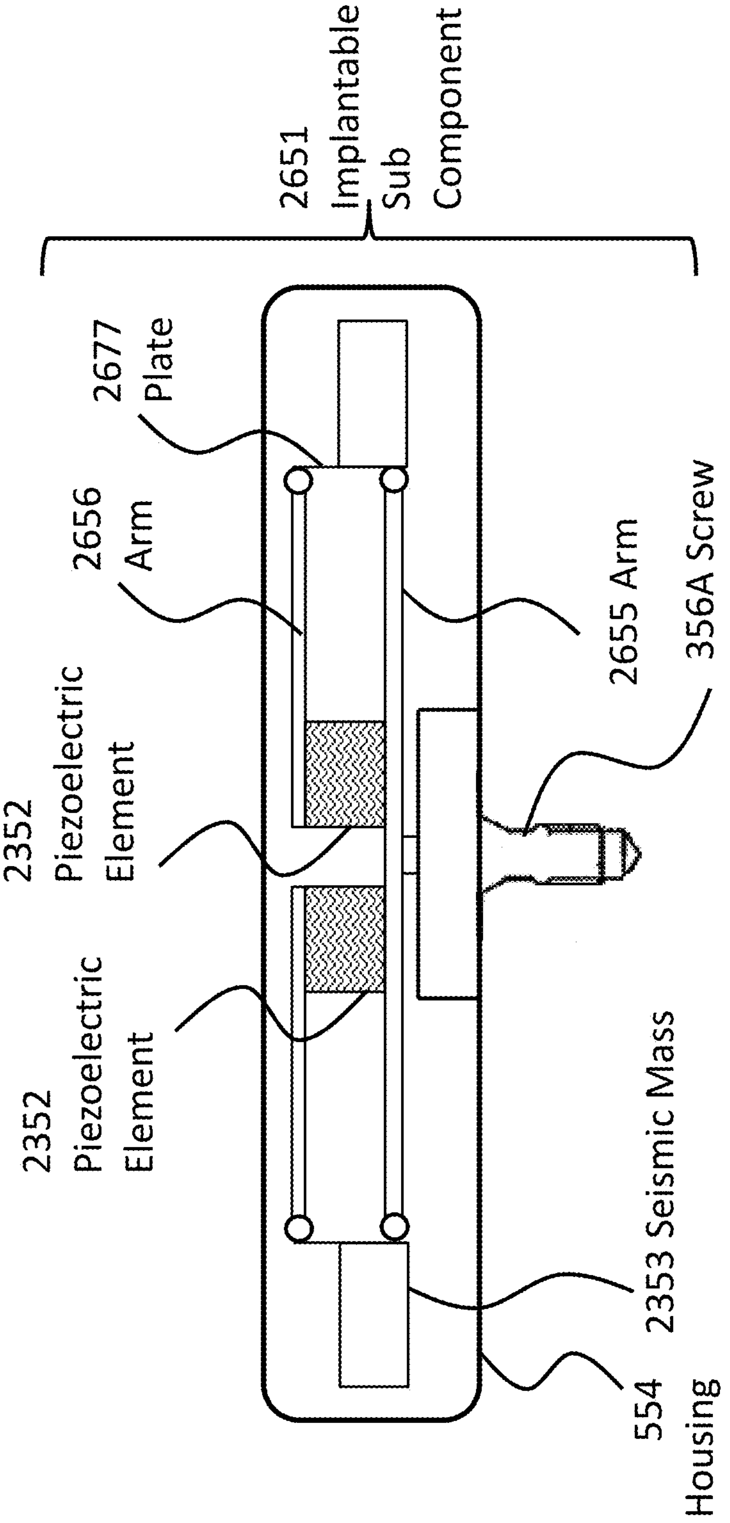

FIG. 26 depicts an alternate embodiment of a sub component 2651 that utilizes rigid solid structure to connect the piezoelectric elements 2352 to the seismic masses 2353. Here, there arms 2656 and 2655 as shown. Plates 2677 are present to provide additional moment, although it is noted that in an alternate embodiment, the hinge of armed 2656 could be directly connected to seismic mass 2353. In this exemplary embodiment, actuation of the piezoelectric elements results in flapping of the seismic masses, but no bending. In the embodiment shown in FIG. 26, the hinges are coupled to the plates 2677. In an alternate embodiment, the arrangement can be such that instead of hinges, the sliding surfaces can be utilized in at least some locations. Note further, that in an exemplary embodiment, instead of the separate hinges, plate 2677 can be a leaf spring in and of itself. In this regard, FIG. 27A depicts such an embodiment with respect to implantable subcomponent 2751A. The leaf springs 2777 provide the relaxation of the rigidity of the system so that the seismic masses can rotate. In this regard, the springs 2777, which completely and totally support the masses 2753, can be rigidly attached to the arms, but the springs enable the system to move so that the system is not a rigid system. Note further that in an alternate embodiment, a pin system can be utilized or the like, where the masses are essentially clamped in between the two arms, and the arms and/or the masses have line contact on the top and the bottom with the respective arms, so that there can be rotation at the line contact when the system moves. (For example, triangular supports can be utilized, where the "point" of the triangle interfaces with the arm and/or the seismic mass.) It is noted that in a variation of the embodiment of FIG. 27A, a conventional pinch can be utilized for the top and/or the bottom, and the spring can be utilized for the bottom and/or the top.

The embodiment of FIG. 26 depicts solid rigid arms utilized everywhere to support and move the seismic masses. That said, it is noted that in an alternate embodiment, an all-spring arrangement can be utilized instead.

Additional hinge components may or may not be present. In this regard, any disclosure herein of the utilization of a spring or the like corresponds to a disclosure of an alternative embodiment where rigid solid arms having little to no flexural features are utilized in the alternative. The reverse is also the case. Any disclosure herein of the utilization of a rigid or stiff arm or the like corresponds to a disclosure of an alternate embodiment where a spring or a flexible component is instead utilized. All of this is subject to the proviso that the contrary is not indicated, and that the art enable such.

Figure 28:
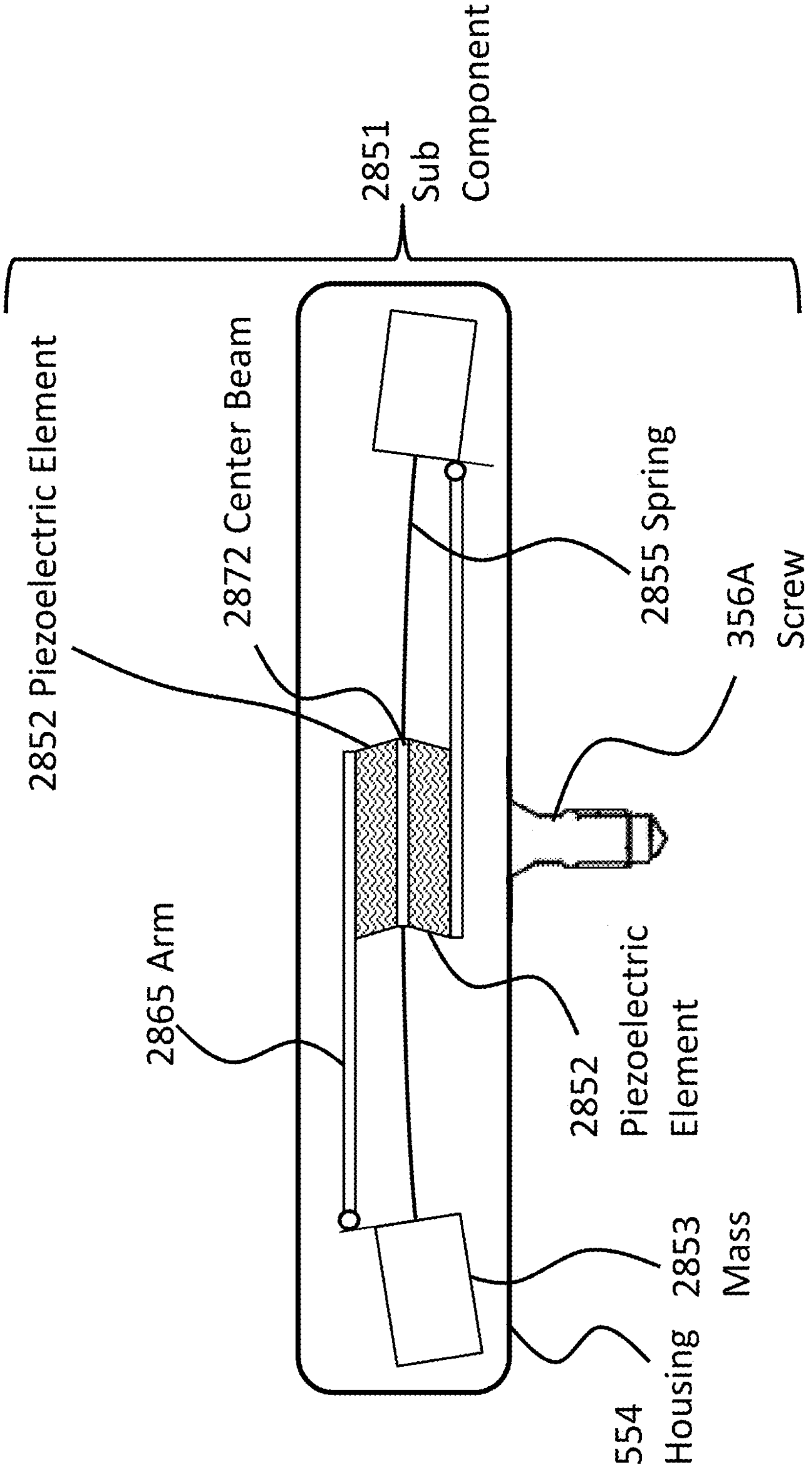

As can be seen from FIGS. 23, 24 and 25 and 26, the piezoelectric elements have the bottom surface that is fixed relative to the housing 554. It is the top surface is that move relative to the housing, and thus move the arms. In an alternate embodiment, it is the top surface that is fixed, in the bottom surface that moves relative to the housing. In this regard, it is noted that any disclosure herein of a particular arrangement also corresponds to a disclosure of an alternate embodiment where that arrangement is reversed unless otherwise noted, providing it the art that the art enable such. In a somewhat similar vein, FIG. 28 presents an alternative embodiment that utilizes different fixation and different support of the piezoelectric elements. Here, there is a center beam 2872, that is ultimately rigidly connected to the housing or another component thereof. In the embodiment shown in FIG. 28, center beam 2872 extends in and out of the plane of the figure. In some embodiments, it extends to the sidewalls of the housing, and is otherwise secured thereto, while in an alternate embodiment, the center beam is supported by a U-shaped structure that supports the sides of the center beam that are clear of the leaf spring 2577, which U-shaped structure has arms that extend down to the floor of the housing, where the U-shaped structure is secured thereto. Any arrangement of supporting the piezoelectric elements 2852 that can enable the teachings detailed herein can you be utilized in at least some exemplary embodiments.

In the embodiment of FIG. 28, which depicts an implantable sub component 2851, when the piezoelectric elements 2852 sheer as shown (or, in an alternate embodiment, this can be the relaxed state, etc.), the spring 2855 is driven downwards, or otherwise bends downwards, and when the piezoelectric elements 2852 here in the opposite direction, the spring is bent upwards. It is noted that this exemplary embodiment utilizes a combination of sliding and fixed hinges to maintain the system in a functional manner. In this regard, a pushing action occurs on one of the seismic masses while a pushing action occurs on the other of the seismic masses. When the here is reversed, the opposite occurs. Thus, there is utilitarian value with respect to having a coupling arrangement that permits the relative movement of the rigid arms that are utilized in this embodiment, with the seismic masses. Such utilitarian value could be achieved, in some embodiments, by utilizing a lever system and/or a slotted system that permits movement of the relative components while still enabling the masses to be held in a manner that prevents them from moving free of the arms 2865, etc.

Figure 29:
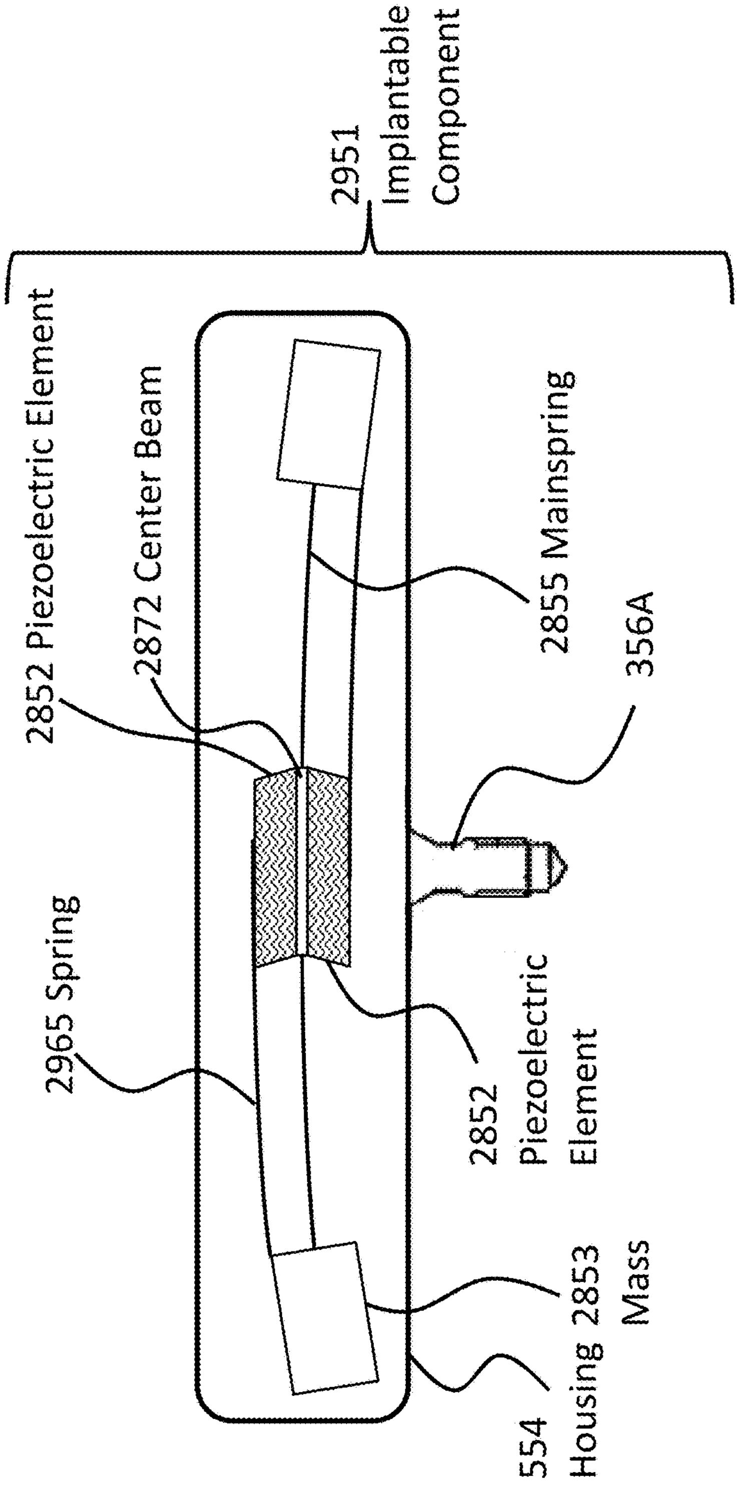

In an alternate embodiment, there can be utilitarian value with respect to utilizing a full spring arrangement, as shown in FIG. 29. FIG. 29 depicts the mainspring 2855 of implantable component 2951, and two secondary springs 2965, one attached to the top of the top piezoelectric element and one attached to the bottom of the bottom piezoelectric element. Owing to the utilization of the separate secondary springs, the masses 2853 will be kept from flopping or otherwise swinging free during actuation. Any arrangement that can enable a shearing piezoelectric element to be utilized so that the seismic mass moves in an arcuate motion upward and downward such that the masses of the seismic mass are controlled in a manner that can enable utilitarian bone conduction hearing percepts to be evoked can be utilized in at least some exemplary embodiments.

Figure 30:
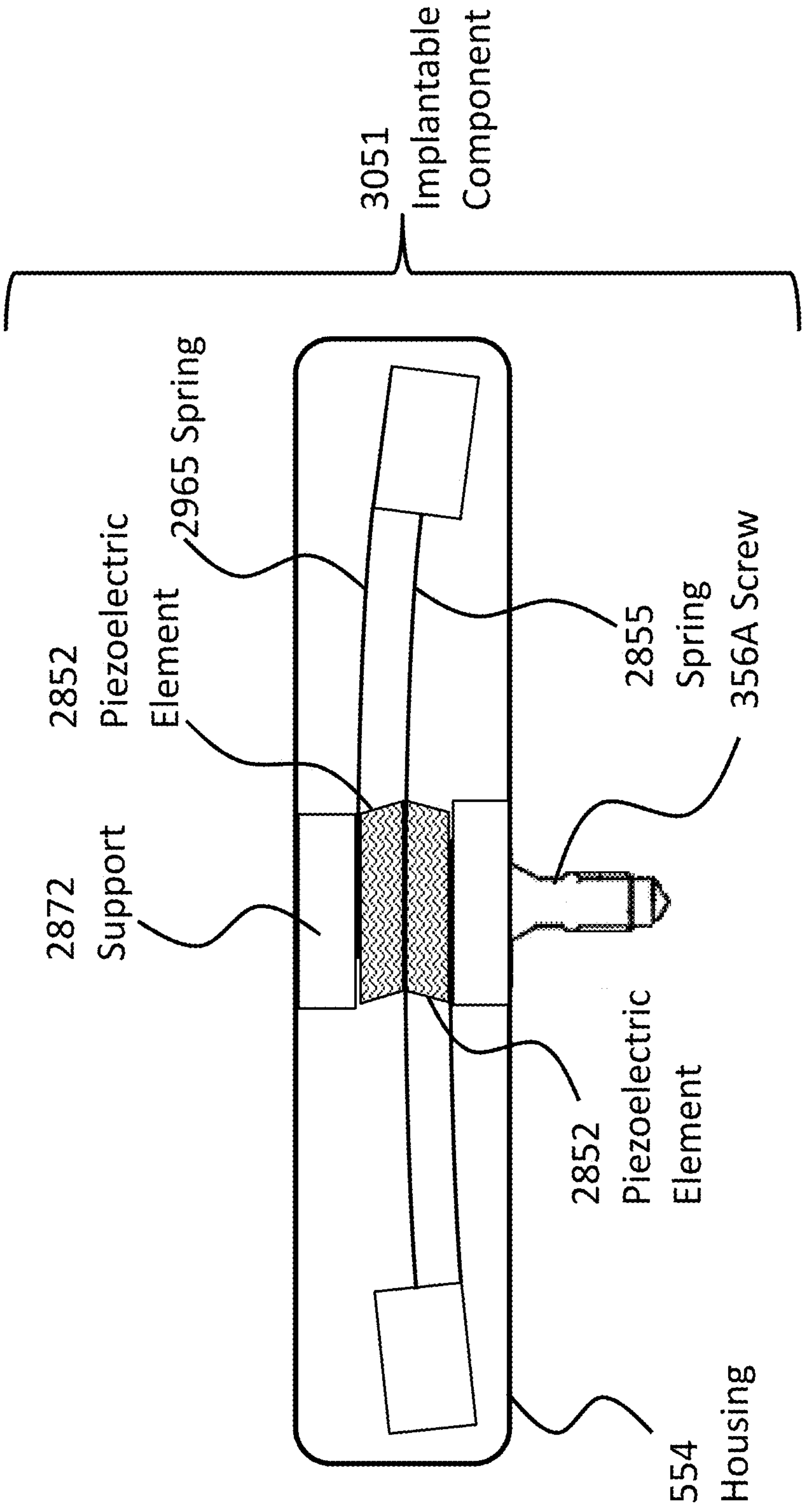

FIG. 30 depicts yet another alternative embodiment of an implantable component 3051. Here, the respective piezoelectric elements 2852 are mounted in a manner such that the top portion of the top piezoelectric element 2852 is hard mounted via support 2872 which is rigidly connected to the housing wall, which can be a plate or a solid body of metal or the like, and the bottom portion of the bottom piezoelectric element 2852 is hard mounted via a second support 2872, again which is rigidly connected to the housing wall. In this embodiment, the connections are to the top and the bottom of the housing walls, but it is to be understood that in an exemplary embodiment, instead of the supports 2872 extending downward and upward, the supports could extend inward and outwards to the sidewalls (essentially being connected to the sidewalls in the manner of the embodiment of FIG. 23 detailed above, except with two supports 2872—note that in an alternate embodiment, the embodiment of FIG. 23 can be connected to the bottom and/or top color wall plan apparatus that extends from support 2872 around the piezoelectric elements and then upward and downward/to the sides of the piezoelectric elements consider an H structure, where the cross component is 2872—a double cross H structure could be used with the embodiment of FIG. 28). Any arrangement that can enable rigid support for connections to the housing walls and/or ultimately to the bone screw can be utilized in at least some exemplary embodiments.

FIG. 30 depicts the piezoelectric elements shearing to the right, which in the arrangement of FIG. 30, causes the masses to move arcuately downward. It is noted that in an alternate embodiment, the opposite could be the case—shearing to the right will cause the masses to move upwards. In an exemplary embodiment, the springs can be pretensioned or otherwise have a relaxed state as shown, thus driving the piezoelectric elements to the right. In an alternate embodiment, this can be the default state of the piezoelectric elements.

In a further embodiment, the implantable component can include an apparatus that prevents the springs and/or the seismic mass from moving in the wrong direction (e.g., one mass moving up and one moving down. By way of example only and not by way of limitation, in a relaxed state, the mainspring 2855 can be planar, while the secondary springs are biased in one direction or the other so that the secondary springs "lead" the masses in the proper directions.

Figure 31:
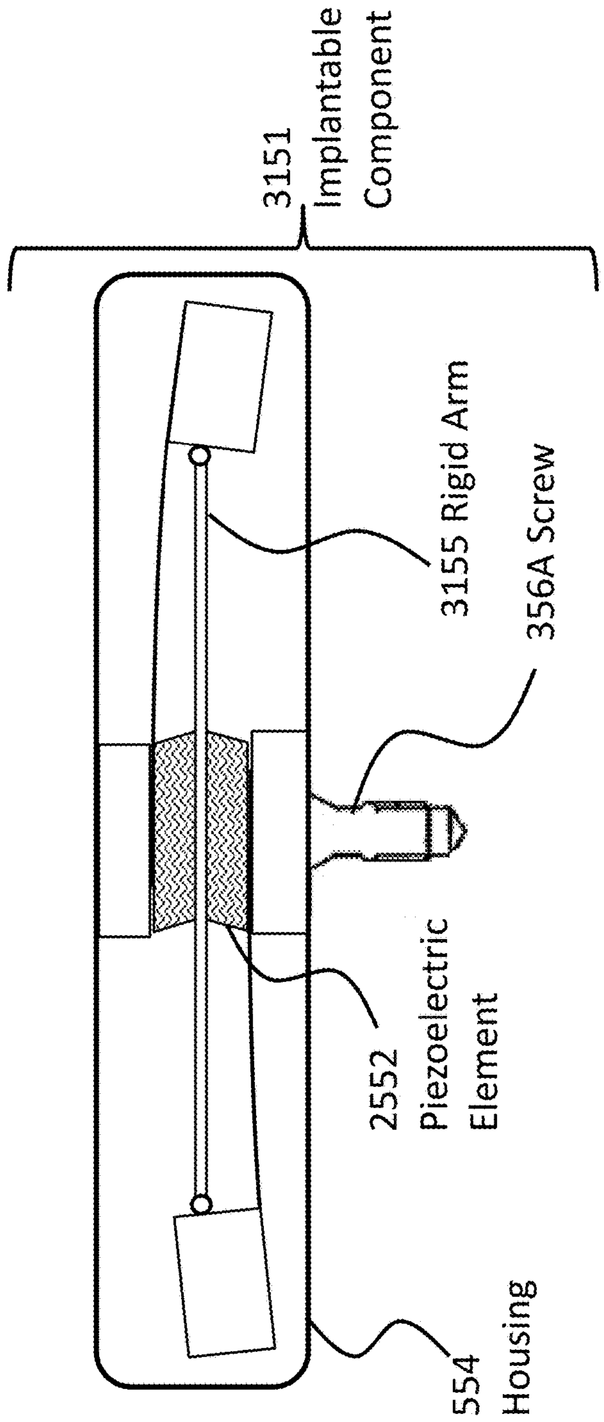

FIG. 31 presents an alternate embodiment of an implantable component 3151, which utilizes a single rigid arm 3155 instead of a mainspring. Here, hinge components are located at the ends of the arm 3155 so that the masses can articulate there about during actuation.

Figure 32:
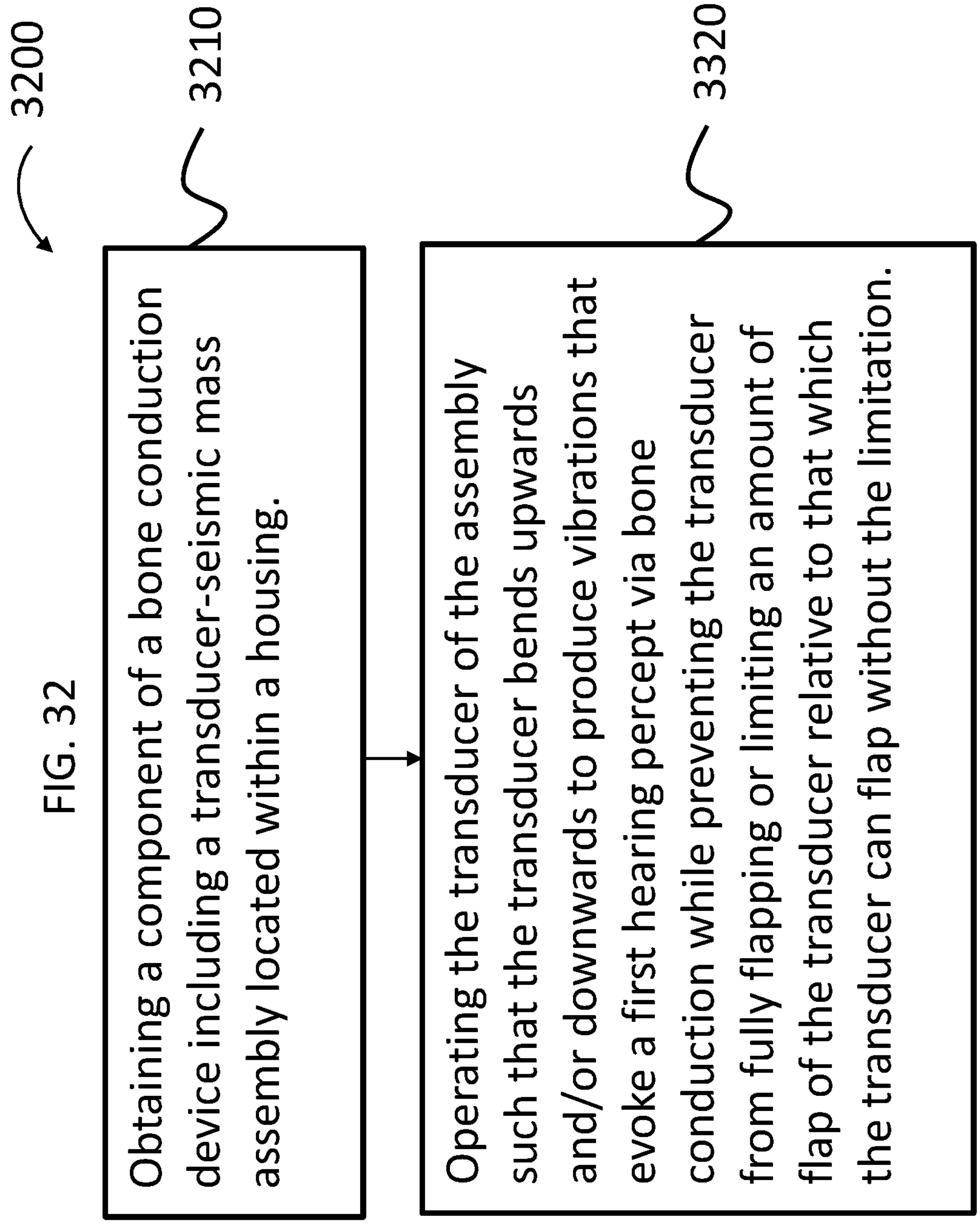
FIG. 32 presents an exemplary flowchart for an exemplary embodiment.

FIG. 32 presents an exemplary algorithm for an exemplary method, method 3200. Method 3200 includes method action 3210, which includes obtaining a component of a bone conduction device including a transducer-seismic mass assembly located within a housing. Method 3200 further includes method action 3220, which includes operating the transducer of the assembly such that a first seismic mass and a second seismic mass (e.g., the masses on either side of the springs/arms) of the assembly moves upwards and downwards in an arcuate motion effectively symmetrical to a plane between the two seism masses (e.g., plane 1399) to produce vibrations that evoke a first hearing percept via bone conduction. In an exemplary embodiment of this embodiment, the aforementioned arcuate motion is driven by a piezoelectric system which is only coupled to the seismic masses and/or support structure thereof. This is seen in FIG. 13 by way of example. Consistent with the teachings above, in an exemplary embodiment, the first seismic mass and the second seismic mass are supported by a spring that corresponds to a support structure, which spring bends upwards and downwards with the arcuate movement of the seismic masses, and the piezoelectric elements of the piezoelectric system are isolated from the bending.

In at least some exemplary embodiments, with respect to the torque that is imparted onto the seismic masses, the amount of torque that is experienced by the piezoelectric elements of the piezoelectric system collectively amount to no more than 50, 40, 30, 25, 20, 15, 14, 13, 12, 11, 10, 9, 8, 7, 6, 5, 4, 3, 2, or 1% or even zero of the torque that is imparted onto the seismic masses.

In some embodiments, the aforementioned arcuate movement is achieved by at least one of a pushing force or a pulling exerted onto the seismic masses and/or the support structure thereof, the forces being generated by piezoelectric elements of the piezoelectric system. Further, consistent with the teachings detailed above, the piezoelectric elements of the piezoelectric system do not form part of the support structure supporting the masses. By way of example only and not by way of limitation, if the piezoelectric elements and/or the piezoelectric system were completely removed from the implantable component, all other things being equal, the relative positioning of the masses of the seismic masses would be, with respect to the centers of gravity thereof, or any other utilitarian measuring point, no more than 15, 14, 13, 12, 11, 10, 9, 8, 7, 6, 5, 4.5, 4, 3.5, 3, 2.5, 2, 1.5, 1.4, 1.3, 1.2, 1.1, 1.0, 0.9, 0.8, 0.7, 0.6. 0.5, 0.4, 0.3, 0.2, 0.1%, or even zero percent of the maximum deflection of the transducer in response to a pure sine wave at 1000 Hz representing input of such a sound at 100 dB.

In at least some embodiments, piezoelectric elements of the piezoelectric system respectively move respective first portions of respective support structures respectively supporting the seismic masses and only indirectly move respective second portions of respective support structures respectively supporting the seismic masses. Such an exemplary embodiment is thus directed towards embodiments where the support structure includes the piezoelectric system. In this regard, in an exemplary embodiment, in the absence of the piezoelectric elements and/or the piezoelectric system, the seismic masses would no longer be supported. Further, in some embodiments, the piezoelectric elements of the piezoelectric system respectively support respective first components of respective support structures respectively supporting the seismic masses and second portions of respective support structures are not supported directly or indirectly by the piezoelectric elements.

In any event, as seen from the above, in at least some exemplary embodiments, the piezoelectric elements of the piezoelectric system are non-bending components. This as opposed to the piezoelectric vendors detailed above. This is not to say that there is not some trace bending in the elements—all shape changing components have some variations. This is to say that the person of ordinary skill in the art would recognize that this is not a piezoelectric element utilized for bending purposes.

Figure 33:
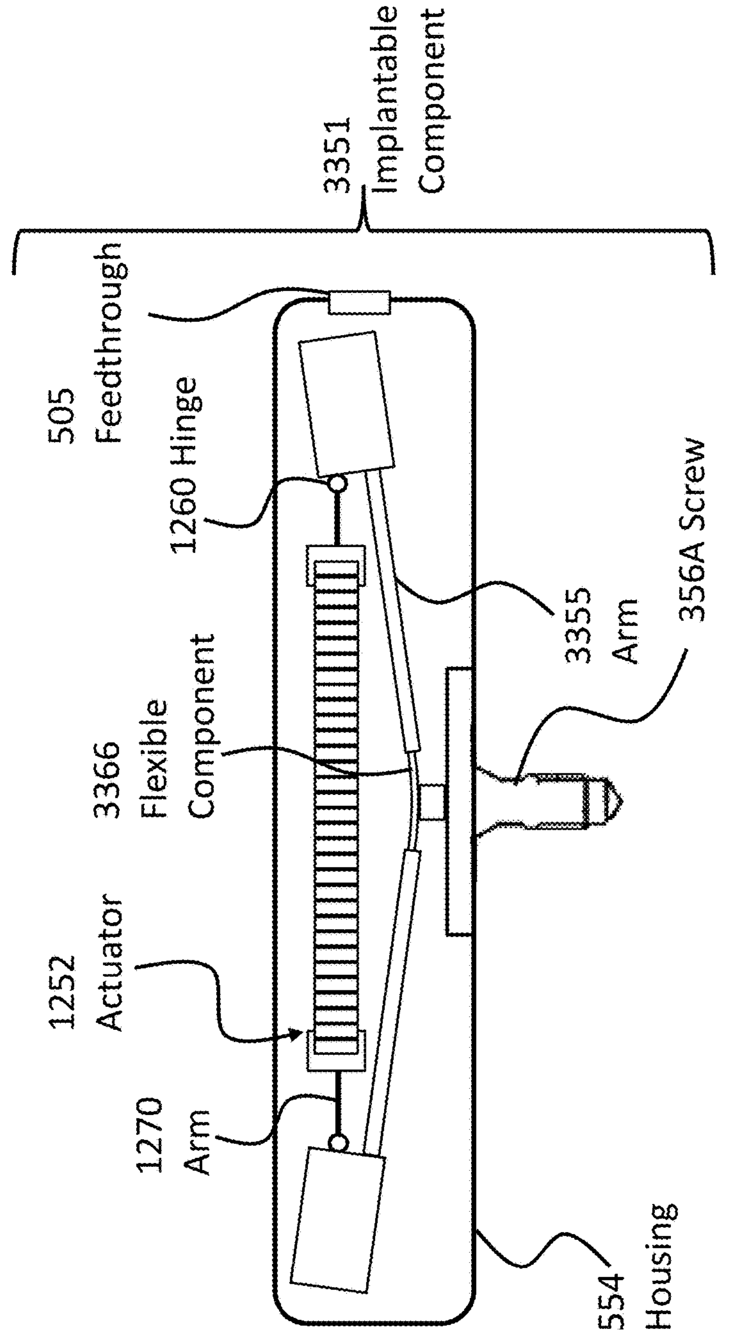
Figure 34:
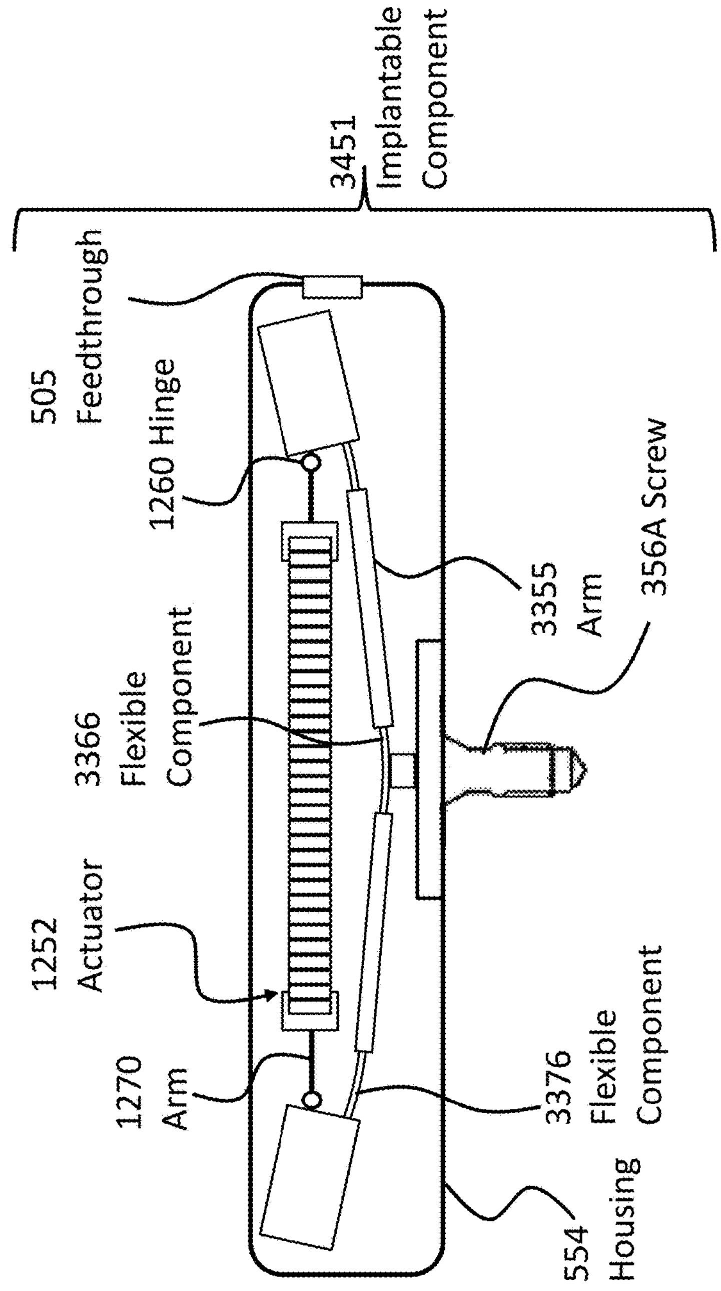

FIG. 33 presents another exemplary embodiment of an implantable component, implantable component 3351, which utilizes a combination of rigid arms 3355 and flexible component 3366. In this exemplary embodiment, component 3366 is a spring, such as a plate spring. Thus, the bending and/or the articulation of the support structure occurs at the spring 3366. In this embodiment, the spring 3366 is rigidly connected to the housing. It is also noted that in at least some exemplary embodiments, instead of the flexible component 3366, rotating hinge (ball or pin, etc.) can instead be utilized. FIG. 34 presents an alternate exemplary embodiment of an implantable component, 3451, that includes the additional flexible components 3376 located outboard of the arms 3355, as can be seen. This can provide further flexibility to the overall support structure so as to enable the seismic masses to move in accordance with the teachings detailed herein.

In this regard, in an exemplary embodiment, there is a component of a bone conduction device, such a sub-component as detailed above, or an external component of a passive transcutaneous bone conduction device and/or a removable component of a percutaneous bone conduction device, which component comprises a housing. In this exemplary embodiment, the component also includes a piezo-seismic mass assembly configured to flap to evoke a hearing percept as a result of energizement of a piezoelectric transducer of the assembly. Further, in this exemplary embodiment, the component is configured to enable permanent shock-proofing of the piezo transducer of the piezo-seismic mass assembly beyond that which results from damping (no damping may be present in an exemplary embodiment, which satisfies this feature) while at least a portion of the piezo-seismic mass assembly is fixed relative to the housing. This permanent shock proofing can be achieved in a variety of manners. In some embodiments, the utilization of the piezoelectric elements detailed herein are of a type that resists failure or otherwise do not break upon the most extreme movements of the piezo-seismic mass assembly.

Further, in an exemplary embodiment, the attachments or the connections between the piezoelectric system and the rest of the bender apparatus are such that upon a certain amount of deflection, the piezoelectric system decouples, at least in part, from the rest of the bender apparatus, thus permitting the seismic masses to continue to travel as a result of the shock, but the piezoelectric components do not travel with the seismic masses because they are no longer coupled to the seismic masses directly or indirectly and/or the amount of travel of the seismic masses does not result in the same amount of travel to the piezoelectric system.

By way of example only and not by way of limitation, in an exemplary embodiment, arms 1270 can be established by telescopic system that upon a certain amount of force, the arms telescopic outward. By way of example only and not by way of limitation, two concentric tubes can be located within one another, which concentric tubes are held together or otherwise the positions thereof are maintained relative to one another utilizing components that will “release” or otherwise “give” upon a certain force, which force would exist upon the movement of the seismic masses beyond a certain amount, such as a maximum amount that will be experienced during normal operation of the subcomponent to evoke a hearing percept and/or a certain amount that is, statistically speaking, unlikely to cause damage to the piezoelectric elements and/or the piezoelectric system.

Further, in an exemplary embodiment, such as an embodiment where the system is prestressed, the tubes can be slipped fitted to one another, such that the tubes maintain a collapsed state that is a minimum, but can expand upon movements of the seismic masses beyond a certain amount. In this regard, in an exemplary embodiment, the prestressed springs apply sufficient force to always maintain the tubes in the clap state during the aforementioned normal operation scenarios of the subcomponent. This is somewhat analogous to prestressed concrete or the like. Regardless of the position of the bender components during the travel of the bender components during normal operation, there will always be some form of compressive stress at one the aforementioned system. During travel of the bender components during abnormal operation, this prestress goes to zero and then the two components can separate and otherwise slide relative to one another, permitting the one component to move with the seismic mass throughout the full travel of the seismic mass while the other component stays fixed relative to the piezoelectric elements. This effectively decouples the extreme movements of the seismic mass from the piezoelectric elements.

Prestressing the springs can provide some if not total shock proofing.

In an exemplary embodiment, the stacks are preloaded to a value of less, than, more than or about equal to 5, 6, 7, 8, 9, 10, 11, 12, 13, 14, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 325, 350, 375, 400, 450, or 500 times or more or any value or range of values therebetween in integer increments the maximum amount of force that will be generated by the piezoelectric stack upon an input signal of a pure sine wave at 1000 Hz representing a sound that is at 100 dB.

In an exemplary embodiment, the preloading is such that during maximum deflection during normal operation, a preload will still remain on the stack. This can have utilitarian value with respect to an arrangement where the masses will decouple from the stack. The arrangement can be configured so that the decoupling occurs upon a force that is lower than that which would eliminate the preloading. This can also be the case with respect to a clamp arrangement, where the maximum amount of expansion of the piezoelectric stack is halted before the stack could extend beyond its full preloading value.

It is briefly noted that in at least some exemplary embodiments, in the absence of voltage applied to the piezoelectric elements, the piezoelectric elements are compressed or otherwise retract.

In at least some exemplary embodiments, the amount of extension of the stack upon the application of a pure sine wave representing a sound that is at 100 dB is less than, greater than, or about equal to 0.1, 0.2, 0.3, 0.4, 0.5, 0.6. 0.7, 0.8, 0.9, 1.0, 1.1, 1.2, 1.3, 1.4, 1.5, 1.6. 1.7, 1.8, 1.9, 2.0, 2.1, 2.2, 2.3, 2.4, 2.5, 2.6, 2.7. 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7. 4.8, 4.9, 5.0, 5.1, 5.2, 5.3, 5.4, 5.5, 5.6. 5.7, 5.8, 5.9, 6, 6.25, 6.5, 6.75, 7, 7.25, 7.5, 7.75, 8, 8.5, 9, 9.5, 10, 11, 12, 13, 14, or 15 microns or any value or range of values therebetween in 0.01-micron increments.

It is noted that the above are but some of the ways that the teachings detailed herein enable shock proofing. Still further, in an exemplary embodiment, again, time with the concept of utilizing prestress, although in other embodiments, prestress is not needed, the spring components themselves or otherwise the articulating components provide shock proofing. By way of example only and not by way of limitation, the springs can be configured to so that upon a certain amount of force, the springs will deflect in a different manner than that which would occur during normal operations, which deflection could potentially cancel out at least some of the extension of the piezoelectric elements which would otherwise occur without that deflection. This can provide some if not total shock proofing.

Figure 35:
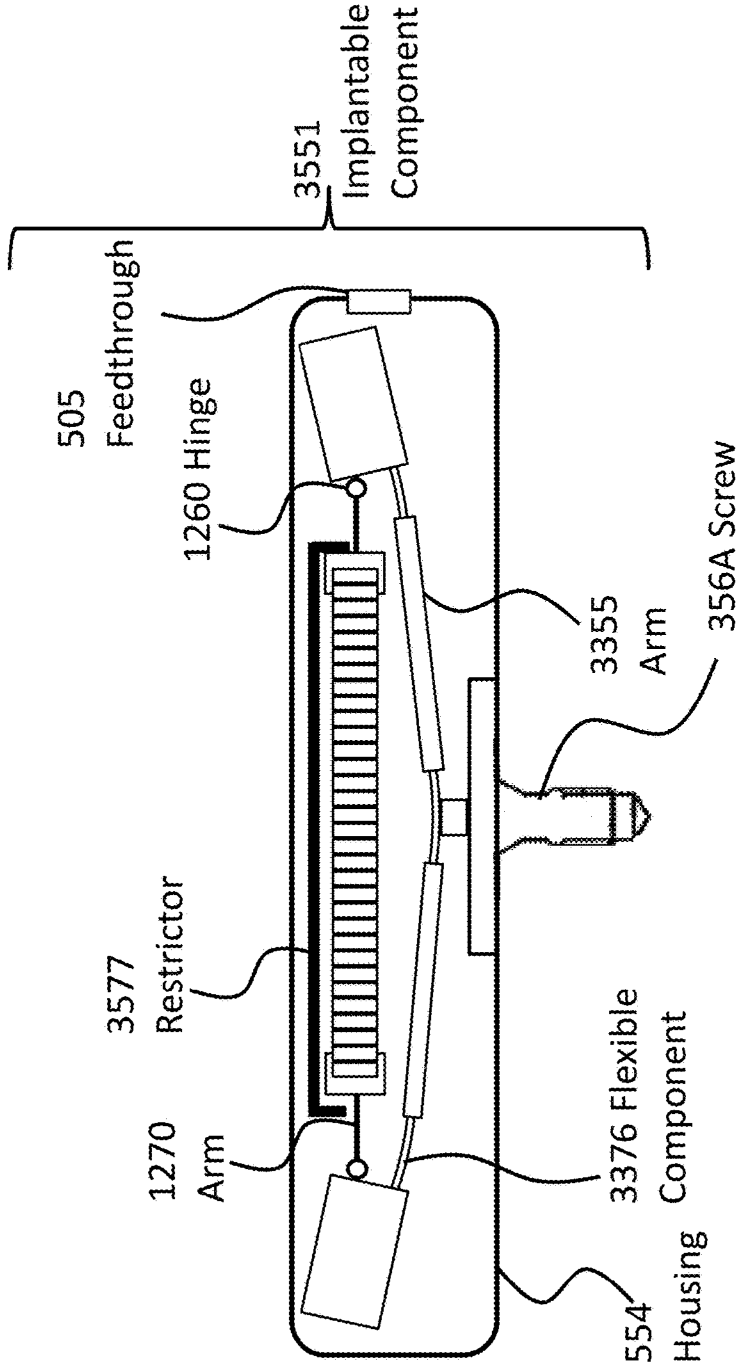

FIG. 35 presents another exemplary embodiment that utilizes distance restrictor 3577 in an implantable component 3551. Restrictor 3577 is presented as a metal clamp like device that extends from one side of the piezoelectric stack to the other side of the piezoelectric stack. The clamp surfaces are configured to limit expansion of the piezoelectric elements beyond a certain amount. In an exemplary embodiment, the restrictor 3577 has a distance between the clamping surfaces that are greater than the greatest expansion of the piezoelectric elements that occurs during normal operation of the subcomponent. The distance is less than that which would result if the piezoelectric elements were permitted to fully expand with respect to full movement of the seismic masses during a shock scenario. In the embodiment shown in FIG. 35, one side of the restrictor is fixedly mounted to one side of the transducer, while the other side has a gap to permit expansion for the normal operation.

In at least some exemplary embodiments, the piezoelectric elements are configured to withstand high compressive forces. Accordingly, the restrictor 3577 is not needed to restrict movement of the piezoelectric elements inward, but only outward.

It is also noted that in a variation of the embodiment of FIG. 35, the restrictor can instead be mounted on the seismic masses of the like.

In at least some exemplary embodiments, the amount of extension of the stack from a neutral position causes less than, greater than or about equal to 1.0, 1.1, 1.2, 1.3, 1.4, 1.5, 1.6. 1.7, 1.8, 1.9, 2.0, 2.1, 2.2, 2.3, 2.4, 2.5, 2.6, 2.7. 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7. 4.8, 4.9, 5.0, 5.1, 5.2, 5.3, 5.4, 5.5, 5.6. 5.7, 5.8, 5.9, 6, 6.25, 6.5, 6.75, 7, 7.25, 7.5, 7.75, 8, 8.5, 9, 9.5, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95, 100, 110, 120, 130, 140, or 150 or more or any value or range of values therebetween in 0.01 increments deflection at an outermost location on the seismic mass.

In an exemplary embodiment, as compared to an optimized piezoelectric bender that would cause the masses to deflect by the same amount, the amount of power used by the bender stack is at least 1.0, 1.1, 1.2, 1.3, 1.4, 1.5, 1.6. 1.7, 1.8, 1.9, 2.0, 2.1, 2.2, 2.3, 2.4, 2.5, 2.6, 2.7. 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7. 4.8, 4.9, 5.0, 5.1, 5.2, 5.3, 5.4, 5.5, 5.6. 5.7, 5.8, 5.9, 6, 6.25, 6.5, 6.75, 7, 7.25, 7.5, 7.75, 8, 8.5, 9, 9.5, 10, 11, 12, 13, 14, 15, 16, 17, 18, 19, 20, 21, 22, 23, 24, 25, 26, 27, 28, 29, or 30 times less than that which would be consumed by the optimized bender.

In an exemplary embodiment, the permanent shock-proofing exists while a vibratory path extending from at least the seismic mass assembly to the housing remains in place when experiencing a G force that moves the mass assembly a maximum amount (as opposed to, for example, the amount that is moved when the assembly flaps to evoke a hearing percept during normal operation, or when subjected to a G force that causes movement in excess of that but not an amount corresponding to the maximum movement). Indeed, in an exemplary embodiment, the component of the bone conduction device is configured such that the vibratory path extending from the assembly to the housing remains in place until the component is broken.

An exemplary embodiment includes an exemplary method, which includes executing any one or more of the method actions detailed herein, and then or before executing the method action of subjecting the component to at least XYZ G acceleration that causes the masses to flap. In an exemplary embodiment, XYZ is 10, 15, 20, 25, 30, 35, 40, 45, 50, 60, 70, 80, 90, 100, 125, 150, 175, 200, 250, 300, 350, 400, 450 or 500 or more.

This method also includes preventing the piezoelectric elements from moving the full distance that would otherwise result due to the full movement of the seismic masses subject to those accelerations. This can be achieved by any of the teachings applicable herein.

Note further, in an exemplary embodiment, the aforementioned accelerations occur, except that method includes preventing the entire system from moving the amount that would otherwise exist in the absence of the shock protection teachings detailed herein, which is implemented without damping.

Further, the transducer is damped via at least one of gas or shear damping during operation of the transducer during operation of the transducer. Also, in some embodiments, the transducer is damped primarily via one of gas or shear damping during operation of the transducer during operation of the transducer.

In another exemplary method, there a method that includes executing method 3300, and further comprising subjecting the component to at least an XYZ G acceleration that causes the transducer to flex or bend. The method further includes preventing the transducer from flexing or bending beyond a maximum amount of flexing or bending that would otherwise take place in the absence of the action of preventing without changing a state of the component from that which existed during operation of the transducer. In this regard, some anti-shock apparatus is used in bone conduction devices are of a configuration that alternately places the device into shock-proofing and out of shock-proofing, thus changing a state of the component. Moreover, in the embodiment of FIG. 9, the movement of the transducer-seismic mass assembly relative to the housing in its entirety also changes a state of the component. Here, the state of the component remains the same.

It is specifically noted that at least some of the shock proofing detailed herein does not utilize damping. Indeed, the embodiment of FIG. 35 is not damping. Instead, it is a binary device that halts further movement/extension of the piezoelectric elements. In this regard, at least some exemplary embodiments are the antithesis of damping. There is banging of components shall it be said, but the banging prevents damage before the damage can occur.

Still further, in an exemplary embodiment of the teachings herein, during operation of the transducer, a mass of the seismic-mass assembly moves relative to the transducer. Again, this is differentiated from the embodiment of FIG. 9, where the mass (actually, masses) move in a one-to-one relationship with the movements of the transducer.

In some embodiments, the maximum amount of movement that the seismic masses move at their most outboard locations is ABC micrometers in any one direction from an at-rest location. In an exemplary embodiment, ABC is 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, or any value or range of values therebetween in about 0.1 increments. In some embodiments, this is irrespective of the G force environment, while in other embodiments, this is only in a 1 G environment during the normal operation of the component.

In an exemplary embodiment, the distance from the center of the bender apparatus to the outermost edge of the bender apparatus is about 2, 2.1, 2.2, 2.3, 2.4, 2.5, 2.6, 2.7, 2.8, 2.9, 3.0. 3.1, 3.2, 3.3, 3.4, 3.5, 3.6, 3.7, 3.8, 3.9, 4.0, 4.1, 4.2, 4.3, 4.4, 4.5, 4.6. 4.7, 4.8, 4.9. 5.0, 5.1, 5.2, 5.3, 5.4, 5.5, 5.6, 5.7, 5.8, 5.9, 6, 6.25, 6.5, 6.75, 7, 7.5, 8, 8.5, 9, 9.5, 10, 10.5, 11, 12, 13 or 14 or 15 mm or any value or range of values therebetween in about 0.01 mm increments.

In an exemplary embodiment, the resonant frequency of the arrangement according to the embodiments herein or variations thereof is lower than that which results according to the embodiment of FIG. 11 and prior thereto, all other things being equal. That is, for the same size bender apparatus, and the same weight of seismic mass, in the same size housing (height, length, width), for the same type of connection), the resonant frequency is at least 5, 10, 15, 20, 25, 30, 35, 40, 45, 50, 55, 60, 65, 70, 75, or 80 percent lower than that which would be the case for an embodiment according to FIG. 11.

Briefly, it is noted that in some embodiments, when exposed to a 10, 15, or 20 G acceleration and/or deceleration, without the movement limitation devices disclosed herein (e.g., simulated mass and moment arrangement), the resulting flap and/or bending moves the seismic masses at least 4, 5, 6, 7, 8, 9, 10, 11, 12, 13, 14, 15, 20, 25, 30, 35, 40, 45, or 50 times the amount that occurs during normal operation in response to a pure sine wave at 1000 Hz at 80 dB (as measured at the microphone of the external component when used therewith).

Briefly, it is noted that in some embodiments, when exposed to a 10, 15, or 20 G acceleration and/or deceleration, with the movement limitation devices disclosed herein, the resulting flap and/or bending moves the bending apparatus no more than 1.1, 1.2, 1.3, 1.4, 1.5, 1.6, 1.7, 1.8. 1.9, 2.0, 2.1, 2.2, 2.3, 2.4, 2.5, 2.6. 2.7. 2.8, 2.9, 3. 3.5, 4, 5, 6, 7, 8, 9, 10, 11, 12, 13, 14, 15, or 20 times or any value or range of values therebetween in 0.01 increments, the amount that occurs during normal operation in response to a pure sine wave at 1000 Hz at 80 dB (as measured at the microphone of the external component when used therewith).

It is noted that any disclosure of a device and/or system herein corresponds to a disclosure of a method of utilizing such device and/or system. It is further noted that any disclosure of a device and/or system herein corresponds to a disclosure of a method of manufacturing such device and/or system. It is further noted that any disclosure of a method action detailed herein corresponds to a disclosure of a device and/or system for executing that method action/a device and/or system having such functionality corresponding to the method action. It is also noted that any disclosure of a functionality of a device herein corresponds to a method including a method action corresponding to such functionality. Also, any disclosure of any manufacturing methods detailed herein corresponds to a disclosure of a device and/or system resulting from such manufacturing methods and/or a disclosure of a method of utilizing the resulting device and/or system.

Unless otherwise specified or otherwise not enabled by the art, any one or more teachings detailed herein with respect to one embodiment can be combined with one or more teachings of any other teaching detailed herein with respect to other embodiments. Also, unless otherwise specified or otherwise not enabled, any one or more teachings detailed herein can be excluded from combination with one or more other teachings, in some embodiments.

While various embodiments have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments but should be defined only in accordance with the following claims and their equivalents.

The invention claimed is:

1. A component of a bone conduction device, comprising:
a housing; and
a bender apparatus located in the housing, wherein
the bender apparatus is a device of a piezoelectric bender,
the bender apparatus includes an actuator, and
at least one of:
(i) the actuator is configured to drive bending of the bender apparatus, and the actuator is isolated from bending of the bender apparatus;
(ii) the component is configured such that the actuator functions as a7 puppeteer to cause the bender apparatus to bend upwards and/or downwards; or
(iii) the actuator, in conjunction with other components of the bender apparatus, duplicates a piezoelectric bender.

2. The component of claim 1, wherein:
the bender apparatus is a metal spring-based apparatus.

3. The component of claim 1, wherein:
the actuator is configured to drive bending of the bender apparatus, and
the actuator is isolated from bending of the bender apparatus.

4. The component of claim 1, wherein:
the component is configured such that the actuator functions as a puppeteer to cause the bender apparatus to bend upwards and/or downwards.

5. The component of claim 1, wherein:
the actuator is a piezoelectric element;
the bender apparatus includes a spring that is bent in a relaxed state; and
the spring applies a pre-stress on the piezoelectric element.

6. The component of claim 1, wherein:
the bender apparatus includes a first piezoelectric portion and a second piezoelectric portion;
the first piezoelectric portion is optimized for a first range of frequencies of bending;

at least one of the first piezoelectric portion or the second piezoelectric portion are part of the actuator;

the second piezoelectric portion is optimized for a second range of frequencies of bending higher than the first range; and both the first piezoelectric portion and the second piezoelectric portion cause bending of the same components of the bender.

7. The component of claim 1, further comprising:

a seismic mass supported by the bender apparatus, wherein the bender apparatus is the only component that supports the seismic mass in the housing.

8. The component of claim 1, wherein:

the component of the bone conduction device is configured to convert a non-bending movement of the actuator into a bending movement of the bender.

9. The component of claim 1, wherein:

the actuator in conjunction with other components of the bender apparatus duplicates a piezoelectric bender.

10. The component of claim 9, wherein the actuator is a piezoelectric element.

11. The component of claim 3, wherein the actuator is a piezoelectric element.

12. The component of claim 4, wherein the actuator is a piezoelectric actuator.

13. A component of a bone conduction device, comprising:

a housing; and a flapper apparatus located in the housing, wherein the flapper apparatus includes a piezoelectric apparatus that is a contractor and/or an extender and/or a shearer, the flapper apparatus is at least an effectively symmetrical apparatus, and the component of the bone conduction device is configured to convert a non-bending movement of the piezoelectric apparatus into a bending movement of the flapper apparatus.

14. The component of claim 13, wherein:

the piezoelectric apparatus is a contractor and/or an extender.

15. The component of claim 13, wherein:

the flapper apparatus includes a counterweight and a counterweight support structure; and the flapper apparatus is configured such that a force generated by the piezoelectric apparatus is applied directly onto at least one of the counterweight or the support structure to move the counterweight in a vibratory manner.

16. The component of claim 13, wherein:

the piezoelectric apparatus is a shearer.

17. The component of claim 13, wherein:

the piezoelectric apparatus applies at least one of a push force or a pull force onto an assembly including a seismic mass to move the seismic mass in a vibratory manner.

18. The component of claim 13, wherein:

the counterweights rotate during flapping of the flapper apparatus at least about equally and opposite to one another.

19. The component of claim 13, wherein:

the flapper apparatus includes a counterweight and a counterweight support structure; and the flapper apparatus is configured such that the piezoelectric apparatus extends substantially parallel to the support structure that supports the counterweight.

20. A component of a bone conduction device, comprising:

a housing; and a piezo-seismic mass assembly configured to flap to evoke a hearing percept as a result of energizement of a piezoelectric transducer of the assembly, wherein the component is configured to enable permanent shockproofing of the piezo transducer of the piezo-seismic mass assembly beyond that which results from damping while at least a portion of the piezo-seismic mass assembly is fixed relative to the housing.

21. The component of claim 20, wherein:

the permanent shock-proofing exists while a vibratory path extending from the piezo-seismic mass assembly to the housing remains in place when experiencing a G force that moves the assembly a maximum amount.

22. The component of claim 20, wherein:

the component is configured such that the vibratory path extending from the assembly to the housing remains in place until the component is broken.

23. The component of claim 20, wherein:

the piezo-seismic mass assembly includes a counterweight; and the permanently shock-proofing exists even though the component is configured to enable the assembly and/or a part carried by the assembly to undampedly strike the housing or any other component directly supported by the housing upon subjecting the housing to a G force that would otherwise break the assembly in the absence of the shock-proofing.

24. The component of claim 20, wherein:

the piezo-seismic mass assembly includes a counterweight; and the component is configured to at least partially decouple the counterweight from the piezoelectric transducer when experiencing a G force above a certain value in a first direction, thereby shock-proofing the assembly.

25. The component of claim 20, wherein:

the piezo-seismic mass assembly includes a counterweight; and the component is configured such that the piezoelectric transducer absorbs all shock force resulting from the counterweight experiencing a 200G in a first direction.

26. The component of claim 20, wherein:

the piezo-seismic mass assembly includes a piezoelectric non-bender and one or more counterweights.

* * * * *